US009109512B2

(12) United States Patent
Ingersoll et al.

(10) Patent No.: US 9,109,512 B2
(45) Date of Patent: Aug. 18, 2015

(54) COMPENSATED COMPRESSED GAS STORAGE SYSTEMS

(75) Inventors: Eric D. Ingersoll, Cambridge, MA (US); Justin A. Aborn, Hingham, MA (US); Matthew Blieske, Francetown, NH (US); David Marcus, West Newton, MA (US); Kyle Brookshire, Belmont, MA (US)

(73) Assignee: General Compression, Inc., Newton, MA (US)

( * ) Notice: Subject to any disclaimer, the term of this patent is extended or adjusted under 35 U.S.C. 154(b) by 778 days.

(21) Appl. No.: 13/350,050

(22) Filed: Jan. 13, 2012

(65) Prior Publication Data

US 2012/0174569 A1 Jul. 12, 2012

Related U.S. Application Data

(60) Provisional application No. 61/432,904, filed on Jan. 14, 2011.

(51) Int. Cl.
*H02J 15/00* (2006.01)
*F02C 6/16* (2006.01)

(52) U.S. Cl.
CPC ............... *F02C 6/16* (2013.01); *H02J 15/006* (2013.01); *Y02E 60/15* (2013.01)

(58) Field of Classification Search
CPC .......... Y02E 60/15; H02J 15/006; F02C 6/16
USPC ........... 60/398, 456, 408, 413, 429, 370, 417
See application file for complete search history.

(56) References Cited

U.S. PATENT DOCUMENTS

| 114,297 A | 5/1871 | Ivens et al. |
|---|---|---|
| 224,081 A | 2/1880 | Eckart |

(Continued)

FOREIGN PATENT DOCUMENTS

| GB | 2013318 | 8/1979 |
|---|---|---|
| WO | WO 90/03516 | 4/1990 |

(Continued)

OTHER PUBLICATIONS

First Action Interview Pilot Program Pre-Interview Communication for U.S. Appl. No. 12/977,724, mailed Oct. 28, 2011.

(Continued)

*Primary Examiner* — Nathaniel Wiehe
*Assistant Examiner* — Abiy Teka
(74) *Attorney, Agent, or Firm* — Goodwin Procter LLP

(57) ABSTRACT

Systems, devices and methods for the compression, expansion, and/or storage of a gas are described herein. An apparatus suitable for use in a compressed gas-based energy storage and recovery system includes a pneumatic cylinder having a working piston disposed therein for reciprocating movement in the pneumatic cylinder, a hydraulic actuator coupled to the working piston, and a hydraulic controller fluidically coupleable to the hydraulic actuator. The apparatus is fluidically coupleable to a compressed gas storage chamber which includes a first storage chamber fluidically coupleable to the pneumatic chamber, and a second storage chamber is fluidically coupleable to the first storage chamber. The first storage chamber is disposed at a first elevation and is configured to contain a liquid and a gas. The second storage chamber is disposed at a second elevation greater than the first elevation, and is configured to contain a volume of liquid.

20 Claims, 37 Drawing Sheets

(56) References Cited

U.S. PATENT DOCUMENTS

| | | | |
|---|---|---|---|
| 233,432 A | 10/1880 | Pitchford |
| 320,482 A | 6/1885 | Leavitt |
| 874,140 A | 12/1907 | Valiquet |
| 943,000 A | 12/1909 | Busby |
| 1,045,961 A | 12/1912 | Ferranti |
| 1,147,204 A | 7/1915 | Anheuser |
| 1,230,028 A | 6/1917 | Rardon |
| 1,353,216 A | 9/1920 | Carlson |
| 1,369,596 A | 2/1921 | Yanacopoulos |
| 1,635,524 A | 7/1927 | Aikman |
| 1,681,280 A | 8/1928 | Bruckner |
| 1,918,789 A | 7/1933 | Ttisworth |
| 1,947,304 A | 2/1934 | Morro |
| 2,025,142 A | 12/1935 | Zahm et al. |
| 2,042,991 A | 6/1936 | Harris, Jr. |
| 2,141,703 A | 12/1938 | Bays |
| 2,150,122 A | 3/1939 | Kollberg et al. |
| 2,280,100 A | 4/1942 | Singleton |
| 2,280,845 A | 4/1942 | Parker |
| 2,339,086 A | 8/1944 | Makaroff |
| 2,404,660 A | 7/1946 | Rouleau |
| 2,420,098 A | 5/1947 | Rouleau |
| 2,454,058 A | 11/1948 | Hays |
| 2,479,856 A | 8/1949 | Mitton |
| 2,539,862 A | 1/1951 | Rushing |
| 2,628,564 A | 2/1953 | Jacobs |
| 2,683,964 A | 7/1954 | Anxionnaz et al. |
| 2,706,077 A | 4/1955 | Searcy |
| 2,712,728 A | 7/1955 | Lewis et al. |
| 2,813,398 A | 11/1957 | Wilcox |
| 2,824,687 A | 2/1958 | Osterkamp |
| 2,829,501 A | 4/1958 | Walls |
| 2,880,759 A | 4/1959 | Wisman |
| 2,898,183 A | 8/1959 | Fauser |
| 3,014,639 A | 12/1961 | Boli |
| 3,041,842 A | 7/1962 | Heinecke |
| 3,232,524 A | 2/1966 | Rice at al. |
| 3,236,512 A | 2/1966 | Caslav et al. |
| 3,269,121 A | 8/1966 | Ludwig |
| 3,355,096 A | 11/1967 | Hornschuch |
| 3,523,192 A | 8/1970 | Lang |
| 3,530,681 A | 9/1970 | Dehne |
| 3,538,340 A | 11/1970 | Lang |
| 3,608,311 A | 9/1971 | Roesel, Jr. |
| 3,618,470 A | 11/1971 | Mueller et al. |
| 3,648,458 A | 3/1972 | McAlister |
| 3,650,636 A | 3/1972 | Eskeli |
| 3,672,160 A | 6/1972 | Kim |
| 3,677,008 A | 7/1972 | Koutz |
| 3,704,079 A | 11/1972 | Berlyn |
| 3,757,517 A | 9/1973 | Rigollot |
| 3,792,643 A | 2/1974 | Scheafer |
| 3,793,848 A | 2/1974 | Eskeli |
| 3,796,044 A | 3/1974 | Schwarz |
| 3,801,793 A | 4/1974 | Goebel |
| 3,802,795 A | 4/1974 | Nyeste |
| 3,803,847 A | 4/1974 | McAlister |
| 3,806,733 A | 4/1974 | Haanen |
| 3,818,801 A | 6/1974 | Kime |
| 3,832,851 A | 9/1974 | Kiernan |
| 3,835,918 A | 9/1974 | Pilarczyk |
| 3,839,863 A | 10/1974 | Frazier |
| 3,847,182 A | 11/1974 | Greer |
| 3,854,301 A | 12/1974 | Cytryn |
| 3,895,493 A | 7/1975 | Rigollot |
| 3,903,696 A | 9/1975 | Carman |
| 3,935,469 A | 1/1976 | Haydock |
| 3,939,356 A | 2/1976 | Loane |
| 3,942,323 A | 3/1976 | Maillet |
| 3,945,207 A | 3/1976 | Hyatt |
| 3,948,049 A | 4/1976 | Ohms et al. |
| 3,952,516 A | 4/1976 | Lapp |
| 3,952,723 A | 4/1976 | Browning |
| 3,958,899 A | 5/1976 | Coleman, Jr. et al. |
| 3,968,732 A | 7/1976 | Fitzgerald |
| 3,986,354 A | 10/1976 | Erb |
| 3,988,592 A | 10/1976 | Porter |
| 3,988,897 A | 11/1976 | Strub |
| 3,990,246 A | 11/1976 | Wilmers |
| 3,991,574 A | 11/1976 | Frazier |
| 3,996,741 A | 12/1976 | Herberg |
| 3,998,049 A | 12/1976 | McKinley et al. |
| 4,008,006 A | 2/1977 | Bea |
| 4,009,587 A | 3/1977 | Robinson, Jr. et al. |
| 4,027,993 A | 6/1977 | Wolff |
| 4,030,303 A | 6/1977 | Kraus et al. |
| 4,031,702 A | 6/1977 | Burnett et al. |
| 4,031,704 A | 6/1977 | Moore et al. |
| 4,041,708 A | 8/1977 | Wolff |
| 4,050,246 A | 9/1977 | Bourquardez |
| 4,053,395 A | 10/1977 | Switzgable |
| 4,055,950 A | 11/1977 | Grossman |
| 4,058,979 A | 11/1977 | Germain |
| 4,079,586 A | 3/1978 | Kincaid, Jr. |
| 4,079,591 A | 3/1978 | Derby |
| 4,089,744 A | 5/1978 | Cahn |
| 4,090,940 A | 5/1978 | Switzgable |
| 4,095,118 A | 6/1978 | Ratbun |
| 4,100,745 A | 7/1978 | Gyarmathy et al. |
| 4,103,490 A * | 8/1978 | Gorlov .......................... 60/398 |
| 4,104,955 A | 8/1978 | Murphy |
| 4,108,077 A | 8/1978 | Laing |
| 4,109,465 A | 8/1978 | Plen |
| 4,110,987 A | 9/1978 | Cahn et al. |
| 4,112,311 A | 9/1978 | Theyse |
| 4,117,342 A | 9/1978 | Melley, Jr. |
| 4,117,343 A | 9/1978 | Hoffelns |
| 4,117,696 A | 10/1978 | Fawcett et al. |
| 4,118,637 A | 10/1978 | Tackett |
| 4,124,182 A | 11/1978 | Loeb |
| 4,124,805 A | 11/1978 | Jacoby |
| 4,126,000 A | 11/1978 | Funk |
| 4,136,432 A | 1/1979 | Melley, Jr. |
| 4,137,015 A | 1/1979 | Grossman |
| 4,142,368 A | 3/1979 | Mantegani |
| 4,143,522 A | 3/1979 | Hamrick |
| 4,147,204 A | 4/1979 | Pfenninger |
| 4,149,092 A | 4/1979 | Cros |
| 4,150,547 A | 4/1979 | Hobson |
| 4,154,292 A | 5/1979 | Herrick |
| 4,167,372 A | 9/1979 | Tackett |
| 4,170,878 A | 10/1979 | Jahnig |
| 4,173,431 A | 11/1979 | Smith |
| 4,189,925 A | 2/1980 | Long |
| 4,197,700 A | 4/1980 | Jahnig |
| 4,197,715 A | 4/1980 | Fawcett et al. |
| 4,201,514 A | 5/1980 | Huetter |
| 4,204,126 A | 5/1980 | Diggs |
| 4,206,601 A | 6/1980 | Eberle |
| 4,206,608 A | 6/1980 | Bell |
| 4,209,982 A | 7/1980 | Pitts |
| 4,215,548 A | 8/1980 | Beremand |
| 4,220,006 A | 9/1980 | Kindt |
| 4,229,143 A | 10/1980 | Pucher |
| 4,229,661 A | 10/1980 | Mead et al. |
| 4,232,253 A | 11/1980 | Mortelmans |
| 4,236,083 A | 11/1980 | Kenney |
| 4,237,692 A | 12/1980 | Ahrens et al. |
| 4,242,878 A | 1/1981 | Brinkerhoff |
| 4,246,978 A | 1/1981 | Schulz et al. |
| 4,262,735 A | 4/1981 | Courrege |
| 4,265,599 A | 5/1981 | Morton |
| 4,273,514 A | 6/1981 | Shore et al. |
| 4,274,010 A | 6/1981 | Lawson-Tancred |
| 4,275,310 A | 6/1981 | Summers et al. |
| 4,281,256 A | 7/1981 | Ahrens |
| 4,293,323 A | 10/1981 | Cohen |
| 4,299,198 A | 11/1981 | Woodhull |
| 4,302,684 A | 11/1981 | Gogins |
| 4,304,103 A | 12/1981 | Hamrick |
| 4,311,011 A | 1/1982 | Lewis |
| 4,316,096 A | 2/1982 | Syverson |
| 4,317,439 A | 3/1982 | Emmerling |
| 4,329,842 A | 5/1982 | Hoskinson |

(56) References Cited

U.S. PATENT DOCUMENTS

| | | |
|---|---|---|
| 4,335,093 A | 6/1982 | Salomon |
| 4,335,867 A | 6/1982 | Bihlmaier |
| 4,340,822 A | 7/1982 | Gregg |
| 4,341,072 A | 7/1982 | Clyne |
| 4,343,569 A | 8/1982 | Schwarzenbach |
| 4,348,863 A | 9/1982 | Taylor et al. |
| 4,353,214 A | 10/1982 | Gardner |
| 4,354,420 A | 10/1982 | Bianchetta |
| 4,355,923 A | 10/1982 | Schwarzenbach |
| 4,355,956 A | 10/1982 | Ringrose et al. |
| 4,358,250 A | 11/1982 | Payne |
| 4,362,462 A | 12/1982 | Blotenberg |
| 4,363,703 A | 12/1982 | ElDifrawi |
| 4,367,786 A | 1/1983 | Hafner et al. |
| 4,368,692 A | 1/1983 | Kita |
| 4,368,775 A | 1/1983 | Ward |
| 4,370,559 A | 1/1983 | Langley, Jr. |
| 4,372,114 A | 2/1983 | Burnham |
| 4,372,332 A | 2/1983 | Mast |
| 4,375,387 A | 3/1983 | deFilippi et al. |
| 4,380,419 A | 4/1983 | Morton |
| 4,391,552 A | 7/1983 | O'Hara |
| 4,392,354 A | 7/1983 | Schwarzenbach |
| 4,393,752 A | 7/1983 | Meier |
| 4,411,136 A | 10/1983 | Funk |
| 4,421,661 A | 12/1983 | Claar et al. |
| 4,426,846 A | 1/1984 | Bailey |
| 4,428,711 A | 1/1984 | Archer |
| 4,435,131 A | 3/1984 | Ruben |
| 4,454,721 A | 6/1984 | Hurlimann |
| 4,466,244 A | 8/1984 | Wu |
| 4,478,556 A | 10/1984 | Gozzi |
| 4,537,558 A | 8/1985 | Tsunoda et al. |
| 4,538,414 A | 9/1985 | Saleh |
| 4,585,039 A | 4/1986 | Hamilton |
| 4,593,202 A | 6/1986 | Dickinson |
| 4,603,551 A | 8/1986 | Wood |
| 4,610,369 A | 9/1986 | Mercier |
| 4,706,685 A | 11/1987 | Jones, Jr. et al. |
| 4,714,411 A | 12/1987 | Searle |
| 4,720,978 A * | 1/1988 | Spacer .................. 60/641.8 |
| 4,761,118 A | 8/1988 | Zanarini et al. |
| 4,765,225 A | 8/1988 | Birchard |
| 4,784,579 A | 11/1988 | Gazzera |
| 4,849,648 A | 7/1989 | Longardner |
| 4,959,958 A | 10/1990 | Nishikawa et al. |
| 5,099,648 A | 3/1992 | Angle |
| 5,138,936 A | 8/1992 | Kent |
| 5,142,870 A | 9/1992 | Angle |
| 5,161,865 A | 11/1992 | Higashimate et al. |
| 5,169,295 A | 12/1992 | Stogner et al. |
| 5,179,837 A | 1/1993 | Sieber |
| 5,184,936 A | 2/1993 | Nojima |
| 5,253,619 A | 10/1993 | Richeson et al. |
| 5,259,738 A | 11/1993 | Salter et al. |
| 5,322,418 A | 6/1994 | Comer |
| 5,387,089 A | 2/1995 | Stogner et al. |
| 5,394,695 A | 3/1995 | Sieber |
| 5,537,822 A | 7/1996 | Shnaid et al. |
| 5,564,912 A | 10/1996 | Peck et al. |
| 5,584,664 A | 12/1996 | Elliott et al. |
| 5,622,478 A | 4/1997 | Elliott et al. |
| 5,634,340 A | 6/1997 | Grennan |
| 5,674,053 A | 10/1997 | Paul et al. |
| 5,716,197 A | 2/1998 | Paul et al. |
| 5,769,610 A | 6/1998 | Paul et al. |
| 5,771,693 A | 6/1998 | Coney |
| 5,782,612 A | 7/1998 | Margardt |
| 5,807,083 A | 9/1998 | Tomoiu |
| 5,839,270 A | 11/1998 | Jirnov et al. |
| 5,863,186 A | 1/1999 | Green et al. |
| 5,993,170 A | 11/1999 | Stevens et al. |
| 6,026,349 A | 2/2000 | Heneman |
| 6,052,992 A | 4/2000 | Eroshenko |
| 6,113,357 A | 9/2000 | Dobbs |
| 6,145,311 A | 11/2000 | Cyphelly |
| 6,206,660 B1 | 3/2001 | Coney et al. |
| RE37,603 E | 3/2002 | Coney |
| 6,371,145 B1 | 4/2002 | Bardon |
| 6,371,733 B1 | 4/2002 | Renfro |
| 6,397,794 B1 | 6/2002 | Sanderson et al. |
| 6,446,587 B1 | 9/2002 | Sanderson et al. |
| 6,460,450 B1 | 10/2002 | Sanderson et al. |
| 6,499,288 B1 | 12/2002 | Knight |
| 6,558,134 B2 | 5/2003 | Serafin et al. |
| 6,568,169 B2 | 5/2003 | Conde et al. |
| 6,568,911 B1 | 5/2003 | Brightwell et al. |
| 6,638,024 B1 | 10/2003 | Hancock |
| 6,652,241 B1 | 11/2003 | Alder |
| 6,652,243 B2 | 11/2003 | Krasnov |
| 6,655,155 B2 | 12/2003 | Bishop |
| 6,695,591 B2 | 2/2004 | Grimmer et al. |
| 6,711,984 B2 | 3/2004 | Tagge et al. |
| 6,725,671 B2 | 4/2004 | Bishop |
| 6,733,253 B2 | 5/2004 | Vockroth |
| 6,817,185 B2 | 11/2004 | Coney et al. |
| 6,829,978 B2 | 12/2004 | Sanderson et al. |
| 6,854,377 B2 | 2/2005 | Sanderson et al. |
| 6,913,447 B2 | 7/2005 | Fox et al. |
| 6,915,765 B1 | 7/2005 | Sanderson et al. |
| 6,925,973 B1 | 8/2005 | Sanderson et al. |
| 6,957,632 B1 | 10/2005 | Carlson et al. |
| 6,959,546 B2 | 11/2005 | Corcoran |
| 6,994,104 B2 | 2/2006 | Bishop et al. |
| 6,997,685 B2 | 2/2006 | Lemmen |
| 7,001,158 B2 | 2/2006 | Dunn |
| 7,007,589 B1 | 3/2006 | Sanderson |
| 7,011,469 B2 | 3/2006 | Sanderson et al. |
| 7,021,602 B2 | 4/2006 | Davis et al. |
| RE39,249 E | 8/2006 | Link, Jr. |
| 7,210,496 B2 | 5/2007 | Suzuki |
| 7,219,682 B2 | 5/2007 | Agnew et al. |
| 7,257,952 B2 | 8/2007 | Bishop et al. |
| 7,281,371 B1 * | 10/2007 | Heidenreich ............... 60/398 |
| 7,308,361 B2 | 12/2007 | Enis et al. |
| 7,377,492 B2 | 5/2008 | Vrana et al. |
| 7,395,748 B2 | 7/2008 | Krimbacher |
| 7,488,159 B2 | 2/2009 | Bhatt et al. |
| 7,527,482 B2 | 5/2009 | Ursan et al. |
| 7,530,300 B2 | 5/2009 | Hornstein |
| 7,543,668 B1 | 6/2009 | Schechter |
| 7,604,064 B2 | 10/2009 | Irwin, Jr. |
| 7,610,955 B2 | 11/2009 | Irwin, Jr. |
| 7,640,736 B2 | 1/2010 | Arbel et al. |
| 7,656,055 B2 | 2/2010 | Torres et al. |
| 7,663,255 B2 | 2/2010 | Kim et al. |
| 7,696,632 B1 | 4/2010 | Fuller |
| 7,802,426 B2 | 9/2010 | Bollinger |
| 7,832,207 B2 | 11/2010 | McBride et al. |
| 7,874,155 B2 | 1/2011 | McBride et al. |
| 7,900,444 B1 | 3/2011 | McBride et al. |
| 2003/0180155 A1 | 9/2003 | Coney et al. |
| 2005/0155347 A1* | 7/2005 | Lewellin ................. 60/508 |
| 2005/0180864 A1 | 8/2005 | Ursan et al. |
| 2005/0193729 A1 | 9/2005 | Vichakyothin et al. |
| 2006/0078445 A1 | 4/2006 | Carter, III et al. |
| 2006/0218908 A1 | 10/2006 | Abou-Raphael |
| 2006/0248886 A1 | 11/2006 | Ma |
| 2007/0187918 A1 | 8/2007 | Mizuno |
| 2007/0256430 A1* | 11/2007 | Prueitt ..................... 62/93 |
| 2008/0060862 A1 | 3/2008 | Schlele et al. |
| 2008/0163618 A1 | 7/2008 | Paul |
| 2009/0260361 A1 | 10/2009 | Prueitt |
| 2009/0282822 A1 | 11/2009 | McBride et al. |
| 2009/0301089 A1* | 12/2009 | Bollinger ................. 60/652 |
| 2010/0018196 A1 | 1/2010 | Li et al. |
| 2010/0089063 A1 | 4/2010 | McBride et al. |
| 2010/0139277 A1 | 6/2010 | McBride et al. |
| 2010/0205960 A1 | 8/2010 | McBride et al. |
| 2010/0229544 A1 | 9/2010 | Bollinger et al. |
| 2010/0307156 A1 | 12/2010 | Bollinger et al. |
| 2010/0326062 A1 | 12/2010 | Fong et al. |
| 2010/0326064 A1 | 12/2010 | Fong et al. |
| 2010/0326066 A1 | 12/2010 | Fong et al. |

(56) References Cited

U.S. PATENT DOCUMENTS

| | | |
|---|---|---|
| 2010/0326068 A1 | 12/2010 | Fong et al. |
| 2010/0326069 A1 | 12/2010 | Fong et al. |
| 2010/0326075 A1 | 12/2010 | Fong et al. |
| 2010/0329891 A1 | 12/2010 | Fong et al. |
| 2010/0329903 A1 | 12/2010 | Fong et al. |
| 2010/0329909 A1 | 12/2010 | Fong et al. |
| 2011/0023488 A1 | 2/2011 | Fong et al. |
| 2011/0023977 A1 | 2/2011 | Fong et al. |
| 2011/0030359 A1 | 2/2011 | Fong et al. |
| 2011/0030552 A1 | 2/2011 | Fong et al. |
| 2011/0056193 A1 | 3/2011 | McBride et al. |
| 2011/0056368 A1 | 3/2011 | McBride et al. |
| 2011/0061741 A1 | 3/2011 | Ingersoll et al. |
| 2011/0061836 A1 | 3/2011 | Ingersoll et al. |
| 2011/0062166 A1 | 3/2011 | Ingersoll et al. |
| 2011/0079010 A1 | 4/2011 | McBride et al. |
| 2011/0083438 A1 | 4/2011 | McBride et al. |
| 2011/0131966 A1 | 6/2011 | McBride et al. |
| 2011/0167813 A1 | 7/2011 | McBride et al. |
| 2011/0258996 A1 | 10/2011 | Ingersoll et al. |
| 2011/0258999 A1 | 10/2011 | Ingersoll et al. |
| 2011/0259001 A1 | 10/2011 | Mcbride et al. |
| 2011/0259442 A1 | 10/2011 | Mcbride et al. |

FOREIGN PATENT DOCUMENTS

| | | |
|---|---|---|
| WO | WO 93/06367 | 4/1993 |
| WO | WO 98/17492 | 4/1998 |
| WO | WO 2005/069847 | 8/2005 |
| WO | WO 2008/139267 | 11/2008 |
| WO | WO 2009/034548 | 3/2009 |
| WO | WO 2010/135658 | 11/2010 |
| WO | WO 2011/079267 | 6/2011 |
| WO | WO 2011/079271 | 6/2011 |

OTHER PUBLICATIONS

Office Action for U.S. Appl. No. 13/294,660, mailed Jan. 18, 2012, 7 pages.
International Search Report and Written Opinion for International Application No. PCT/US2010/062016, mailed Jan. 19, 2012.
Cyphelly et al., "Usage of Compressed Air Storage Systems," Program Elektricity, Final Report May 2004, Ordered by the Swiss Federal Office of Energy.
International Search Report for International Patent Application No. PCT/US2012/021190 dated Jul. 5, 2012 (4 pages).
Ahrens, F. W., "Preliminary Evaluation of the Use of Hydraulic Air Compressors in Water-Compensated Reservoir Compressed Air Storage Power Plants," NTIS, Prepared for CAES Technology Symposium 1978, May 15-17, 1978, Pacific Grove, CA, Argonne National Laboratory, Argonne, Illinois, 24 pages.
Berghmans, J. A. et al., "Performance of a Hydraulic Air Compressor for Use in Compressed Air Energy Storage Power Systems," Smithsonian/NASA ADS Physics Abstract Service, Presented at Symp. on Fluids Eng. in Advanced Energy Conversion Systems, ASME Winter Ann. Meeting, San Francisco, Dec. 10-15.
Carbon Trust, "Hydraulic Transmission System for Large Wind Turbines," Jan. 2007, 1 page.
Erbe, R., "Water Works: Less Expensive Than Oil and Environmentally Friendly, Water-Based Hydraulics Deserve a Closer Look," Machine Design, Sep. 13, 2007, vol. 116, 5 pages.
Hydraulics & Pneumatics, Piston Pumps [online], [retrieved on Oct. 17, 2007]. Retrieved from the Internet: <URL: http://www.hydraulicspneumatics.com/200/FPE/pumps/article/true/6402>, 2007, Penton Media, Inc., 4 pages.
Hydraulics & Pneumatics, Wobble-Plate Piston Pump [online], [retrieved on Oct. 18, 2007]. Retrieved from the Internet: <URL: http://www.hydraulicspneumatics.com/200/issue/article/true/43640>, 2007, Penton Media, Inc., 13 pages.
Moore, J. J. et al., "Conceptual Design Study of Hydraulic Compression for Wind Turbine Driven Air Compression," Final Report, SwRI Project No. 18.18094.01.016, Jun. 6, 2008, Southwest Research institute, 50 pages.
Sanderson, A. E., "Hydraulic System for Control of Power Windmills," undated, 11 pages.
Sanderson Engine Development, "Application of Sanderson Mechanism for Conversion Between Linear and Rotary Motion," [online], [retrieved on May 8, 2008]. Retrieved from the Internet: <URL: http://www.sandersonengine.com/html/projects.html>, 2 pages.
Simetric, "Mass, Weight, Density or Specific Gravity of Liquids," [online], [retrieved on Jan. 2, 2008]. Retrieved from the Internet: <URL: http://www.simetric.co.uk/si_liquids.htm>, 5 pages.
"Swash-plate Type Axial Piston Pumps for Open Circuits in General Industrial Machinery," Kawasaki K3VG, Kawasaki Motor Corp., USA, 2006, 24 pages.
International Search Report and Written Opinion for International Application No. PCT/US2010/062010, mailed Apr. 13, 2011.
International Search Report and Written Opinion for International Application No. PCT/US2010/035795, mailed Oct. 13, 2011.
Invitation to Pay Additional Fees and Communication Relating to the Results of the Partial International Search for International Application No. PCT/US2010/035795, dated May 31, 2011, 6 pages.
Office Action for U.S. Appl. No. 12/785,093, mailed Oct. 31, 2011, 7 pages.
Office Action for U.S. Appl. No. 12/785,100, mailed Nov. 23, 10 pages.
Office Action for U.S. Appl. No. 13/294,862, mailed Jan. 30, 2011 6 pages.

\* cited by examiner

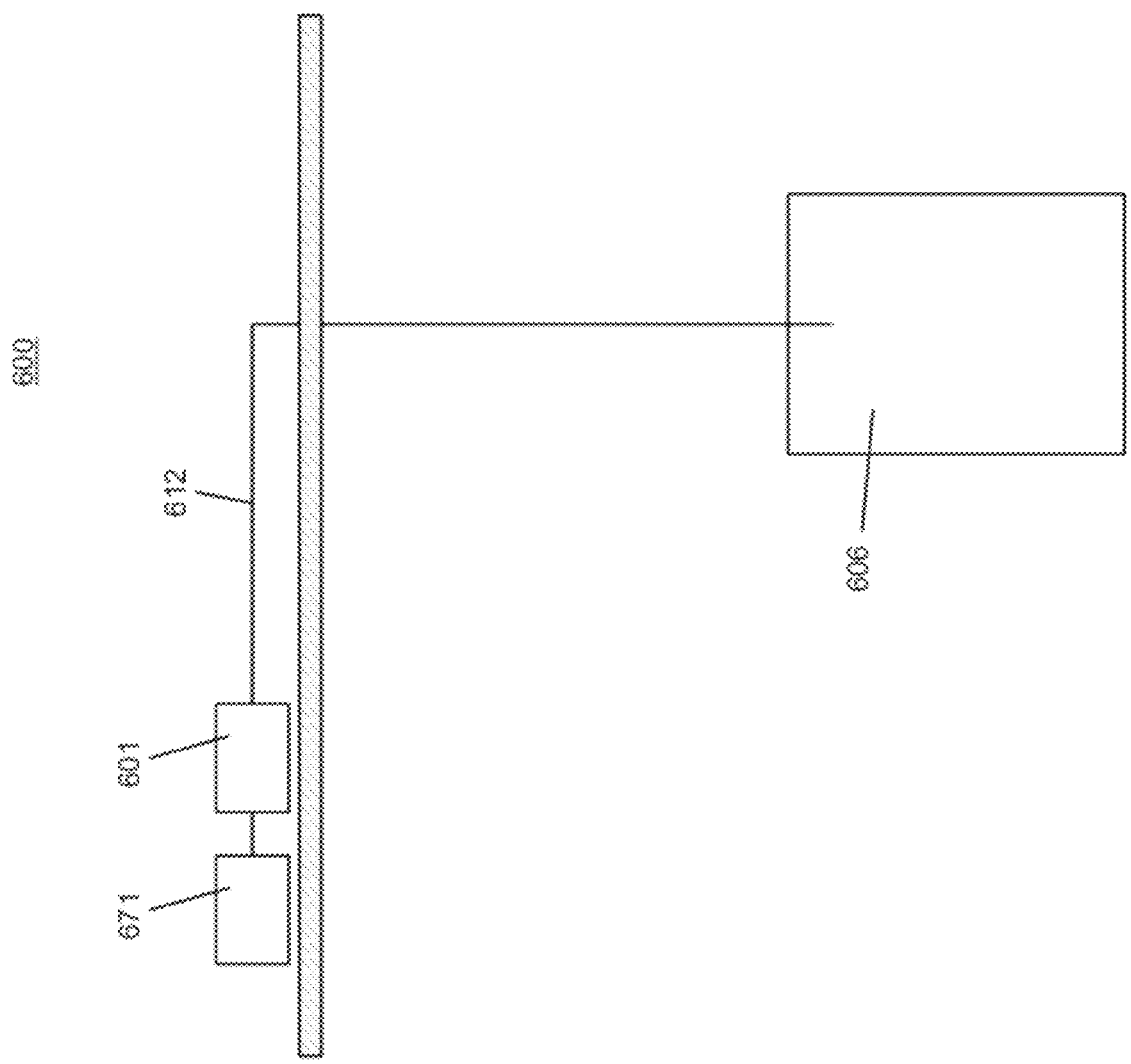

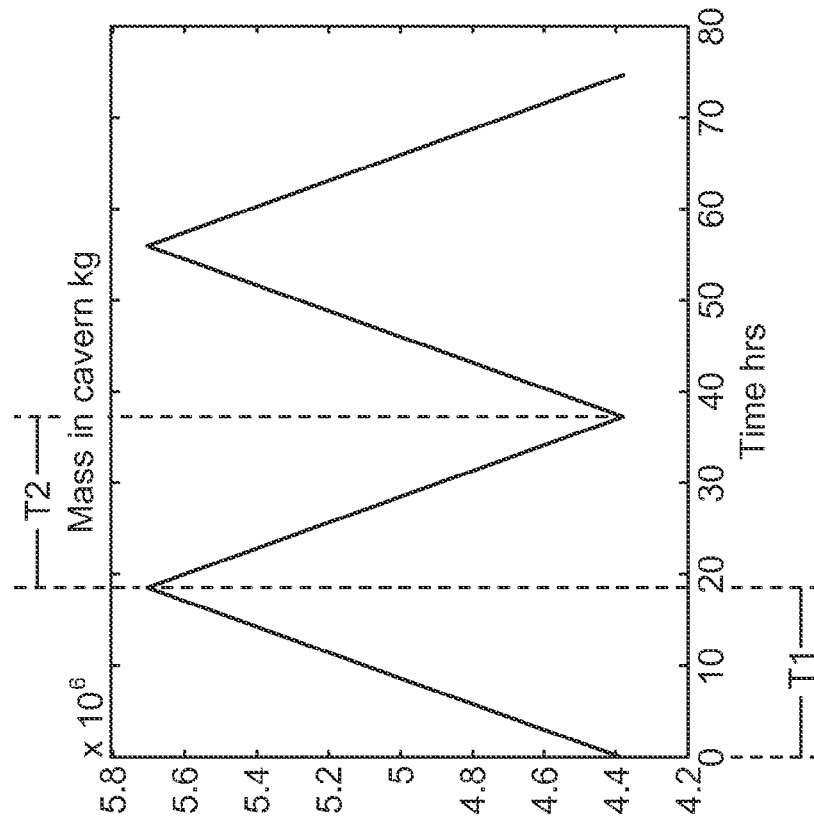
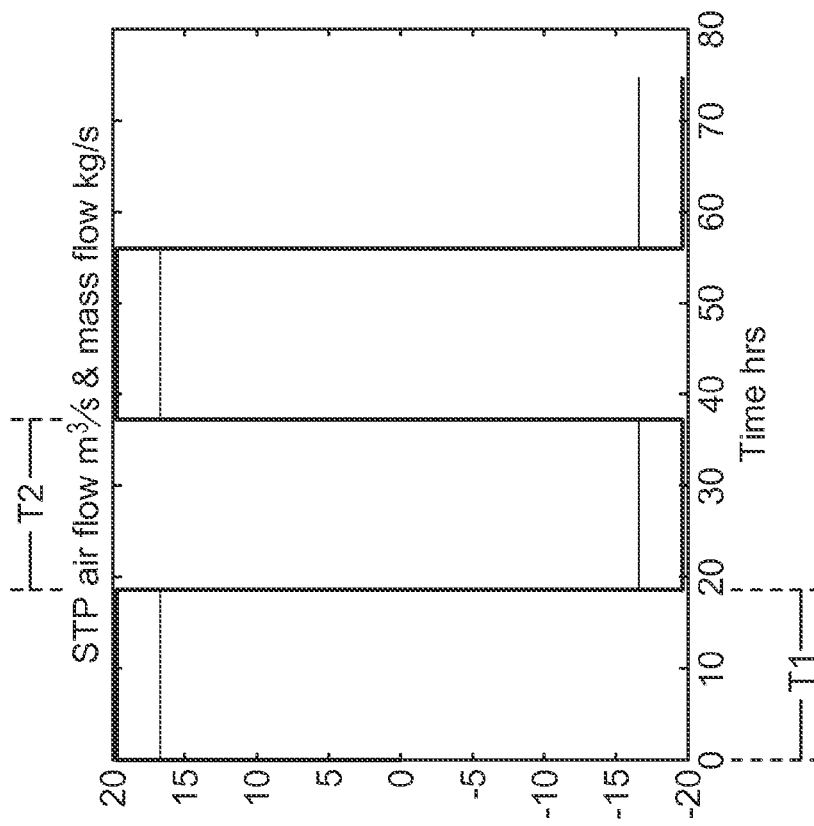
FIG. 8B
FIG. 8A

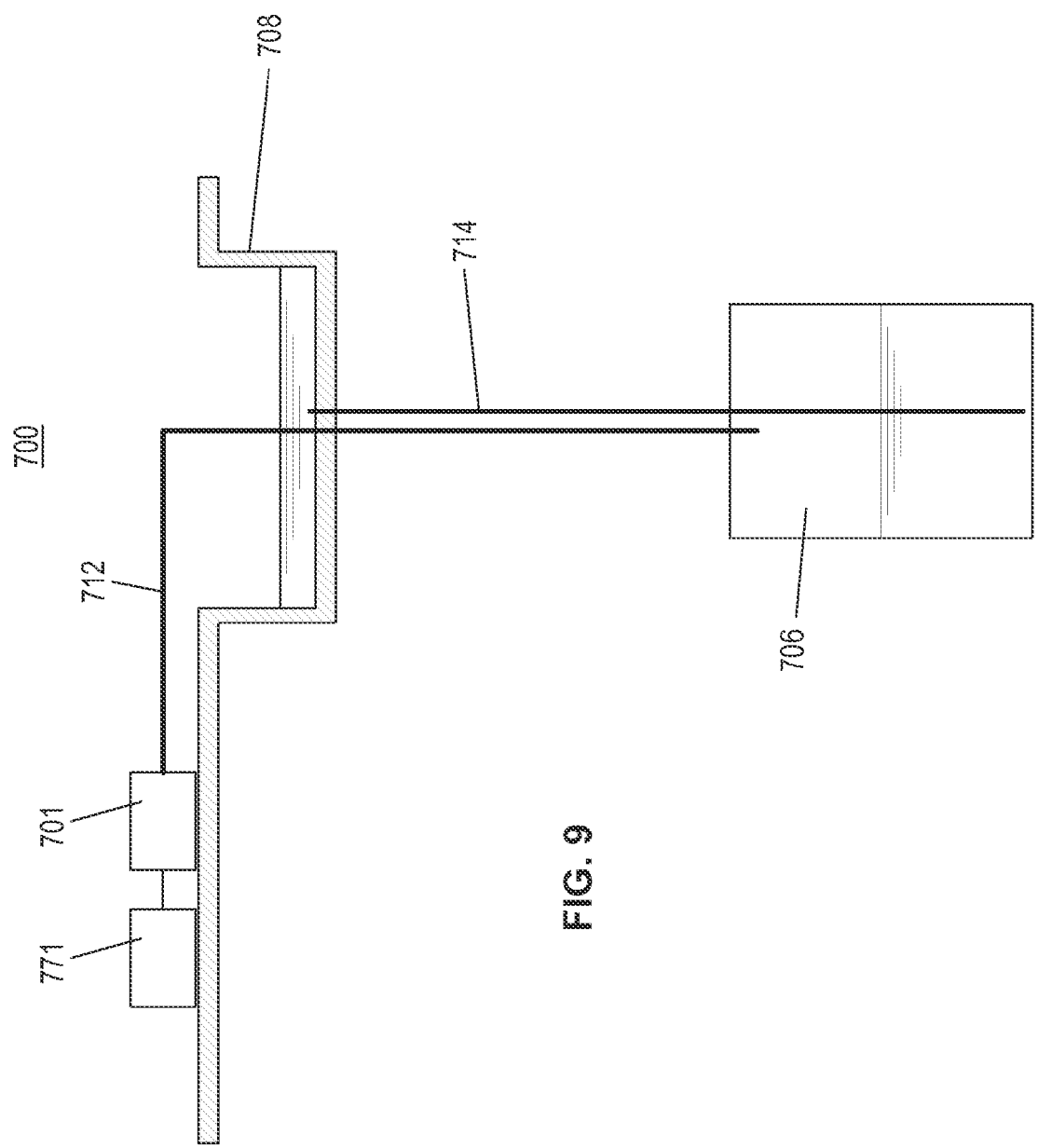

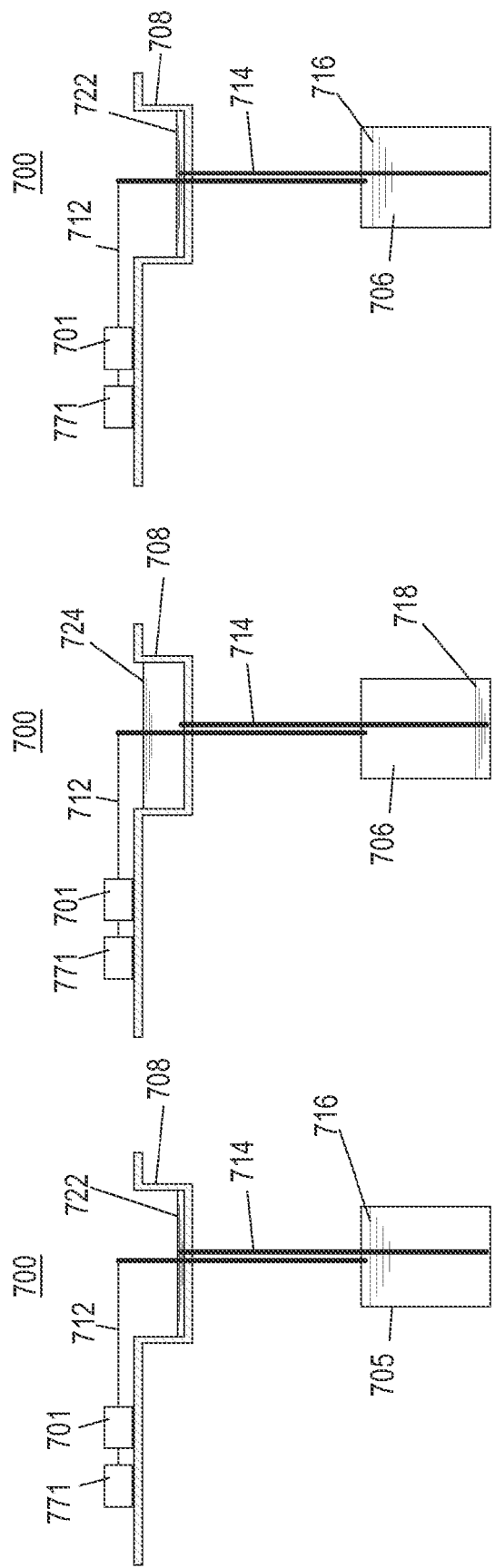

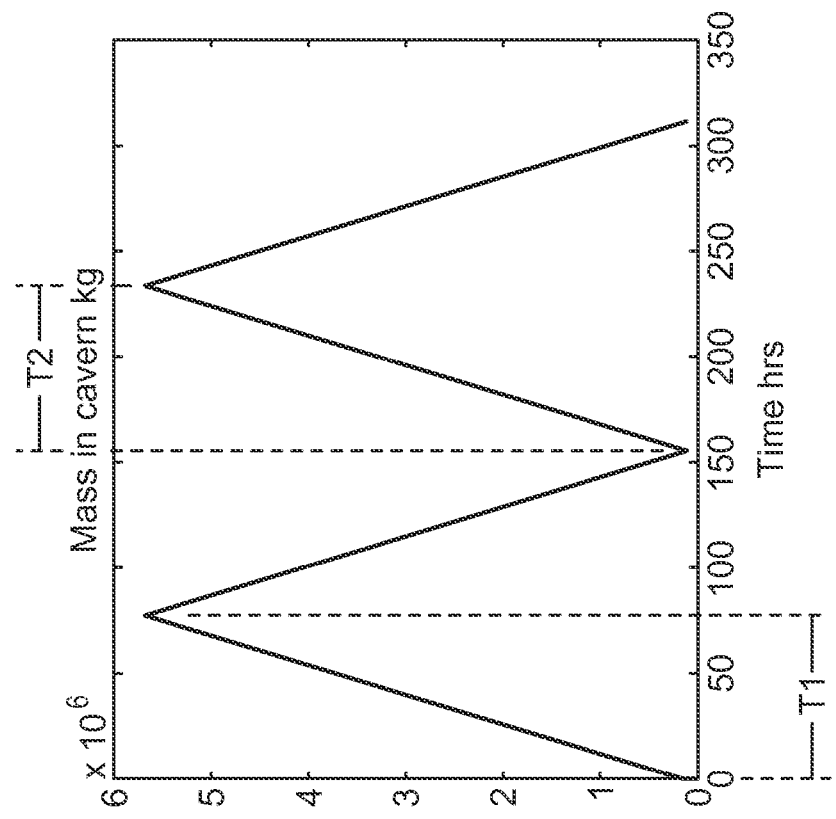
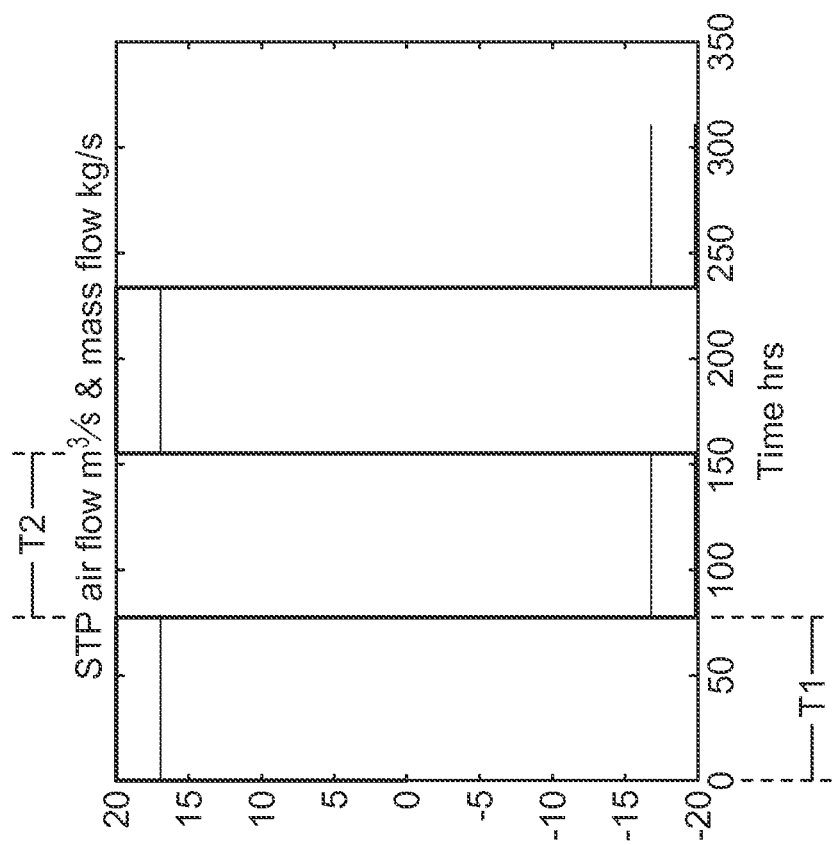
FIG. 13B
FIG. 13A

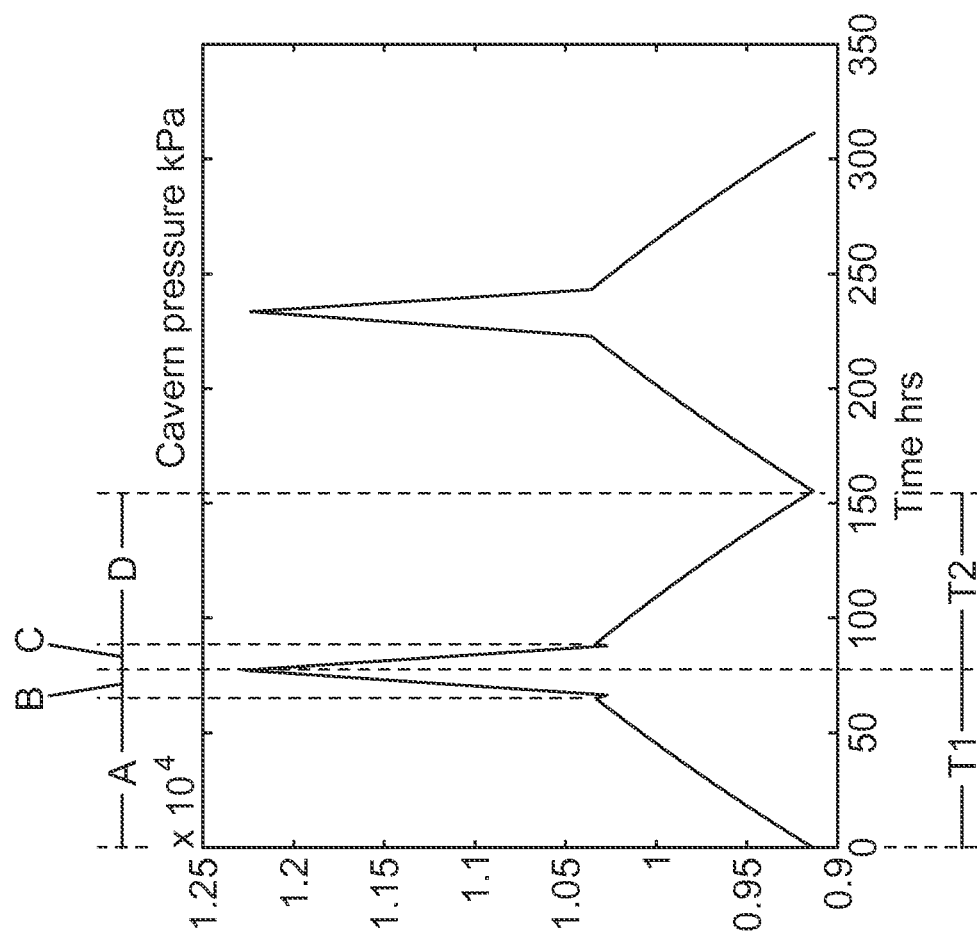

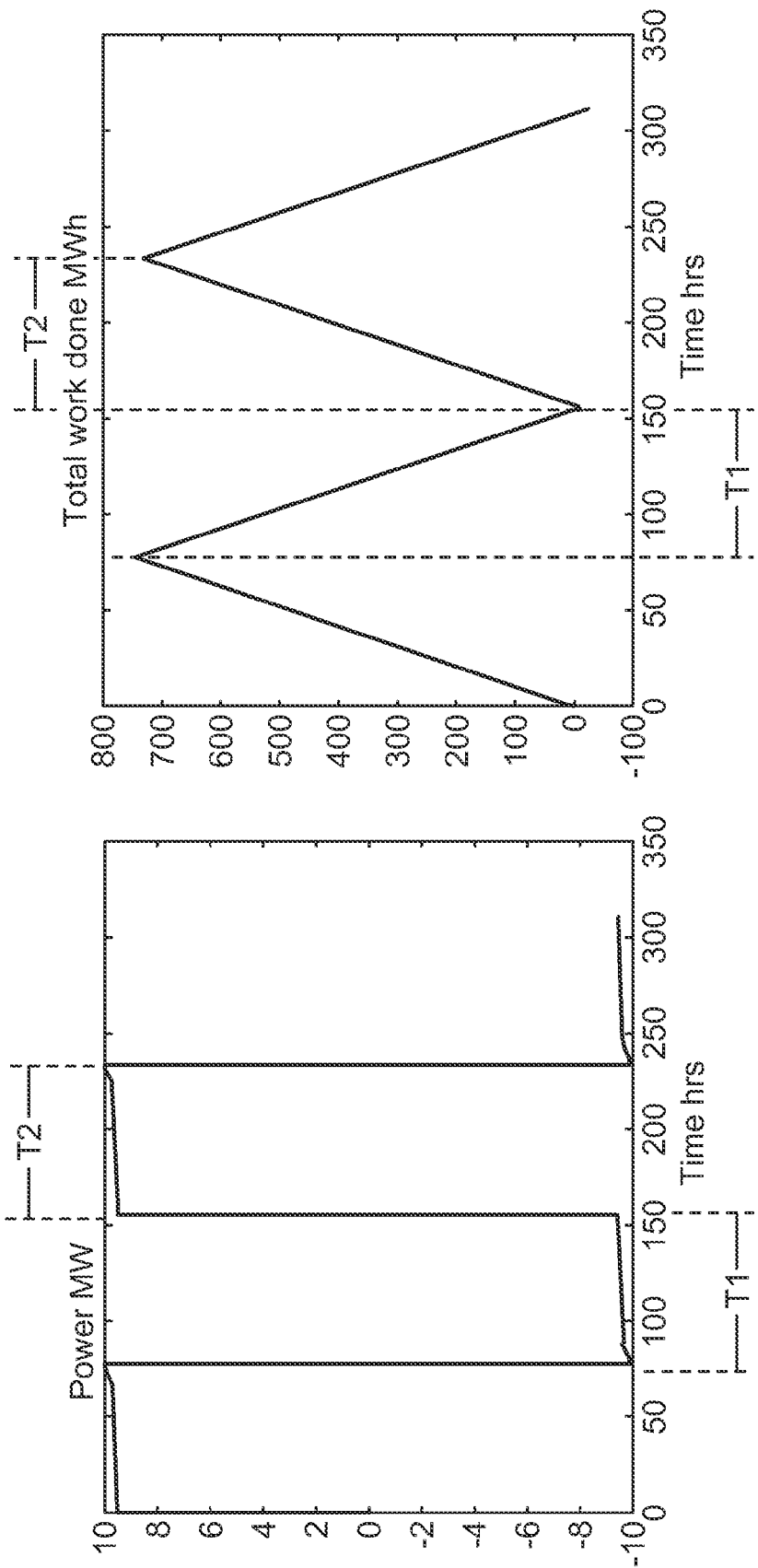

| Chamber | Hydraulic Piston Area | DIR | D1 | D2 | D3 | D4 | D5 | D6 | D7 | - | U1 | U2 | U3 | U4 | U5 | U6 | U7 | U8 |
|---|---|---|---|---|---|---|---|---|---|---|---|---|---|---|---|---|---|---|
| C1 | A1 | Down | P | P | N | N | P | P | P | N | N | N | P | N | P | N | N | P |
| C2 | A2 | Up | N | P | P | N | N | N | P | N | P | P | N | N | P | N | P | P |
| C3 | A3 | Down | P | P | P | P | P | N | N | N | P | N | N | N | N | P | N | P |
| C4 | A4 | Up | P | N | N | N | N | N | N | N | P | P | P | P | P | P | N | P |
| Net Surface Area | A1 < A3<br>A2 < A4<br>Rod 2 < Rod 3 | | A1 + A3 − A4 | A1 − A2 + A3 | A3 − A2 | A3 | A1 + A3 | A1 | A1 − A2 | 0 | − A2 + A3 − A4 | − A2 − A4 | A1 − A2 − A4 | − A4 | A1 − A4 | A3 − A4 | − A2 | A1 − A2 + A3 − A4 |
| Identical cylinders | A1 = A4<br>A2 = A3<br>Rod 2 = Rod 3 | | A3 | A1 | 0 | A3 | A1 + A3 | A1 | A1 − A2 | 0 | − A4 | − A2 − A4 | − A2 | − A4 | 0 | A3 − A4 | − A2 | 0 |

FIG. 14D

COMPENSATED COMPRESSED GAS STORAGE SYSTEMS

CROSS-REFERENCE TO RELATED APPLICATIONS

This application claims priority to and the benefit of U.S. Provisional Patent Application Ser. No. 61/432,904, entitled "Compensated Compressed Gas Storage Systems," filed on Jan. 14, 2011, the disclosure of which is hereby incorporated by reference herein in its entirety.

This application is also related to U.S. patent application Ser. No. 13/294,675, entitled "Systems and Methods for Compressing and/or Expanding a Gas Utilizing a Bi-Directional Piston and Hydraulic Actuator," filed on Nov. 11, 2011, and U.S. patent application Ser. No. 13/294,862, entitled "Systems and Methods for Optimizing Thermal Efficiency of a Compressed Air Energy Storage System," filed on Nov. 11, 2011, the disclosures of which are incorporated herein by reference in their entirety.

BACKGROUND

The invention relates generally to systems, devices and methods for the compression, expansion, and/or storage of a gas, such as air or natural gas, and particularly to systems, devices and methods for optimizing the efficiency of such compression, expansion, and/or storage of air or natural gas, including optimizing the efficiency of controlling the temperature and/or water content of natural gas during such compression, expansion, and/or storage.

Compressed air energy storage systems (CAES) are a known type of system in limited use for storing energy in the form of compressed air. CAES systems may be used to store energy, in the form of compressed air, for example, when electricity demand is low and then to release the energy when demand is high. Such systems include at least one compressor that operates to compress air for storage; and at least one expander (such as an air turbine) that operates to extract power from expansion of the stored, compressed air. Known CAES-type systems for storing energy as compressed air may have a multi-stage compressor that may include intercoolers that cool air between stages of compression and/or aftercoolers that cool air after compression. In such a system, however, the air may still achieve substantial temperatures during each stage of compression, prior to being cooled, which will introduce inefficiencies in the system. Thus, an improvement to known CAES type systems for compressing and/or expanding air is needed, and the applicants have appreciated the improvements needed to benefit gas storage using CAES type systems.

Natural gas providers are subject to fluctuating consumer demand for natural gas. For example, the demand for natural gas may be lower in warmer months and higher in cooler months. During periods of lower demand, natural gas in excess of demand may be burned at a flare, thus wasting this natural resource. During periods of higher demand, natural gas supply may lag behind demand. As such, an energy storage system capable of storing natural gas during periods of low demand for use during periods of high demand may improve overall operating costs and reliability for natural gas suppliers.

Current systems for storing natural gas include filtering the natural gas from a pipeline for dust or small particles, and then measuring the gas for quantity and quality. The natural gas is then either directly injected into a storage chamber, if the pipeline pressure is greater than the chamber pressure, or the natural gas is compressed with conventional compressors and then injected into the storage chamber. Such conventional compressors can include intercoolers and/or aftercoolers to disperse excess heat produced during the compression process.

Natural gas can include water, which may cause corrosion of natural gas distribution pipelines and/or which is in excess of regulatory requirements. As such, the excess water should be removed from the natural gas prior to distribution of the gas through the natural gas distribution pipelines. In some known systems, stored natural gas withdrawn from a storage chamber is expanded to pipeline pressure, processed to ensure pipeline gas quality, metered for quality and volumetric flow, and delivered to a pipeline system. The applicants have appreciated that a natural gas storage system may benefit from a compression and/or expansion system that has improved efficiencies.

Known storage chambers for storing natural gas include depleted natural gas reservoirs, and, to a much lesser extent, salt caverns. Additionally, some CAES systems utilize underground storage caverns to store compressed air. Such known devices and systems that utilize underground storage caverns may require that the storage cavern be maintained at some minimum pressure to prevent damage to and/or collapse of the storage system. For example, in salt cavern storage, one concern is preserving the structural integrity of the cavern. Each cavern may be required to be maintained above a minimum pressure, below a maximum pressure, and/or operated within a maximum high-pressure to low-pressure pressure range. Some guidelines (e.g., cavern operation regulations of the Federal Energy Regulatory Commission and the Texas Railroad Commission) are that the pressure range over which a cavern may be operated is dependent on the depth of the cavern. For example, some caverns have a maximum allowable operating pressure of 0.75 psi per foot of depth of the top of the cavern below the surface and a minimum allowable operation pressure of 0.2 psi per foot of depth of the top of the cavern below the surface. This results in a operational pressure range of 0.55 psi per foot of depth of the top of the cavern below the surface. Thus, a cavern that is 3,000 ft below the surface would have a maximum allowable pressure operation pressure of 2,250 psi, a minimum allowable operation pressure of 600 psi, and an operational pressure range of 1,650 psi. Thus, a minimum quantity of gas (at a given temperature) would need to be maintained in the cavern—removal of too much gas could lead to collapse of the cavern and/or lead to a violation of operation regulations. This requirement of retaining a certain pressure/quantity of stored gas in the cavern limits the effective working capacity of the storage structure. Other caverns may have a maximum allowable operating pressure less than 0.75 psi per foot of depth and/or a minimum allowable operation pressure greater than 0.2 psi per foot of depth and thus, further limiting the effective working capacity of the storage structure. The requirement to maintain a minimum gas pressure, and thus a minimum quantity of gas, in the storage cavern means that a significant quantity of stored gas may not be recovered from the storage cavern, and thus not available for use or sale. Thus, there is a need to improve the storage of compressed gas, and of natural gas in particular.

SUMMARY OF THE INVENTION

Systems, devices and methods for the compression, expansion, and/or storage of a gas, such as air natural gas are described herein. In some embodiments, an apparatus suitable for use in a compressed gas-based energy storage and recovery system includes a pneumatic cylinder having a working piston disposed therein for reciprocating movement in the pneumatic cylinder, a hydraulic actuator coupled to the working piston, and a hydraulic controller fluidically coupleable to the hydraulic actuator. The working piston divides the pneumatic cylinder into a first pneumatic chamber and a second pneumatic chamber. The first pneumatic chamber has a first fluid port and a second fluid port, the first fluid port being fluidically coupleable to a gas source. The second pneumatic chamber has a first fluid port and a second fluid port, the first fluid port being fluidically coupleable to the gas source. The hydraulic controller is operable in a compression mode in which the hydraulic actuator causes gas to be discharged from the pneumatic cylinder at a higher pressure than it enters the pneumatic cylinder from the gas source, and an expansion mode in which gas in the pneumatic cylinder does work on the hydraulic actuator and is discharged from the pneumatic cylinder to the gas source at a lower pressure than it enters the pneumatic cylinder. The apparatus is fluidically coupleable to a compressed gas storage chamber which includes a first storage chamber fluidically coupleable to the second fluid port of the first pneumatic chamber and the second fluid port of the second pneumatic chamber, and a second storage chamber fluidically coupleable to the first storage chamber. The first storage chamber is disposed at a first elevation and is configured to contain a liquid and a gas. The second storage chamber is disposed at a second elevation greater than the first elevation, and is configured to contain a volume of liquid.

In the compression mode, the hydraulic controller can produce a first hydraulic actuator force on the working piston sufficient to move the working piston in a first direction such that a first mass of gas contained in the first pneumatic chamber is discharged from the first pneumatic chamber into the first storage chamber at a first pressure such that a first volume of liquid is displaced from the first storage chamber to the second storage chamber. The hydraulic controller can also produce a second hydraulic actuator force on the working piston in the compression mode sufficient to move the working piston in a second direction, opposite the first direction, such that a second mass of gas contained in the second pneumatic chamber is discharged from the second pneumatic chamber into the first storage chamber at a second pressure greater than the first pressure such that a second volume of liquid is displaced from the first storage chamber to the second storage chamber.

In some embodiments, such systems, devices and methods can be configured to optimize the efficiency of such compression, expansion, and/or storage of natural gas, including efficiently controlling the temperature and/or water content of natural gas during such compression, expansion, and/or storage. In some embodiments, an apparatus suitable for use in a compressed gas-based energy storage and recovery system includes a pneumatic cylinder and a liquid management system. The pneumatic cylinder includes a pneumatic chamber having a first fluid port and a second fluid port. The pneumatic chamber is fluidically coupleable to and configured to receive a first mass of compressed gas from a compressed gas storage chamber via the first fluid port. The pneumatic chamber is configured to permit the first mass of compressed gas to expand therein. The liquid management system is fluidically coupleable to the pneumatic chamber via the second fluid port and is configured to transfer a first volume of liquid from the liquid management system into the pneumatic chamber. The first volume of fluid is configured to dehydrate the first mass of compressed gas in the pneumatic chamber.

BRIEF DESCRIPTION OF THE DRAWINGS

FIG. 7 is a schematic illustration of a compressed gas energy storage system according to an embodiment.

FIGS. 8A-8E are each an example graph illustrating the operation of the compressed gas energy storage system depicted in FIG. 7.

FIG. 9 is a schematic illustration of a compressed gas energy storage system according to an embodiment.

FIGS. 10A-10C are schematic illustrations of the compressed gas energy storage system of FIG. 9, showing a first time period, a second time period, and a third time period, respectively, of a storage cycle.

FIGS. 13A-13G are each an example graph illustrating the operation of the compressed gas energy storage system depicted in FIGS. 12A-12C.

FIG. 14D is a table illustrating various parameters related to implementing multiple different gears shown in FIGS. 14B and 14C.

DETAILED DESCRIPTION

Figure 1:
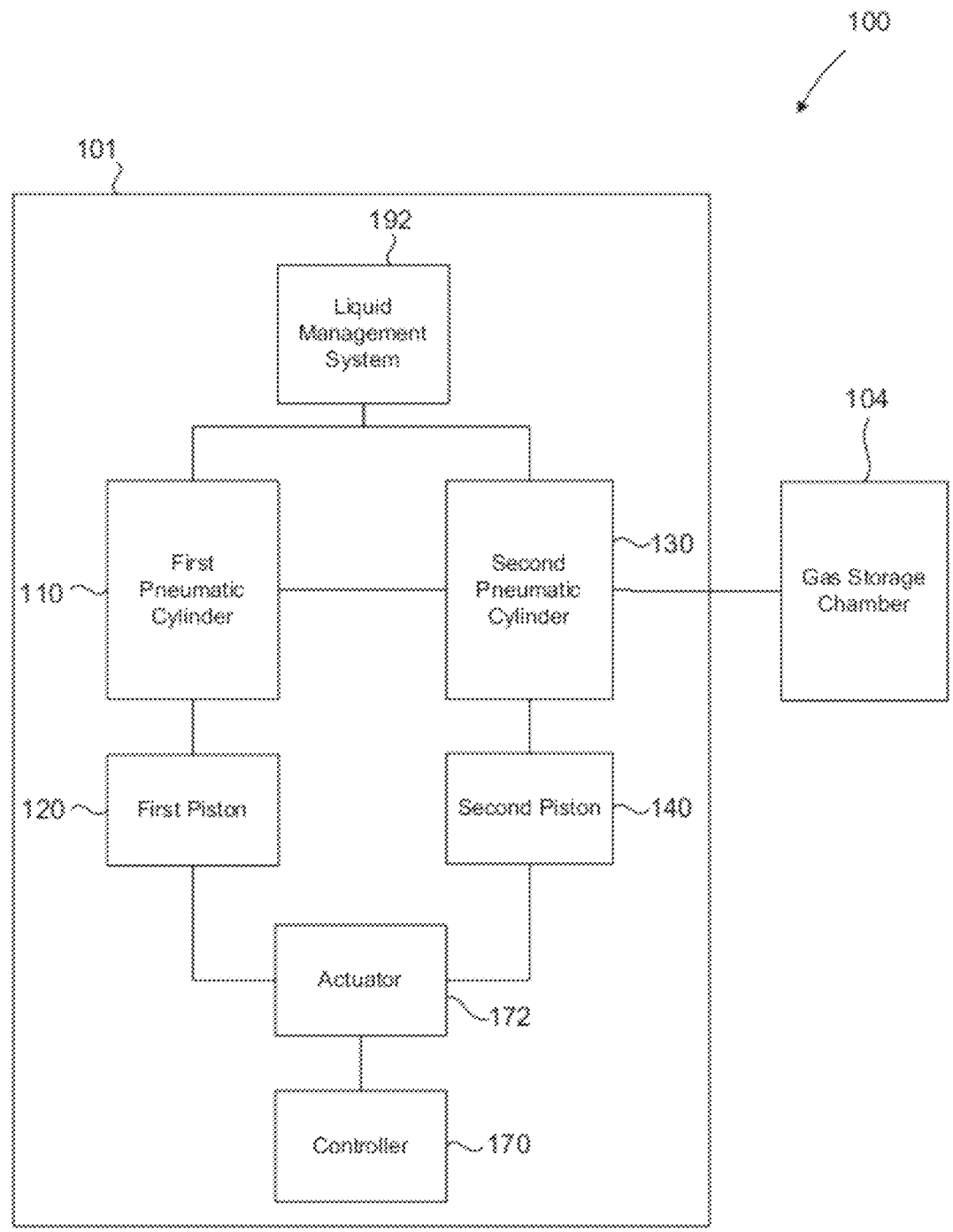
FIG. 1 is a schematic illustration of a compressed gas-based energy storage and recovery system, according to an embodiment.

Systems, devices and methods for optimizing and efficiently operating a gas compression and/or expansion system are disclosed herein. Such systems, devices and methods can be configured for heat transfer during compression and/or expansion, as well as for dehydration of the gas during compression and/or expansion. Also disclosed herein are systems, methods and devices for storing energy in the form of compressed gas, such as natural gas, in underground storage caverns.

The compressed gas energy storage systems can use one or more compressor/expander devices to move (or be moved by)

gas within the system, and systems and methods are described herein to operate the compressed gas energy storage system in its most efficient regime, in a compression mode and/or in an expansion mode. As described herein, in some embodiments, systems and devices can be to used to compress and/or expand a gas, such as natural gas, and/or to pressurize and/or pump a liquid, such as water or glycol.

The compressed gas energy storage systems can include a compressor/expander device having one or more double-acting working pistons movably disposed within a cylinder to compress gas within a working chamber and configured to compress gas when moved in more than one direction. For example, the double-acting piston can be configured to compress gas both when moved in a first direction and when moved in a second direction opposite to the first direction. The gas compression and/or expansion systems can also include one or more double-acting working pistons movably disposed within a cylinder and configured to displace liquid within a working chamber when moved in more than one direction. For example, the double acting piston can be configured to discharge liquid from a first working chamber and draw liquid into a second working chamber when moved in a first direction, and discharge liquid from the second working chamber and draw liquid into the first working chamber when moved in a second direction, opposite the first direction. As used herein the term "piston" is not limited to pistons of circular cross-section, but can include pistons with a cross-section of a triangular, rectangular, or other multi-sided shape. The gas compression and/or expansion systems can be configured for two or more stages of gas compression and/or expansion.

In some embodiments, the double-acting working piston within a gas compression and/or expansion system can be driven by or drive one or more hydraulic actuators. For example, an actuator can move a liquid within a working chamber such that the liquid compresses the gas in the working chamber. Such compression devices and systems are described in U.S. Provisional App. No. 61/216,942 and U.S. Patent Publication Nos. 2011/0061741, 2011/0061836 and 2011/0062166, each entitled "Compressor and/or Expander Device" (collectively referred to as "the Compressor and/or Expander Device applications"), incorporated herein by reference in their entirety. The hydraulic loads applied to the working piston(s) can be varied during a given cycle of the system. For example, by applying hydraulic fluid pressure to different hydraulic pistons, and/or different surfaces of the piston(s) within the hydraulic actuator(s), the ratio of the net working surface area of the hydraulic actuator to the working surface area of the working piston acting on the gas and/or liquid in the working chamber can be varied, and therefore the ratio of the hydraulic fluid pressure to the gas and/or fluid pressure in the working chamber can be varied during a given cycle or stroke of the system. In addition, the number of working pistons/working chambers and hydraulic actuators can be varied, as well as the number of piston area ratio changes within a given cycle.

In some embodiments, an actuator can include one or more pump systems, such as for example, one or more hydraulic pumps that can be use to move one or more fluids within the actuators. The Compressor and/or Expander Device applications, the disclosures of which are incorporated by reference above, describe various energy compression and/or expansion systems in which the systems and methods described herein can be employed.

The hydraulic actuator can be coupleable to a hydraulic pump, which can have efficient operating ranges that can vary as a function of, for example, flow rate and pressure, among other parameters. Systems and methods of operating the hydraulic pumps/motors to allow them to function at an optimal efficiency throughout the stroke or cycle of the gas compression and/or expansion system are described in U.S. patent application Ser. No. 12/977,724 to Ingersoll et al. ("the Ingersoll I application"), entitled "System and Methods for Optimizing Efficiency of a Hydraulically Actuated System," the disclosure of which is incorporated herein by reference in its entirety.

In some embodiments, the devices and systems described herein can be configured for use both as a compressor and as an expansion device. In some embodiments, a compressor/expander device includes a liquid management system configured to efficiently transfer away heat during a compression process and to efficiently transfer in heat during an expansion process. The liquid management system can also be configured to remove water from (i.e., dehydrate) natural gas during the expansion process. For example, the liquid management system can be configured to dehydrate natural gas (e.g., by using glycol, a liquid desiccant dehydrator which has a chemical affinity for water, and/or by using heat stored from a compression process to dry or otherwise dehydrate the natural gas). In some embodiments, the compressor/expander device and/or the liquid management system can be configured to concurrently control the heat transfer between a heat transfer fluid and the gas and to dehydrate the gas (e.g., by using glycol as both the heat transfer fluid and the desiccant).

In some compressed gas energy storage systems a compressor/expander device can be operatively coupled to a storage structure. The storage structure can include a first storage location disposed at a first elevation, the first storage location configured to contain a liquid and a gas. The first storage location is further configured to receive compressed gas from the compressor/expander device and is in fluid communication with a second storage location disposed at a second elevation, the second elevation greater than the first elevation. The second storage location can be configured to contain a volume of liquid such that the volume of liquid contained within the second storage location imparts a hydrostatic pressure on the first storage location. The first and second storage locations are configured to allow at least a portion of the liquid contained in the first storage location to flow from the first storage location to the second storage location as compressed gas is moved into the first storage location from the compressor/expander device. The first and second storage locations are further configured to allow at least a portion of the liquid contained in the second storage location to flow from the second storage location to the first storage location as compressed gas is removed from the first storage location.

In some compressed gas energy storage systems, the second storage location can be elevated relative to a first storage location, and a liquid contained in the second storage location can maintain a pressure and/or range of pressures within the first storage location. As compressed gas is delivered to the first storage location, a portion of the liquid contained in the first storage location is displaced to the second storage location at a higher elevation than the first storage location. Once a desired amount of the liquid has been displaced from the first storage location to the second storage location, the first storage location can be fluidically isolated from the second storage location with, for example, a valve, thus allowing the first storage location to further be pressurized with compressed gas without inducing additional liquid flow from the first storage location to the second storage location. For example, in some embodiments, in may be desirable to move substantially all of the liquid from the first storage location to the second storage location before closing the valve to fluidically isolate the two storage locations. In other embodiments, it may be desirable to only move a portion of the liquid from the first storage location to the second storage location depending on, for example, the capacity of the second storage location or other operational parameters. As compressed gas is removed from the first storage location, a portion of the liquid contained in the second storage location can flow into the first storage location to occupy a volume in the first storage location previously occupied by the mass of the compressed gas that has been removed. In this manner, substantially all of the compressed gas contained in the first storage location can be released from the first storage location and delivered to a compressor/expander device, thus utilizing the entire volume of the cavern for energy storage in the form of compressed gas while maintaining a desired minimum pressure for the gas contained in the first storage location.

In some embodiments, the system can further include a pump/turbine disposed between the first storage location and the second storage location. Compressed gas entering the first storage location displaces a portion of the liquid contained in the first storage location when the pressure of the gas is greater than the pressure head from the liquid in the second storage location. The pump/turbine can be used to move a portion of the liquid contained in the first storage location to the second storage location, thereby, effectively reducing the pressure head from the liquid in the second storage location. The pump/turbine can be used to control the gas pressure in the first storage location independent of the pressure head between the first and second storage locations. Similarly, as liquid flows from the second storage location to the first storage location when compressed gas is being removed from the first storage location, the pump/turbine can be used to generate electricity similar to a pumped-storage hydroelectric system. In other words, pump and/or generator turbine described herein can be used to pump liquid from a first storage location to a second storage location, and can be used to extract energy from the flow of the liquid from the second storage location to the first storage location. Similarly, compressor and/or expander devices can be used to move liquid from a first storage location to a second storage location, and can be used to extract energy from the flow of liquid from the second storage location to the first location, and devices described herein can interact via the first storage location to maintain a pressure and/or range of pressure within the first storage location.

In some embodiments, a method of compressing gas in a compressed gas-based energy storage an recovery system including a gas compressor/expander device described herein and a compressed gas storage chamber described herein can include fluidically isolating a working chamber from a compressed gas storage chamber, moving a working piston in a first direction to reduce the volume of the working chamber and compress a quantity of gas contained therein from a first pressure to a second pressure higher than the first pressure, and establishing fluid communication between the working chamber and the compressed gas storage chamber when the pressure in the second pressure is substantially equal to a storage chamber operating pressure. The method can include establishing fluid communication between a first storage chamber and a second storage chamber of the compressed gas storage chamber, receiving the quantity of gas in the first storage chamber from the working chamber, and displacing a volume of liquid from the first storage chamber to the second storage chamber. In some embodiments, the quantity of gas is a first quantity of gas, and the method includes fluidically isolating the first storage chamber from the second storage chamber and receiving the second quantity of gas in the first storage chamber from the working chamber. The first quantity of gas is received from the working chamber at a first pressure range and the second quantity of gas is received from the working chamber at a second pressure range. The second pressure range can include gas pressures greater than the gas pressures in the first pressure range. In some embodiments, the first storage chamber is disposed at a first elevation and is configured to contain a liquid and a gas, and the second storage chamber, which is fluidically coupleable to the first storage chamber, is disposed at a second elevation greater than the first elevation and is configured to contain a volume of liquid. In such embodiments, the method can include fluidically isolating the first storage chamber from the second storage chamber and receiving the quantity of gas in the first storage chamber from the working chamber.

As used herein, "fluid" can mean a liquid, gas, vapor, suspension, aerosol, or any combination thereof. As used herein, "liquid" can include any suitable liquid fluid including, for example, water, brine (e.g. water substantially partially or completely saturated with salt), and glycol, and "gas" can include any suitable gaseous fluid including, for example, air or natural gas, unless the context clearly indicates otherwise. A power grid can be any local, regional, national, and/or international power grid, grids, or combination of grids. A power source can include any source of power independent of fuel or production method, e.g., solar, wind, fossil fuel, nuclear, etc.

FIG. 1 schematically illustrates a compressed gas-based energy storage and recovery system 100 according to an embodiment. The system includes a compression and/or expansion device 101 (also referred to herein as "compression/expansion device") and a gas storage chamber 104. The compression/expansion device 101 can include one or more pneumatic cylinders 110, 130, one or more pistons 120, 140, at least one actuator 172, a controller 170, and a liquid management system 192. The gas storage chamber 104 is fluidically coupleable to the compression/expansion device 101, for example, to at least one pneumatic cylinder (e.g., cylinder 130) of the device. The gas storage chamber 104 can include one or more storage chambers (not shown in FIG. 1). The compression/expansion device 101 can be used, for example, in a CAES-type system for the compression and/or expansion of natural gas, and the gas storage chamber 104 can be used, for example, for storage of a gas compressed in such a system.

Referring to the compression/expansion device 101, the piston 120 (referred to herein as "first piston") is configured to be at least partially and movably disposed in the first pneumatic cylinder 110. The first piston 120 divides the first pneumatic cylinder 110 into, and defines therewith, a first pneumatic chamber and a second pneumatic chamber (not shown in FIG. 1). The first piston 120 can also be coupled to the actuator 172 via a piston rod (not shown in FIG. 1). The actuator 172 can be, for example, an electric motor or a hydraulically driven actuator such as, for example, the hydraulic actuators described in the Ingersoll I application, incorporated by reference above. The actuator 172 can be used to move the first piston 120 back and forth within the first pneumatic cylinder 110. As the first piston 120 moves back and forth within the first pneumatic cylinder 110, a volume of the first pneumatic chamber and a volume of the second pneumatic chamber will each change. For example, the first piston 120 can be moved between a first position in which the first pneumatic chamber has a volume greater than a volume of the second pneumatic chamber, and a second position in which the second pneumatic chamber has a volume greater than a volume of the first pneumatic chamber.

The piston 140 (referred to herein as "second piston") is configured to be at least partially disposed in the second pneumatic cylinder 130. The second piston divides the second pneumatic cylinder into, and defines therewith, a third pneumatic chamber and a fourth pneumatic chamber (not shown in FIG. 1). The second piston 140 can also be coupled to the actuator 172 via a piston rod (not shown in FIG. 1). The actuator 172 can be used to move the second piston 140 back and forth within the second pneumatic cylinder 130. As the second piston 140 moves back and forth within the second pneumatic cylinder 130, a volume of the third pneumatic chamber and a volume of the fourth pneumatic chamber will each change. For example, the second piston 140 can be moved between a first position in which the third pneumatic chamber has a volume greater than a volume of the fourth pneumatic chamber, and a second position in which the fourth pneumatic chamber has a volume greater than a volume of the third pneumatic chamber.

Each piston 120, 140 can be moved within its respective pneumatic cylinder 110, 130 to compress and/or expand a gas, such as natural gas, within the cylinder. In some embodiments, the compression/expansion device 101 can be configured to be double-acting, in that at least one of the pistons 120, 140 can be actuated in two directions. In other words, the pistons 120, 140 can be actuated to compress and/or expand gas (e.g., natural gas) in two directions. For example, in some embodiments, as the first piston 120 is moved in a first direction, a first volume of gas having a first pressure disposed in the first pneumatic chamber of the first pneumatic cylinder 110 can be compressed by one side of the first piston 120 to a second pressure greater than the first pressure, and a second volume of gas having a third pressure can enter the second pneumatic chamber on the other side of the first piston 120. When the first piston 120 is moved in a second direction opposite the first direction, the second volume of gas within the second pneumatic chamber can be compressed by the first piston 120 to a fourth pressure greater than the third pressure, and simultaneously a third volume of gas can enter the first pneumatic chamber. The second piston 140 can be similarly operable with respect to the third and fourth pneumatic chambers of the second pneumatic cylinder 130.

As such, movement of the first and second pistons 120, 140 (e.g., by the actuator 172) within each of the first and second pneumatic cylinders 110, 130, respectively, can change the volume of the first and second pneumatic chambers and the third and fourth pneumatic chambers, respectively (e.g., by decreasing the volume to compress the gas, by increasing the volume as the gas expands). The controller 170 is configured to control distribution of an input of hydraulic power, which can then be used to drive the actuator 172, such as when the compression/expansion device 101 is operating to compress gas (i.e., a compression mode). The controller 170 can also be configured to control distribution of hydraulic power to a pump/motor (not shown in FIG. 1), where the hydraulic power can be converted into mechanical power, such as when the compression/expansion device 101 is operating to expand a gas (i.e., an expansion mode).

In use, the compression/expansion device 101 operates in the compression mode to compress gas during at least a first stage of compression, in which the gas is compressed to a first pressure greater than an initial pressure, and a second stage of compression, in which the gas is compressed to a second pressure greater than the first pressure. The device 101 is configured to transfer the compressed gas, e.g., at the second pressure, to the gas storage chamber 104. Similarly, for expansion of gas, the gas storage chamber 104 is configured to transfer the compressed gas to the compression/expansion device 101. The compression/expansion device 101 can operate in the expansion mode to expand gas during at least a first stage of expansion, in which the gas is permitted to expand to a first pressure lower than the pressure of the gas in storage, and a second stage of expansion, in which the gas is permitted to expand to a second pressure lower than the first pressure.

Each of the first pneumatic cylinder 110 and second pneumatic cylinder 130 can include one or more inlet/outlet conduits (not shown in FIG. 1) in fluid communication with their respective pneumatic chambers. The pneumatic chambers can contain at various time periods during a compression and/or expansion cycle, a quantity of gas (e.g., natural gas) that can be communicated to and from the pneumatic chambers via the inlet/outlet conduits. The compression/expansion device 101 can also include multiple valves (not shown in FIG. 1) coupled to the inlet/outlet conduits and/or to the pneumatic cylinders 110, 130. The valves can be configured to operatively open and close the fluid communication to and from the pneumatic chambers. Examples of use of such valves are described in more detail in the Compressor and/or Expander Device applications incorporated by reference above.

The liquid management system 192 is configured to control a temperature of gas as it is compressed and/or expanded within the compression/expansion device 101 by selectively introducing a liquid into and/or removing a liquid from the pneumatic cylinders. The liquid can directly or indirectly receive heat energy from, or release heat energy to, gas in the pneumatic cylinders. For example, the liquid management system 192 can be configured to receive heat energy from, and thereby lower the temperature of, the gas when the compression/expansion device 101 is operating in the compression mode. In another example, the liquid management system 192 can be configured to release heat energy to, and thereby increase the temperature of, the gas when the compression/expansion device 101 is operating in the expansion mode. In some embodiments, the liquid management system 192 is configured to store heat energy obtained during the compression mode for use as heat energy to be released during the expansion mode.

The liquid management system 192 is configured to facilitate dehydration of the gas. In some embodiments, the liquid management system 192 can be configured to facilitate dehydration (i.e., removal of water or water vapor) during the compression mode, the expansion mode, or both. For example, the liquid management system 192 can be configured to facilitate dehydration from the gas as a mass of compressed gas is being expanded in the expansion mode. In some embodiments, the liquid introduced by the liquid management system 192 into the pneumatic cylinders with the compressed gas can include a liquid desiccant dehydrator, such as glycol, that is configured to absorb or otherwise draw water or water vapor from the gas. Glycol, as used herein, can refer to glycol, which has a chemical affinity for water, or a glycol-containing solution including glycol as a principal agent, such as diethylene glycol (DEG) or triethylene glycol (TEG). As such, the liquid introduced by the liquid management system 192 into the compression/expansion device 101 can act to dehydrate the gas. This is particularly beneficial when the gas is natural gas, because water can be corrosive to natural gas distribution pipelines. The liquid management system 192 can be configured to dehydrate the gas such that the gas contains the equivalent of no more than about 4 to 7 pounds of water vapor per million standard cubic feet (MMSCF) of natural gas.

In some embodiments, the compression/expansion device 101 can be configured for concurrent or substantially simultaneous gas expansion or compression, heat transfer, and/or dehydration.

The liquid management system 192 can include or otherwise be fluidically coupled to a system (not shown in FIG. 1) for removing water from the dehydrating liquid, as described in more detail with respect to FIGS. 2 and 3 below. For example, the stored heat can be used to pre-warm the dehydrating liquid before the liquid is processed (e.g., boiled) to remove the water absorbed from the gas.

The liquid management system 192 is configured to be coupled to at least one of the first pneumatic cylinder 110 and the second pneumatic cylinder 130. The liquid management system 192 can include one or more fluid inlet/outlet conduits (not shown in FIG. 1) in fluid communication with one or more of the inlet/outlet conduits (not shown in FIG. 1) of the first pneumatic cylinder 110 and/or second pneumatic cylinder 130. The liquid management system 192 can also include multiple valves (not shown in FIG. 1) coupled to the inlet/outlet conduits and/or to one or more chambers (not shown in FIG. 1) of the liquid management system 192. The valves can be configured to operatively open and close the fluid communication to and from the liquid management system 192. Examples of use of such valves are described in more detail in the Compressor and/or Expander Device applications incorporated by reference above.

In some embodiments, the liquid management system can include a lock pump or other device that facilitates movement of liquid into and/or out of the pneumatic cylinders 110, 130 during operation of the compression/expansion device 101. Examples of lock pumps are illustrated and described in detail in U.S. patent application Ser. No. 13/294,862, ("the '862 application"), incorporated by reference above. Examples of devices and methods for optimizing heat transfer within a compression and/or expansion device are described in more detail in the U.S. patent application Ser. No. 12/977,679 to Ingersoll et al. ("the Ingersoll II application"), entitled "Methods and Devices for Optimizing Heat Transfer Within a Compression and Expansion Device," the disclosure of which is incorporated herein by reference in its entirety.

Figure 2:
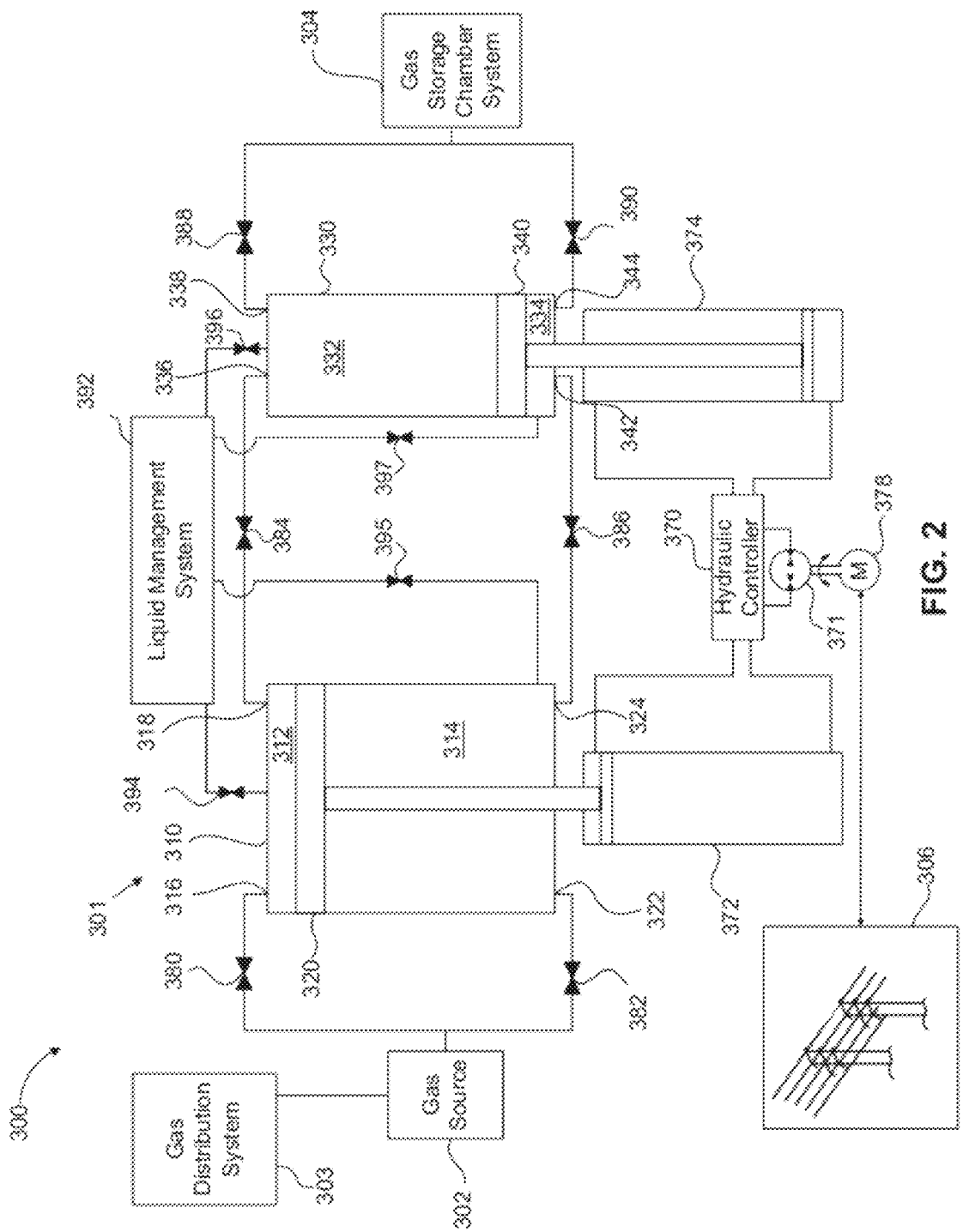
FIG. 2 is a schematic illustration of a compressed gas-based energy storage and recovery system, according to an embodiment.

FIG. 2 is a schematic illustration of an embodiment of an energy storage and recovery system 300 that may be used to both store energy and release energy that has previously been stored and/or that may be used to both compress natural gas for storage and expand natural gas for consumption. A motor/generator 378 converts an input of electrical power, such as from an electric power grid 306, a solar power source (not shown), wind turbines (not shown), or another source, into mechanical power. That mechanical power can then be converted by a hydraulic pump/motor 371 into a hydraulic power. In turn, a hydraulic controller 370 controls distribution of the hydraulic power to drive one or more hydraulic actuators 372, 374 connected to a compression/expansion device 301 of the system 300.

Energy can be stored within the system 300, such as in a compressed gas storage chamber system 304 (also referred to herein as a "storage system"), in the form of compressed gas, which can be expanded at a later time period to release the energy (as well as the gas) previously stored. To store energy, the hydraulic actuators 372, 374 can change the volume of respective pneumatic chambers 312, 314, 332, 334, as described in more detail herein. The reduction in volume compresses a gas contained therein. In some embodiments, for example, the gas is introduced from a pipeline system at a pressure of about 1000 psi. During this process, heat can be removed from the gas. During compression, the gas is delivered to a downstream stage of the compression/expansion device 301 and eventually, at an elevated pressure (e.g., 3,000 psi), to the storage system 304. At a subsequent time, for example, when there is a relatively high demand for the gas (e.g., natural gas), a relatively high demand for power on the power grid 306, and/or when energy prices are high, compressed gas may be communicated from the storage chamber system 304 and expanded through the compression/expansion device 301. Expansion of the compressed gas drives the hydraulic actuators 372, 374, which, in turn, displace fluid to generate hydraulic power. The hydraulic controller 370 directs the hydraulic power to the pump/motor 371, which converts the hydraulic power to mechanical power. In turn, the motor/generator 378 converts the mechanical power to electrical power for delivery to the power grid 306. During this process, heat can be added to the gas, as described in more detail herein. As such, the system 300, when operating in an expansion mode, can be used both to return stored compressed gas (e.g., natural gas) into a pipeline system for distribution or consumption, as well as to generate electrical power via the expansion process for delivery to the power grid 306.

The compression/expansion device 301, as illustrated in FIG. 2, includes a first pneumatic cylinder 310, a second pneumatic cylinder 330, the first hydraulic actuator 372 operatively coupled to the first pneumatic cylinder via a first working piston 320, the second hydraulic actuator 374 operatively coupled to the second pneumatic cylinder via a second working piston 340, and the hydraulic controller 370 operatively coupled to the first and second actuators 372, 374.

The first pneumatic cylinder 310 is configured for a first stage of gas compression. The first pneumatic cylinder 310 has the first working piston 320 disposed therein for reciprocating movement in the first pneumatic cylinder. The first working piston 320 divides the first pneumatic cylinder 310 into, and thereby defines, a first pneumatic chamber 312 and a second pneumatic chamber 314. The first pneumatic cylinder 310 is fluidically coupleable to the gas source. The first pneumatic chamber 312 includes a first fluid port 316 and a second fluid port 318. The second pneumatic chamber 314 includes a first fluid port 322 and a second fluid port 324. The first fluid port 316 of the first pneumatic chamber 312 and the first fluid port 322 of the second pneumatic chamber 314 are each fluidically coupleable to a source of gas 302. The gas source 302 can be, for example, a source of natural gas. For example, the gas source 302 can be included in or otherwise fluidically coupleable to a portion of a gas distribution system 303, such as a natural gas distribution pipeline or system. Gas from the gas source 302 can be introduced into the first pneumatic chamber 312 via a first fluid port 316 of the first pneumatic chamber and into the second pneumatic chamber 314 via a first fluid port 322 of the second pneumatic chamber. Flow of gas between the gas source 302 and the first and second pneumatic chambers 312, 314 can be selectively controlled with valves 380, 382, respectively. In embodiments in which the gas source is included in or otherwise receives gas from a pipeline system for introduction into the pneumatic chambers 312, 314 of the first pneumatic cylinder 310, the gas may be introduced at a pipeline pressure greater than an atmospheric pressure exterior to the first pneumatic cylinder 310. For example, the gas source 302 may introduce gas from a pipeline system to the respective chamber 312, 314 of the first pneumatic cylinder 310 at a pressure of, for example, 1,000 psi, as discussed above.

The second pneumatic cylinder 330 is configured for a second stage of gas compression. The second pneumatic cylinder 330 has the second working piston 340 disposed therein for reciprocating movement in the second pneumatic cylinder. The second working piston 340 divides the second pneumatic cylinder 330 into, and thereby defines, a third pneumatic chamber 332 and a fourth pneumatic chamber 334. The third and fourth pneumatic chambers 332, 334 of the second pneumatic cylinder 330 can have a collective volume less than a collective volume of the first and second pneumatic chambers 312, 314 of the first pneumatic cylinder 310. Additionally, a maximum volume of each of the third and fourth pneumatic chambers 332, 334 is less than a maximum volume of each of the first and second pneumatic chambers 312, 314.

The third pneumatic chamber 332 includes a first fluid port 336 and a second fluid port 338. The fourth pneumatic chamber 334 includes a first fluid port 342 and a second fluid port 344. The second pneumatic cylinder 330 is configured to be fluidically coupleable to the first pneumatic cylinder 310. Specifically, the first fluid port 336 of the third pneumatic chamber 332 is configured to be fluidically coupleable to the second fluid port 318 of the first pneumatic chamber 312. In this manner, gas can be communicated from the first pneumatic chamber 312 via the fluid ports 318, 336 into the third pneumatic chamber 332. Additionally, the first fluid port 342 of the fourth pneumatic chamber 334 is configured to be fluidically coupleable to the second fluid port 324 of the second pneumatic chamber 314. In this manner, gas can be communicated from the second pneumatic chamber 314 via the fluid ports 324, 342 into the fourth pneumatic chamber 334.

The second pneumatic cylinder 330 is configured to be fluidically coupleable to the storage system 304, which is described in more detail below with reference to FIGS. 4A-4B. Specifically, the second fluid port 338 of the third pneumatic chamber 332 is fluidically coupleable to the storage system 304, and the second fluid port 344 of the fourth pneumatic chamber 334 is fluidically coupleable to the storage system 304.

As noted above, each of the first working piston 320 and the second working piston 340 are configured for reciprocating movement in the first pneumatic cylinder 310 and the second pneumatic cylinder 330, respectively. The first working piston 320 is coupled to the first hydraulic actuator 372, and the second working piston 320 is coupled to the second hydraulic actuator 374. The first hydraulic actuator 372 and the second hydraulic actuator 374 are each fluidically coupleable to the hydraulic controller 370.

The hydraulic controller 370 is operable in a compression mode in which gas is discharged from the second pneumatic cylinder 330 to the storage system 304 at a higher pressure than it enters the first pneumatic cylinder 310 from the gas source 302. In the compression mode, the hydraulic controller 370 is configured to produce a hydraulic actuator force via the first hydraulic actuator 372 on the first working piston 320. Such hydraulic actuator force is sufficient to move the first working piston 320 in a first direction such that gas contained in the first pneumatic chamber 312 is discharged from the first pneumatic chamber into the third pneumatic chamber 332. The hydraulic actuator force is also sufficient to move the first working piston 320 in a second direction, opposite the first direction, such that gas contained in the second pneumatic chamber 314 is discharged from the second pneumatic chamber into the fourth pneumatic chamber 334. In the compression mode, the hydraulic controller 370 is also configured to produce a hydraulic actuator force via the second hydraulic actuator 374 on the second working piston 340. Such hydraulic actuator force is sufficient to move the second working piston 340 in a first direction such that gas contained in the third pneumatic chamber 332 is discharged from the third pneumatic chamber into the storage system 304. The hydraulic actuator force is also sufficient to move the second working piston 320 in a second direction, opposite the first direction, such that gas contained in the fourth pneumatic chamber 334 is discharged from the fourth pneumatic chamber into the storage system 304.

The hydraulic controller 370 is also operable in an expansion mode in which gas is discharged from the first pneumatic cylinder 310 to the gas source at a lower pressure than it enters the second pneumatic cylinder 330 from the storage system 304. In the expansion mode, gas can be transferred from the storage system 304 into the second pneumatic cylinder 330, and, when gas expands in at least one of the third pneumatic chamber 332 and the fourth pneumatic chamber 334 of the second pneumatic cylinder 330, the gas exerts a force on the second working piston 340, thereby moving the second working piston in one of the first direction and the second direction. When the second working piston 340 is moved by the expanding gas, the second working piston is configured to produce a hydraulic actuator force via the second hydraulic actuator 374, i.e. to do work on the second hydraulic actuator 374. The hydraulic controller 370 controls distribution of the work done on the hydraulic actuator to the pump/motor 371, where the work can be converted into mechanical power, which can then be converted into electrical power by the motor/generator 378.

Similarly, in the expansion mode, gas can be transferred from the first stage of expansion in the second pneumatic cylinder 330 into the first pneumatic cylinder 310 for a second stage of expansion. When gas expands in at least one of the first pneumatic chamber 312 or the second pneumatic chamber 314 of the first pneumatic cylinder 310, the gas exerts a force on the first working piston 320, thereby moving the first working piston in one of the first direction or the second direction. When the first working piston 320 is moved by the expanding gas, the first working piston 320 is configured to produce a hydraulic actuator force via the first hydraulic actuator 372, i.e. to do work on the first hydraulic actuator 372. The hydraulic controller 370 controls distribution of the work done on the hydraulic actuator to the pump/motor 371, where the work can be converted into mechanical power, which can then be converted into electrical power by the motor/generator 378.

The compression/expansion device 301 can include one or more valves to control the flow of gas between the gas source 302 and the storage system 304. For example, a first valve 380 can be configured to selectively permit the gas to flow between the gas source 302 and the first pneumatic chamber 312. Similarly, a second valve 382 can be configured to selectively permit the gas to flow between the gas source 302 and the second pneumatic chamber 314. A third valve 384 and a fourth valve 386 can be configured to selectively permit the flow of gas between the first pneumatic chamber 312 and the third pneumatic chamber 332 and between the second pneumatic chamber 314 and the fourth pneumatic chamber 334, respectively. A fifth valve 388 is configured to selectively control the flow of gas between the third pneumatic chamber 332 and the storage system 304. Similarly, a sixth valve 390 is configured to selectively control the flow of gas between the fourth pneumatic chamber 334 and the storage system 304.

In use, the energy storage and recovery system 300, and the compression/expansion system 301 particularly, is configured to operate in the compression mode to compress gas for storage. Energy can be harvested (e.g., by solar power, wind turbines, the power grid 306, or other power source, as noted above) and converted by the power source into electric power for delivery to the motor/generator 378. The motor/generator 378 inputs the electrical power into the pump/motor 371 where it is converted into hydraulic power. The hydraulic controller 370 controls distribution, such as using appropriate software and/or a system of valves, of the hydraulic power to actuate each of the first hydraulic actuator 372 and the second hydraulic actuator 374. Upon actuation, the first hydraulic actuator 372 moves the first working piston 320 within the first pneumatic cylinder 310 in the first direction. As the first working piston 320 is moved in the first direction, gas contained in the first pneumatic chamber 312 is discharged from the first pneumatic chamber via its second fluid port 318 into the third pneumatic chamber 332 via its first fluid port 336. Upon actuation, the second hydraulic actuator 374 moves the second working piston 340 within the second pneumatic cylinder 330 in the second direction. As the second working piston 340 is moved in the second direction, gas contained in the fourth pneumatic chamber 334 is discharged from the fourth pneumatic chamber via its second fluid port 344 to the storage system 304.

Upon further actuation of the first hydraulic actuator 372, the first hydraulic actuator 372 moves the first working piston 320 within the first pneumatic cylinder 310 in the second direction. As the first working piston 320 is moved in the second direction, gas contained in the second pneumatic chamber 314 is discharged from the second pneumatic chamber via its second fluid port 324 into the fourth pneumatic chamber 334 via its first fluid port 342. Upon further actuation of the second hydraulic actuator 374, the second hydraulic actuator moves the second working piston 340 within the second pneumatic cylinder 330 in the first direction. As the second working piston 340 is moved in the first direction, gas contained in the third pneumatic chamber 332 is discharged from the third pneumatic chamber via its second fluid port 338 to the storage system 304. In this manner, the second working piston 340 can be characterized as moving out of phase with the first working piston 320. In some embodiments, movement of the first working piston 340 in the first direction is substantially concurrent with movement of the second working piston 320 in the second direction, and vice versa. The compressed gas is then stored in the storage system 304.

In use, the energy storage and recovery system 300, and the compression/expansion system 301 particularly, are also configured to operate in the expansion mode to expand compressed gas (e.g., to generate electrical energy and/or to prepare the gas for consumption). In the expansion mode, compressed gas is permitted to flow from the storage system 304 into the fourth pneumatic chamber 334 of the second pneumatic cylinder 330. As the gas expands in the fourth pneumatic chamber 334, the gas exerts a force on the second working piston 340 to move the second working piston in the first direction, thereby increasing the volume of the fourth pneumatic chamber 334 and decreasing the volume of the third pneumatic chamber 332. Movement of the second working piston 340 in the first direction causes the second hydraulic actuator 374 to displace a first volume of hydraulic fluid. When the second working piston 340 is moved in the first direction, gas contained in the third pneumatic chamber 332 is displaced to the first pneumatic chamber 312. In the first pneumatic chamber 312, the displaced gas expands and exerts a force on the first working piston 320 to move the first working piston in the second direction, thereby increasing the volume of the first pneumatic chamber 312 and decreasing the volume of the second pneumatic chamber 314. Movement of the first working piston 320 in the first direction causes the first hydraulic actuator 372 to displace a second volume of hydraulic fluid. When the first working piston 320 is moved in the second direction, gas contained in the second pneumatic chamber 314 is displaced from the second pneumatic chamber to the gas source 302.

In the expansion mode, gas is also permitted to flow from the storage system 304 into the third pneumatic chamber 332 of the second pneumatic cylinder 330. As the gas expands in the third pneumatic chamber 332, the gas exerts a force on the second working piston 340 to move the second working piston in the second direction, thereby increasing the volume of the third pneumatic chamber 332 and decreasing the volume of the fourth pneumatic chamber 334. Movement of the second working piston 340 in the second direction causes the second hydraulic actuator 374 to displace a third volume of hydraulic fluid. When the second working piston 340 is moved in the second direction, gas contained in the fourth pneumatic chamber 334 is displaced to the second pneumatic chamber 314. In the second pneumatic chamber 314, the displaced gas expands and exerts a force on the first working piston 320 to move the first working piston in the first direction, thereby increasing the volume of the second pneumatic chamber and decreasing the volume of the first pneumatic chamber 312. Movement of the first working piston 320 in the second direction causes the first hydraulic actuator 372 to displace a fourth volume of hydraulic fluid. When the first working piston 320 is moved in the first direction, gas contained in the first pneumatic chamber 312 is displaced from the first pneumatic chamber to the gas source 302.

The displacement of each of the first and third volumes of fluid by the second actuator 374 and of the second and fourth volumes of fluid by the first actuator 372 generates hydraulic power which the hydraulic controller 370 directs to the pump/motor 371, where the hydraulic power is converted to mechanical power. The motor/generator 378 is configured to convert the mechanical power to electrical power, which can be delivered to the electric power grid 306 for consumption.

The device 301 can be similar in many respects to compression/expansion device 101 and includes components similar in many respects to similarly identified components of the device. Additionally, the device 301 is similar in operation to compress and/or expand a gas, as described above with respect to device 100.

The compressor/expander device 301 also includes a liquid management system 392. The liquid management system 392 is fluidically coupleable with the first and second pneumatic chambers 312, 314 of the first pneumatic cylinder 310 and with the third and fourth pneumatic chamber 332, 334 of the second pneumatic cylinder 330. As such, the liquid management system 392 is configured to transfer a heat transfer fluid (e.g., a liquid or a heavy gas) to and/or from each pneumatic chamber 312, 314, 332, 334. Suitable heat transfer fluids include, for example, water or glycol. In some embodiments, the liquid management system 392 can be configured to use the same heat transfer fluid for both the compression and expansion modes. In such embodiments, glycol may be preferable as it can act as a liquid desiccant dehydrator, which is beneficial to remove water from natural gas prior to distribution of natural gas through a pipeline system, as described in more detail below.

Flow of the heat transfer fluid (e.g., water or glycol) between the liquid management system 392 and the first and second pneumatic chambers 312, 314 can be selectively controlled by valves 394, 395, respectively. Flow of the heat transfer fluid between the liquid management system 392 and the third and fourth pneumatic chambers 332, 334 can be selectively controlled by valves 396, 397, respectively. In this manner, the liquid management system 392 is configured to change or otherwise control a temperature of gas as it is compressed and/or expanded within the compression/expansion device 301. For example, the liquid management system 392 can be configured to lower the temperature of the gas, such as when the compression/expansion device 301 is operating in the compression mode, for example, by transferring heat transfer fluid into at least one of the pneumatic chambers 312, 314, 332, 334 such that the heat transfer fluid can cool or otherwise draw heat away from gas contained within the respective pneumatic chamber.

The liquid management system 392 can be configured to store heat drawn away during the compression mode. For example, the heat drawn away by the heat transfer fluid can be held by the heat transfer fluid, e.g., for subsequent use during a gas expansion mode as described in more detail herein. In another example, the heat drawn away by the heat transfer fluid can be transferred to a different fluid or structure configured to retain at least a portion of the heat for a period of time. Because a time period between the compression of gas and the expansion of gas may vary, it is to be expected that some heat loss may occur by the heat transfer fluid or the different fluid or structure during the intervening time period. Additionally, heat loss from the heat transfer fluid or the different fluid or structure may occur based on the storage environment of the heat transfer fluid or heat retention structure. For example, in some embodiments, the heat transfer fluid or the different fluid is stored in an open storage structure (e.g., a pond) when not in use within the system 300. As such, the heat transfer liquid or different liquid may lose heat to the atmosphere above the open storage structure. In other embodiments in which the heat transfer fluid or different fluid is stored in an enclosed storage structure, the heat transfer liquid or different fluid may retain heat longer than in the open storage structure, but still lose some heat to the environment external to the closed storage structure. It can be appreciated, however, that the portion of heat that is retained by the heat transfer liquid or different fluid can be useful during the gas expansion mode as described in more detail herein.

The liquid management system 392 can include a heat exchanger (not shown in FIG. 2 or 3) configured to withdraw the stored heat from the heat transfer fluid and to transfer the heat to the different fluid or other structure. In some embodiments, for example when the heat transfer fluid includes a liquid desiccant dehydrator, described in more detail below, it may be beneficial to store the withdrawn heat in a fluid or other structure different than the heat transfer fluid. For example, in some embodiments, the heat transfer fluid (e.g., glycol) is transferred through or otherwise processed by a heat exchanger configured to withdraw the stored heat from the heat transfer fluid and to transfer the heat to water (i.e., the different fluid) separate from the glycol. In this manner, for example, the heat can be transferred to and stored within water in a pond or other storage structure (whether natural or man-made) fluidically coupleable to the liquid management system 392. The heat exchanger can be configured to withdraw the stored heat from the water (or other fluid or structure) and to transfer the stored heat to the heat transfer fluid, e.g., for subsequent use during a gas expansion mode as described in more detail herein.

In another example, the liquid management system 392 can be configured to increase the temperature of the gas, such as when the compression/expansion device 301 is operating in the expansion mode, for example, by transferring heat transfer fluid into at least one of the pneumatic chambers 312, 314, 332, 334 such that the heat transfer fluid can increase the temperature of gas contained within the respective pneumatic chamber. For example, the liquid management system 392 can be configured to use heat stored during the compression mode (e.g., within the heat transfer fluid, or within the different fluid or structure) for increasing the temperature of the gas during the expansion mode. Examples of devices and methods for optimizing heat transfer within a compression and/or expansion device are described in more detail in the Ingersoll II application, incorporated by reference above.

In another example, the liquid management system 392 can be configured to facilitate dehydration of the gas. The liquid management system 392 can be configured to facilitate dehydration of the gas, for example, when the compression/expansion device 301 is operating in the expansion mode. For example, the liquid management system 392 can transfer a liquid (e.g., the heat transfer fluid) that includes a liquid desiccant dehydrator (e.g., glycol) configured to absorb water or water vapor from the gas (also referred to herein as a dehydration liquid) into at least one of the pneumatic chambers 312, 314, 332, 334 such that the liquid can absorb, or otherwise extract water or water vapor away from the gas within the respective pneumatic chamber. In operation, the liquid contacts the compressed gas within the respective pneumatic chamber 312, 314, 332, 334 and can remove water or water vapor from the compressed gas (e.g., as the compressed gas is being expanded within the respective pneumatic chamber), at least until the liquid reaches a saturation threshold. Once the liquid is effectively saturated with water or water vapor and becomes unable to absorb a further amount of water or water vapor from the gas, the liquid can be transferred out of the pneumatic chamber 312, 314, 332, 334 and regenerated for future use. In this manner, the compression/expansion device 301 can be configured for substantially simultaneous gas expansion, heating, and/or dehydration. Although the liquid management system 392 is described as facilitating dehydration of the gas during the expansion mode, in some embodiments, the liquid management system 392 can be configured to dehydrate the gas during the compression cycle. In some embodiments, the liquid management system 392 is configured to facilitate dehydration of the gas in a similar manner during both the compression cycle and the expansion cycle.

In some embodiments, the liquid management system 392 can use heat stored during the compression mode to facilitate regeneration of the dehydration liquid. For example, the stored heat can be used to pre-warm the dehydration liquid before the liquid is delivered to a water removal system (e.g., that includes boiler(s)) to vaporize the water from the heat transfer fluid/dehydration liquid (e.g., glycol) for removal of water from the heat transfer fluid/dehydration liquid), such as after the heat transfer fluid/dehydration liquid has extracted water from the gas within the respective pneumatic chamber. In this manner, the water removal system (e.g., water removal system 398 described below in reference to FIG. 3) can be more efficiently operated because the heat transfer fluid/dehydration liquid will be at a higher temperature that is closer to the boiling point of water than before the liquid was pre-warmed.

Figure 3:
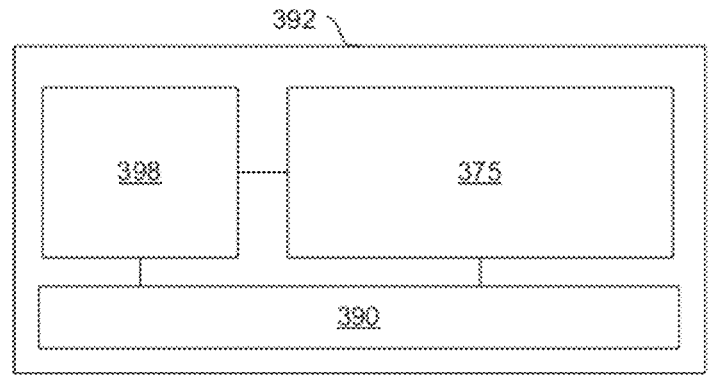
FIG. 3 is a schematic illustration of a liquid management system of the compressed gas-based energy storage and recovery system of FIG. 2.

Referring to FIG. 3, in some embodiments, the liquid management system 392 can include a pump 390, a liquid storage structure 375, and a water removal system, such as a boiler system, 398. The pump 390 is configured to control the flow of the heat transfer fluid (and, if different, the dehydration liquid) within the compressor/expander device 301. The pump 390 can also be configured to control the flow of the heat transfer fluid (and, if different, the dehydration liquid) within the liquid management system 392. Suitable pumps are described in more detail with respect to FIGS. 5A-5G and 6A-6G, and in the '862 application, incorporated by reference above. For example, in some embodiments, the liquid management system 392 is configured to transfer heat transfer fluid to and/or from the pneumatic chambers 312, 314, 332, 334 using a lock pump (not shown in FIG. 3).

The water removal system 398 is configured to remove water or water vapor from the heat transfer fluid (or, if different, the dehydration liquid). For example, the water removal system 398 can include a boiler configured to vaporize water or water vapor from the heat transfer fluid (e.g., glycol). Generally, water has a boiling point of 212 degrees Fahrenheit, while glycol has a boiling point of about 400 degrees Fahrenheit. The water removal system 398 can be configured to accommodate the boiling point differential between water and glycol such that water is easily boiled, or vaporized, from the glycol, while leaving the glycol in liquid form within the liquid management system 392, e.g., for reuse in a subsequent heat transfer and/or dehydration process. The liquid storage structure 375 can be used to store the heat transfer fluid/dehydration liquid, for example, when the liquid is not in use in the device 301, such as following the removal of water from the liquid in the water removal system 398.

Figures 4A, 4B:
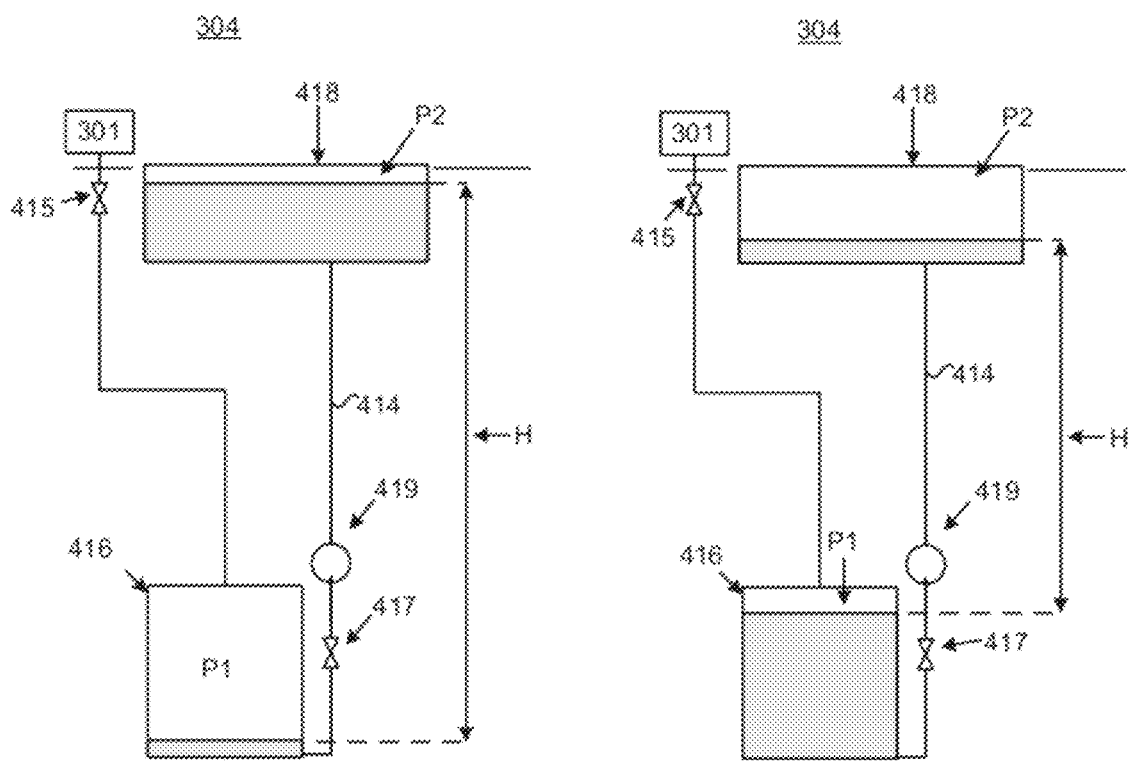
FIGS. 4A-4B are schematic illustrations of a compressed gas storage chamber system of the compressed gas-based energy storage and recovery system of FIG. 2.

FIGS. 4A-4B schematically illustrate the storage system 304 of the energy storage and recovery system 300 and the operation thereof. As noted above, the storage system 304 is fluidically couplable to the compressor/expander device 301. Specifically, the storage system 304 is configured to receive a compressed gas from and deliver a compressed gas to each of the third pneumatic chamber 332 and the fourth pneumatic chamber 334 of the second pneumatic cylinder 330. The storage system 304 can include a first storage chamber 416 configured to contain a liquid and a gas. The first storage chamber 416 is configured to receive compressed gas from (or deliver compressed gas to) the compressor/expander device 301 (e.g., to the third and/or fourth pneumatic chambers 332, 334). The flow of gas between the compressor/expander device 301 and the storage system 304 can be controlled by the opening and closing of valves (e.g., valves 388, 390, shown in FIG. 2). The storage system 304 can also include a second storage chamber 418 fluidly coupled to the first storage chamber 416. In some embodiments, the second storage chamber 418 is elevated with respect to the first storage chamber 416, as shown in FIGS. 4A-4B. The second storage chamber 418 is configured to receive liquid from (or deliver liquid to) the first storage chamber 416.

The first storage chamber 416 can be configured to contain a compressed gas, such as, for example, compressed air for use in a CAES, or a compressed commodity gas, such as natural gas, for storage and/or for use in a CAES-type system. The first storage chamber 416 can be, for example, an underground salt cavern or any other manufactured, natural, or combination manufactured and natural storage at, above, or below ground level. In the embodiment where the first storage chamber 416 is an underground salt cavern, the compressed gas stored in the cavern can impart and maintain a pressure on the walls of the cavern to prevent damage to and/or collapse of the cavern structure.

In some embodiments, the first storage chamber 416 can be configured to contain both the compressed gas and a liquid such as, for example, water or brine (indicated by shading in FIGS. 4A and 4C), at a first elevation. The first storage chamber 416 is configured to be in fluidic communication with the second storage chamber 418, such as via a liquid pathway 414. The second storage chamber 418 can be configured to contain the liquid at a second elevation, different (e.g., higher) than the first elevation. In some embodiments, the second storage chamber 418 can be a natural and/or manufactured pond at or near ground level. In other embodiments, the second storage chamber 418 can be any manufactured, natural, or combination manufactured and natural container disposed at or above the elevation of the first storage chamber 416. The second storage chamber 418 can be open directly to the atmosphere and/or sealed and selectively opened to the atmosphere. In such embodiments, the second storage chamber 418 can be at atmospheric pressure, above or below atmospheric pressure, or can be operated at different pressures depending on a time, and/or a cycle of an operation.

The second storage chamber 418 can be fluidically coupled to the first storage chamber 416 by a suitable conduit, and can be selectively fluidically isolated from the first storage chamber 416 by an isolation valve 417. In some embodiments, a pump/turbine 419 can be disposed between the first storage chamber 416 and the second storage chamber 418. The pump/turbine 19 can be used to move a portion of the liquid contained in the first storage chamber 416 to the second storage chamber 418.

As shown in FIGS. 4A and 4B, there is a difference H in elevation between the surface of the liquid contained in the first storage chamber 416 and the surface of the liquid in the second storage chamber 418. The pressure P1 of the gas in the low storage, the pressure P2 at the surface of the liquid in the high storage, and the height H are related by the following equation (when valve 417 is open or when pump/turbine 419 is inactive or absent):

$$H=(P2-P1)/\rho g$$

Where $\rho$ is the density of the liquid (mass per unit volume) and g is the acceleration due to gravity (length per unit time squared). Thus, for a given pressure P2 at the surface of the liquid in the high storage, and a given difference H in elevation between the surfaces, a pressure P1 of the gas in the low storage will result. Said another way, if a given pressure P1 is generated in the lower storage by operation of the compressor/expander 301, the surface of the liquid in the second storage chamber 418 will be held above the level of the surface of the liquid in the first storage chamber 416 a distance H.

As illustrated in FIGS. 4A and 4B, as the portion of the volume of first storage chamber 416 that is occupied by the compressed gas is changed, the level of the surface of the liquid in the first storage chamber 416 changes, and thus the difference H in elevation also changes. In an embodiment in which the cross-sectional area of second storage chamber 418 is substantially larger than that of first storage chamber 416, then movement of liquid from first storage chamber 416 to second storage chamber 418 will lower the level of the liquid surface in the first storage chamber 416 substantially more than it will raise the level of the liquid surface in the second storage chamber 418. Thus, the liquid stored in the second storage chamber 418 in fluidic communication with the first storage chamber 416 applies a pressure to the gas (and the liquid) in the first storage chamber 416. In the embodiment in which the first storage chamber 416 is an underground salt cavern, the pressurized liquid and gas exerts pressure on the walls of the cavern to maintain the integrity of the cavern structure.

In use during the compression mode, compressed gas can be transferred to the first storage chamber 416 by the compressor/expander 301, thus increasing the quantity of gas in the first storage chamber 416. As the compressor/expander 301 delivers compressed gas to the first storage chamber 416, the pressure within the first storage chamber 416 increases until the pressure reaches a predetermined level and/or substantially equals the pressure of the compressed gas being delivered from the compressor/expander 301. After the pressure within the first storage chamber 416 reaches the predetermined level and/or substantially equals the pressure of the compressed gas delivered from the compressor/expander 301, the liquid can be moved (or "displaced" by the compressed gas) out of the first storage chamber 416 to another fluid storage location such as, for example, the second storage chamber 418 via the liquid pathway 414.

In some embodiments, when the first storage chamber 416 is in fluid communication (e.g., whether constant or selective) with the second storage chamber 418, the transfer of compressed gas from the compressor/expander 301 to the first storage chamber 416 can increase the pressure of the gas in the first storage chamber 416, overcome the pressure head produced by the difference H between the levels of the liquid in the first storage chamber 416 and the second storage chamber 418, displace some of the liquid in first storage chamber 416 to the second storage chamber 418, thus increasing the portion of the volume of first storage chamber 416 that can be occupied by the gas, and increases the difference H (and thus reaches a higher equilibrium level of pressure P1). Continued operation of the compression/expander 301 and thus continued increases in the quantity of gas in the first storage chamber 416, moves liquid out of the first storage chamber 416, and increases pressure P2. The compression/storage process can be continued until a maximum pressure capacity of first storage chamber 416 is reached, and/or a maximum pressure output capacity of compressor/expander 301 is reached. In some embodiments, valve 417 can be closed, which prevents the transfer of liquid from the first storage chamber 416 to the second storage chamber 418. This fixes the portion of the volume of first storage chamber 416 available to be occupied by the gas, and increases the rate at which pressure in low storage increases as a function of the mass flow rate of gas introduced into the first storage chamber 416 by the compressor/expander 301. In this manner, for example, the compressed gas storage chamber can be operable in a first operating mode in which gas discharged from the compressor/expander 301 (e.g., from a pneumatic cylinder) to the first storage chamber 416 displaces liquid from the first storage chamber to the second storage chamber 418, and a second operating mode in which the first storage chamber is fluidically isolated from the second storage chamber (i.e., by valve 417). In some embodiments, in the compression mode, the hydraulic controller can produce a hydraulic actuator force on a working piston of the compressor/expander 301 sufficient to move the working piston in a direction such that a mass of gas is discharged from the pneumatic cylinder into the first storage chamber 416 in the second operating mode.

As noted above, the system 300 can be operated to generate power and/or return natural gas to the distribution system when needed, e.g., during periods of high power demand and/or periods of reduced power supply due to disruptions in the power grid or insufficient wind to drive wind turbines or insufficient sunlight to drive solar generation, or during period of high natural gas demand and/or period of reduced natural gas supply due to disruptions in the pipeline distribution system. Natural gas can be recovered from the storage system 304 for expanding and returning the compressed gas to the gas distribution system 303. Energy can be recovered from the compressed gas stored in the first storage chamber 416 by expanding the gas through the compressor/expander device 301 to drive (directly, or through, for example, a hydraulic actuator and/or hydraulic pump/motor) the motor/generator 378, which converts mechanical power to electric power, supplementing the power supply. Optionally, additional electric power can be generated by directing some of the expanded gas through a gas turbine (not shown), which converts the gas flow into electric power, and/or driving pump/turbine 419 with a flow of liquid from the second storage chamber 418 to the first storage chamber 416.

In use during the expansion mode, the storage system 304 can be operated to deliver compressed gas to the compressor/expander 301. Specifically, the compressed gas is permitted to flow from the first storage chamber 416 to the compressor/expander 301 (e.g., the third or fourth pneumatic chambers 332, 334). In some embodiments, the volume occupied by the compressed gas in the first storage chamber 416 can be maintained constant such that the gas pressure of the compressed air being transferred to the compressor/expander 301 will fall over time. In some embodiments, the volume occupied by the compressed air within the first storage chamber 416 can be decreased by allowing a portion of the liquid stored in the second storage chamber 418 to flow from the second storage chamber 418 into the first storage chamber 416. The flow of liquid from the second storage chamber 418 to the first storage chamber 416 can be managed such that the gas pressure in the first storage chamber 416 remains relatively constant and/or within a predetermined range. Maintaining a relatively constant gas pressure in the first storage chamber 416 can allow a relatively constant pressure air to be delivered to the compressor/expander 301.

In some embodiments, as the liquid flows from the second storage chamber 418 to the first storage chamber 416 via the liquid pathway 414, the liquid can flow through the pump/turbine 419, which can be operated as a hydroelectric generator to produce power and deliver the power to the electric grid.

Although the storage system 304 is illustrated and described herein as including a liquid compensated storage chamber (e.g., storage chamber 416), in other embodiments, the storage system can include a different type of storage chamber, such as a non-liquid pressure compensated storage chamber or a non-pressure compensated chamber.

FIGS. 5A-5G schematically illustrate a compression/expansion device 500 according to an embodiment configured for inclusion in a system for storing energy and for releasing energy that has previously been stored. Specifically, the compression/expansion device 500 is configured to compress gas (e.g., natural gas) for storage and to expand gas (e.g., natural gas) that has previously been compressed. As will be discussed in more detail herein, the device 500 is coupled to a liquid management system 592 that transfers fluid to and from the device 500 during the compression and expansion processes to optimize the thermal efficiency of the device 500 and to streamline processing of the expanded gas for distribution through a distribution or pipeline system, such as gas distribution system 503. The liquid management system 592 can be similar in many respects to the liquid management systems described herein (e.g., liquid management system 192, and liquid management system 392) and includes components similar in many respects to similarly identified components of such systems. The device 500 can be similar in many respects to the compression/expansion devices described herein (e.g., compression/expansion device 101, compression/expansion device 301) and includes components similar in many respects to similarly identified components of such devices. Details regarding the structure and operation of the device 500 are also described in U.S. patent application Ser. No. 13/294,675 ("the '675 application") and the '862 application, each incorporated by reference above.

The device 500 includes a first pneumatic cylinder 510 divided into a first pneumatic chamber 512 and a second pneumatic chamber 514 by a first working pneumatic piston 520. The first working pneumatic piston 520 is coupled to a first hydraulic actuator 572, which is fluidically coupleable to a hydraulic controller 570. The first and second pneumatic chambers 512, 514 of the first pneumatic cylinder 510 are fluidically coupleable to a gas source 502. In a similar manner as described above with respect to the gas source 302, the gas source 502 can be included in or be fluidically coupleable to the gas distribution system 503. The gas distribution system 503, can include, for example, a natural gas pipeline system. In such an embodiment, the gas source 502 can receive natural gas for compression in the compression/expansion device 500 and can deliver natural gas after expansion from the compression/expansion device 500 to the pipeline system. Gas from the gas source can be introduced into the first pneumatic chamber 512 via a first fluid port 516 of the first pneumatic chamber 512 and into the second pneumatic chamber 514 via a first fluid port 522 of the second pneumatic chamber 514. Flow of gas between the gas source 502 and the first and second pneumatic chambers 512, 514 can be selectively controlled with valves 580, 582, respectively.

The first and second pneumatic chambers 512, 514 of the first pneumatic cylinder 510 are each fluidically coupleable to the liquid management system 592, and more particularly, to a lock pump 590 of the liquid management system 592. As will be described in more detail herein, fluid from the lock pump 590 can be introduced into the first pneumatic chamber 512 via a second fluid port 511 of the first pneumatic chamber 512 and into the second pneumatic chamber 514 via a second fluid port 515 of the second pneumatic chamber 514. Flow of fluid between the lock pump 590 and the first and second pneumatic chambers 512, 514 can be selectively controlled with valves 594, 595, respectively.

The device 500 includes a second pneumatic cylinder 530 divided into a third pneumatic chamber 532 and a fourth pneumatic chamber 534 by a second working pneumatic piston 540. The second working pneumatic piston 540 is coupled to a second hydraulic actuator 574, which is fluidically coupleable to the hydraulic controller 570. The third and fourth pneumatic chambers 532, 534 of the second pneumatic cylinder 530 have a collective volume less than a collective volume of the first and second pneumatic chambers 512, 514 of the first pneumatic cylinder 510. Additionally, a maximum volume of each of the third and fourth pneumatic chambers 532, 534 is less than a maximum volume of each of the first and second pneumatic chambers 512, 514.

The first pneumatic chamber 512 is fluidically couplable to the third pneumatic chamber 532. Specifically, fluids can be permitted to flow between a third fluid port 518 of the first pneumatic chamber 512 and a first fluid port 536 of the third pneumatic chamber 532. Fluids can also be permitted to flow between a third fluid port 524 of the second pneumatic chamber 514 and a first fluid port 542 of the fourth pneumatic chamber 534. Flow of fluid between the first and third pneumatic chambers 512, 532 can be selectively controlled with valve 584, and flow of fluid between the second and fourth pneumatic chambers 514, 534 can be selectively controlled with valve 586.

The third and fourth pneumatic chambers 532, 534 are each fluidically coupleable to the lock pump 590 of the liquid management system 592. As will be described in more detail herein, fluid from the lock pump 590 can be introduced into the third pneumatic chamber 532 via a second fluid port 531 of the third pneumatic chamber 532 and into the fourth pneumatic chamber 534 via a second fluid port 535 of the fourth pneumatic chamber 534. Flow of fluid between the lock pump 590 and the third and fourth pneumatic chambers 532, 534 can be selectively controlled with valves 596, 597, respectively.

The third and fourth pneumatic chambers 532, 534 are also each fluidically coupleable to a compressed gas storage chamber system 504 (also referred to herein as "storage system"). Specifically, gas can flow between the third pneumatic chamber 532 via a third fluid port 538 of the third pneumatic chamber 532 and the storage system 504, and between the fourth pneumatic chamber 534 via a third fluid port 545 of the fourth pneumatic chamber 534 and the storage system 504. Flow of gas between the third and fourth pneumatic chambers 532, 534 and the storage system 504 can be selectively controlled with valves 588, 590, respectively. The storage system 504 can be similar in many respects to any compressed gas storage chamber or system described herein (e.g., storage chamber 104, storage system 304). For example, the storage system 504 can be a liquid compensated storage system similar in many respects to storage system 304 discussed above with reference to FIGS. 4A and 4B. As such, the components and operation of storage system 504 are not described in detail with reference to FIGS. 5A-5G or FIGS. 6A-6G.

The liquid management system 592 includes the lock pump 590 and a liquid storage structure 575. The liquid management system 592 can also include or otherwise be fluidically coupleable to a water removal system (not shown in FIGS. 5A-5G or 6A-6G), similar in many respects to the water removal system 398 discussed above with reference to FIG. 3. The lock pump 590 includes a first hydraulic cylinder 550 divided into a first hydraulic chamber 552 and a second hydraulic chamber 554 by a first working hydraulic piston 551. The first working hydraulic piston 551 is coupled to a third hydraulic actuator 576, which is fluidically coupleable to the hydraulic controller 570. The first and second hydraulic chambers 552, 554 of the first hydraulic cylinder 550 are each fluidically coupleable to the liquid storage structure 575. The liquid storage structure 575 can be one or more suitable fluid reservoirs suitable for storing heat transfer fluid, such as, for example, a pond, a pool, a tank, an underground storage vessel, an aboveground storage vessel and/or the like. Fluid (i.e., heat transfer fluid) from the liquid storage structure 575 can be introduced into the first hydraulic chamber 552 via a first fluid port 543 of the first hydraulic chamber 552 and into the second hydraulic chamber 554 via a first fluid port 547 of the second hydraulic chamber 554. Flow of fluid between the liquid storage structure 575 and the first and second hydraulic chambers 552, 554 can be selectively controlled with valves 591, 593, respectively.

The first hydraulic chamber 552 of the first hydraulic cylinder 550 is fluidically coupleable to the first pneumatic chamber 512 of the first pneumatic cylinder 510, and the second hydraulic chamber 554 of the first hydraulic cylinder 550 is fluidically coupleable to the second pneumatic chamber 514 of the first pneumatic cylinder 510. Specifically, fluid can be permitted to flow between a second fluid port 513 of the first hydraulic chamber 552 and the second fluid port 511 of the first pneumatic chamber 512. Fluids can be permitted to flow between a second fluid port 517 of the second hydraulic chamber 554 and the second fluid port 515 of the second pneumatic chamber 514. Flow of fluid between the first hydraulic chamber 552 and the first pneumatic chamber 512 can be selectively controlled with valve 594, and flow of fluid between the second hydraulic chamber 554 and the second pneumatic chamber 514 can be selectively controlled with valve 595.

The lock pump 590 includes a second hydraulic cylinder 560 divided into a third hydraulic chamber 562 and a fourth hydraulic chamber 564 by a second working hydraulic piston 561. The second working hydraulic piston 561 is coupled to the third hydraulic actuator 576. As such, the second working hydraulic piston 561 is operatively coupled to, and moveable with, the first working piston 551. The third and fourth hydraulic chambers 562, 564 of the second hydraulic cylinder 560 are also each fluidically coupleable to the liquid storage structure 575. Fluid from the liquid storage structure 575 can be introduced into the third hydraulic chamber 562 via a first fluid port 527 of the third hydraulic chamber 562 and into the fourth hydraulic chamber 564 via a first fluid port 523 of the fourth hydraulic chamber 564. Flow of fluid between the liquid storage structure 575 and the third and fourth hydraulic chambers 562, 564 can be selectively controlled with valves 598, 599, respectively.

The third hydraulic chamber 562 of the second hydraulic cylinder 560 is fluidically coupleable to the fourth pneumatic chamber 534 of the second pneumatic cylinder 530, and the fourth hydraulic chamber 564 of the second hydraulic cylinder 560 is fluidically coupleable to the third pneumatic chamber 534 of the second pneumatic cylinder 530. Specifically, fluid can be permitted to flow between a second fluid port 537 of the third hydraulic chamber 562 and the second fluid port 535 of the fourth pneumatic chamber 534. Fluids can be permitted to flow between a second fluid port 533 of the fourth hydraulic chamber 564 and the second fluid port 531 of the third pneumatic chamber 532. Flow of fluid between the third hydraulic chamber 562 and the fourth pneumatic chamber 534 can be selectively controlled with valve 597, and flow of fluid between the fourth hydraulic chamber 564 and the third pneumatic chamber 532 can be selectively controlled with valve 596.

Figure 5A:
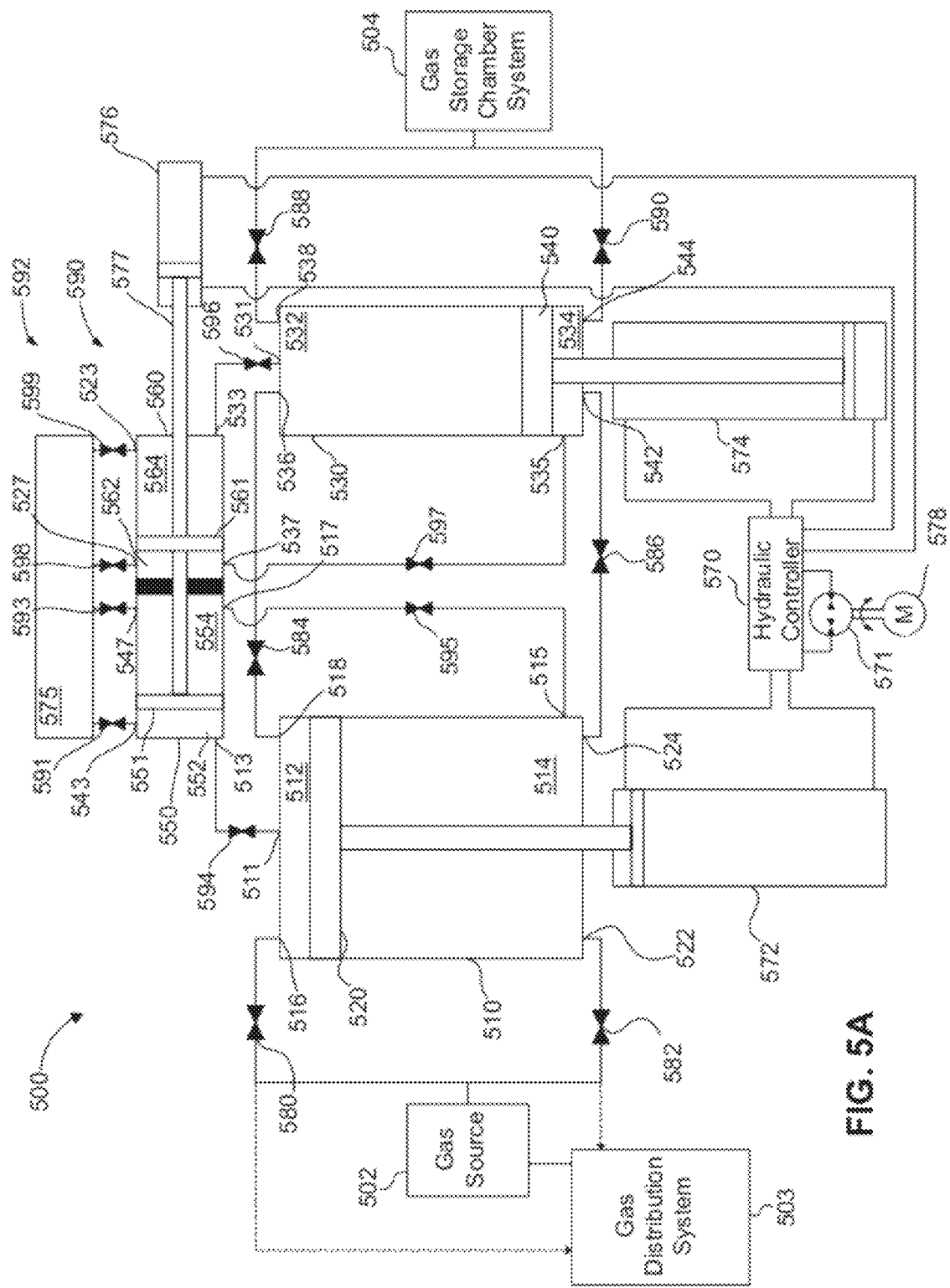
FIGS. 5A-5G are schematic illustrations of a compressed gas-based energy storage and recovery system shown in a first, second, third, fourth, fifth, sixth and seventh configuration, respectively, illustrating a compression cycle according to an embodiment.

Referring to FIGS. 5A-5G, the compression/expansion device 500 is illustrated in first, second, third, fourth, fifth, sixth, and seventh configurations, respectively, of a compression mode or cycle. As shown in FIG. 5A, in the first configuration, each valve 580, 582, 584, 586, 588, 590, 591, 593, 594, 595, 596, 597, 598, 599 is closed. The first working pneumatic piston 520 is in a first (or starting) position at or towards an end of the first pneumatic cylinder 510 such that the volume of the first pneumatic chamber 512 is less than the volume of the second pneumatic chamber 514. In some embodiments, when the first working pneumatic piston 520 is in its first position, the first working piston is disposed within the first pneumatic cylinder 510 such that the volume of the first pneumatic chamber 512 is at or near zero. In other embodiments, the first pneumatic chamber 512 can have a different minimum volume. In some embodiments, a first mass of gas at a first pressure is contained in the second pneumatic chamber 514.

The second working pneumatic piston 540 is in a first (or starting) position at or towards an end of the second pneumatic cylinder 530 such that the volume of the third pneumatic chamber 532 is greater than the volume of the fourth pneumatic chamber 534. In some embodiments, when the second working pneumatic piston 540 is in its first position, the second working pneumatic piston 540 is disposed within the second pneumatic cylinder 530 such that the volume of the fourth pneumatic chamber 534 is at or near zero. In other embodiments, the fourth pneumatic chamber 534 is configured to have a different minimum volume. A second mass of gas at a second pressure is contained in the third pneumatic chamber 534.

The first and second working hydraulic pistons 551, 561 are in a first (or starting) position at or towards an end of their respective hydraulic cylinders 550, 560 such that the volume of the second and fourth hydraulic chambers 554, 564 are greater than the volume of the first and third hydraulic chambers 552, 562. In some embodiments, when the first working hydraulic piston 551 is in its first position, the hydraulic piston 551 is disposed within the first hydraulic cylinder 550 such that the volume of the first hydraulic chamber 552 is at or near zero. In some such embodiments, the second working hydraulic piston 561 is also in its first position and disposed within the second hydraulic cylinder 560 such that the volume of the third hydraulic chamber 562 is at or near zero. In other embodiments, the first hydraulic chamber 552 and/or the third hydraulic chamber 562 are configured to have different minimum volumes. In some embodiments, the hydraulic chambers contain heat transfer fluid, such as glycol.

Figure 5B:
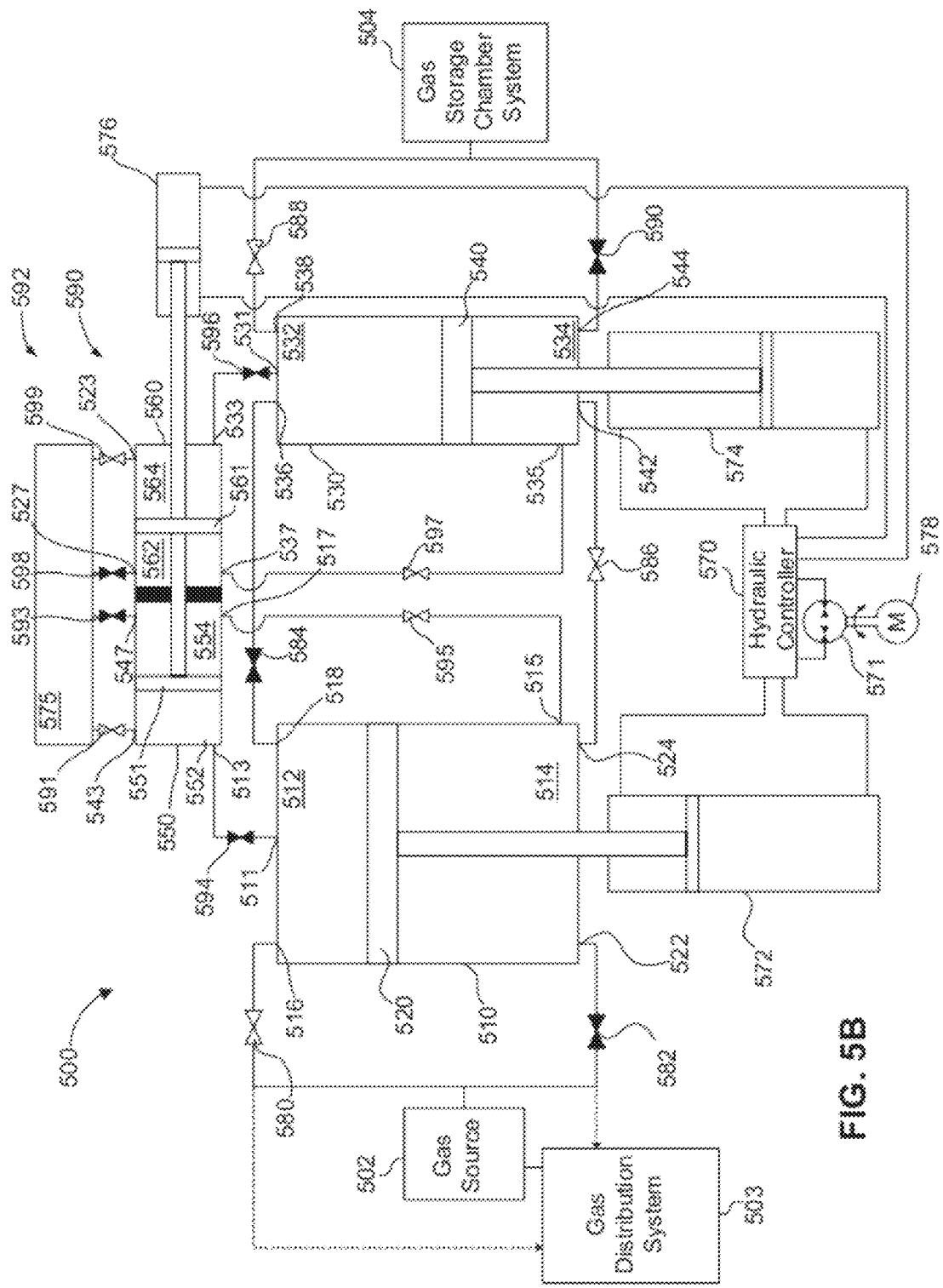

Turning now to FIG. 5B, the valves 580, 586, 588, 591, 595, 597, 599 are opened. At valve 591, the liquid storage structure 575 is fluidically coupled to the first hydraulic chamber 552 such that a first volume of liquid can flow from the liquid storage structure 575 into the first hydraulic chamber 552 via the first fluid port 543. The first working hydraulic piston 551 is moved by the third hydraulic actuator 576 in a first direction towards an opposing end of the first hydraulic cylinder 550, thereby increasing the volume of the first hydraulic chamber 552 and reducing the volume of the second hydraulic chamber 554.

As shown in FIG. 5B, the first working hydraulic piston 551 is in a second position (i.e., a first intermediate position) between its first position and its final, fourth position at or towards the end of the opposing end of the first hydraulic cylinder 550. Movement of the first working hydraulic piston 551 the distance from its first position to its fourth position completes a first stroke of the first working hydraulic piston 551. While moving in the first direction from its first position to its second position, the first working hydraulic piston 551 operates to draw a first volume of liquid from the liquid storage structure 575 into the first hydraulic chamber 552, and discharge a second volume of liquid from the second hydraulic chamber 554 into the second pneumatic chamber 514 of the first pneumatic cylinder 510. In other words, movement of the first working hydraulic piston 551 in the first direction pulls liquid from the liquid storage structure 575 into the first hydraulic chamber 552, and pushes (or forces) liquid out of the second hydraulic chamber 554 and into the second pneumatic chamber 514. The displacement of liquid into and out of the first and second hydraulic chambers 552, 554 can be due, in part, to pressure variances produced by the movement of the first working hydraulic piston 551 in the first direction.

At valve 580, the gas source 502 is fluidically coupled to the first pneumatic chamber 512 such that a third mass of gas at a third pressure can flow from the gas source 502 into the first pneumatic chamber 512 via the first fluid port 516. The first working pneumatic piston 520 is moved by the first hydraulic actuator 572 in a second direction towards an opposing end of the first pneumatic cylinder 510, thereby increasing the volume of the first pneumatic chamber 512 and reducing the volume of the second pneumatic chamber 514.

In FIG. 5B, the first working pneumatic piston 520 is shown in a second position (i.e., a first intermediate position) between its first position and its final, fourth position at or towards the opposing end of the first pneumatic cylinder 510. Movement of the first working piston 520 the distance from its first position to its fourth position completes a first stroke of the first working pneumatic piston 520. Movement of the first working pneumatic piston 520 in the second direction can occur substantially simultaneously with movement of the first working hydraulic piston 551 in the first direction. While moving in the second direction from its first position to its second position, the first working pneumatic piston 520 operates to compress the first mass of gas contained in the second pneumatic chamber 514, such that the first mass of gas is discharged from the second pneumatic chamber 514 to the fourth pneumatic chamber 534 at a fourth pressure higher than the first pressure. The valve 586 between the second pneumatic chamber 514 and the fourth pneumatic chamber 534 is opened when the first working pneumatic piston 520 is moved in its second direction to permit the first mass of gas to be discharged from the second pneumatic chamber 514 to the fourth pneumatic chamber 534 as it is being compressed.

In some embodiments, the second volume of liquid is introduced into the second pneumatic chamber 514 at the same time the first working pneumatic piston 520 is compressing the first mass of gas. The second volume of liquid is preferably a relatively cool or cold liquid that, upon contact with the first mass of gas, cools or lowers the temperature of the first mass of gas. Specifically, when the liquid enters the second pneumatic chamber 514 and contacts the first mass of gas, the heat energy produced during compression of the gas is transferred directly to the liquid. At least a portion of the warmed liquid is then allowed to flow from the second pneumatic chamber 514 to the fourth pneumatic chamber 534 along with the first mass of gas. In some embodiments, the heat energy is transferred to an intermediate structure disposed in the second pneumatic chamber 514. The intermediate structure can be, for example, a heat transfer element as described in the Ingersoll II application, incorporated by reference above. In such embodiments, the heat energy is further transferred from the intermediate structure to the liquid. In some embodiments, the heat from the warmed liquid is transferred to a second liquid (not shown) different than the warmed liquid such that the heat is stored in the second liquid for use during a subsequent expansion cycle. In this manner, the second volume of liquid is returned to a lower temperature and can be reused in the system 500 to absorb heat during a compression cycle.

The second working pneumatic piston 540 is moved by the second hydraulic actuator 574 in a third direction, opposite the second direction, towards an opposing end (or top) of the second pneumatic cylinder 530, thereby increasing the volume of the fourth pneumatic chamber 534 and reducing the volume of the third pneumatic chamber 532. Movement of the second working pneumatic piston 540 in the third direction can occur substantially simultaneously with movement of the first working pneumatic piston 520 in the second direction. The valve 586 between the second pneumatic chamber 514 and the fourth pneumatic chamber 534 can be open while the first hydraulic actuator 572 moves the first working pneumatic piston 520 in the second direction and while the second hydraulic actuator 574 moves the second working pneumatic piston 540 in the third direction. In this manner, the total volume of the second pneumatic chamber 530 and the fourth pneumatic chamber 534 is reduced due, in part, to the difference in size between the first pneumatic cylinder 510 and the second cylinder 530.

In FIG. 5B, the second working pneumatic piston 540 is shown in a second position (i.e., a first intermediate position) between its first position and a final, fourth position at or towards an opposing end of the second pneumatic cylinder 530. Movement of the second working pneumatic piston 540 the distance from its first position to its fourth position completes a first stroke of the second working piston 540.

While moving in the third direction, the second working pneumatic piston 540 operates to compress the second mass of gas contained in the third pneumatic chamber 532, such that the second mass of gas is discharged from the third pneumatic chamber 532 to the storage system 504 at a fifth pressure higher than the second pressure. As discussed above, compression of the second mass of gas results in heat energy being produced. The valve 588 between the third pneumatic chamber 532 and the storage system 504 is opened when the second working pneumatic piston 540 is moving in the third direction to permit the second mass of gas to be discharged from the third pneumatic chamber 532 to the storage system 504 as it is being compressed. In some embodiments, the third pneumatic chamber 532 contains liquid that can absorb the heat energy produced by the second mass of gas during compression so that the second mass of gas is cooled before being discharged from the third pneumatic chamber 532 to the storage system 504.

As shown in FIG. 5B, referring to the lock pump 590, the second working hydraulic piston 561 is in a second position (i.e., a first intermediate position) between its first position and its final, fourth position at or towards the end of the opposing end of the second hydraulic cylinder 560. Movement of the second working hydraulic piston 561 the distance from its first position to its fourth position completes a first stroke of the second working hydraulic piston 561. As discussed above, the second working hydraulic piston 561 is operatively coupled to the first working hydraulic piston 551 such that the first and second working hydraulic pistons 551, 561 move in phase, concurrently with each other. The first and second working hydraulic pistons 551, 561 move in the same direction and simultaneously complete strokes. The third hydraulic actuator 576 need only exert a force on one of the pistons 551, 561 to initiate movement of both of the pistons 551, 561 in a certain direction.

While moving in the first direction from its first position to its second position, the second working hydraulic piston 561 operates to receive a third volume of liquid from the fourth pneumatic chamber 534 into the third hydraulic chamber 562, and discharge a fourth volume of liquid from the fourth hydraulic chamber 564 into the liquid storage structure 575. In other words, movement of the second working hydraulic piston 561 in the first direction allows liquid from the fourth pneumatic chamber 534 to be received into the third hydraulic chamber 562, and pushes (or forces) liquid out of the fourth hydraulic chamber 564 and into the liquid storage structure 575. The displacement of liquid into and out of the third and fourth hydraulic chambers 562, 564 can be due, in part, to pressure differences produced by the movement of the second working hydraulic piston 561 in the first direction. For example, the pressure in the third hydraulic chamber 562 can be greater than the pressure in the fourth pneumatic chamber 534 when the second working hydraulic piston 561 is moved in the first direction, thus displacing the fourth volume of liquid into the liquid storage structure 575. In some embodiments, the lock pump 590 can be located below the pneumatic cylinders 510, 530 such that the third volume of liquid is drawn to the third hydraulic chamber 562 by gravitational forces. In some embodiments, the third volume of liquid includes a portion of the second volume of liquid. In other words, some of the second volume of liquid remains within the fourth pneumatic chamber 534 after the second working hydraulic piston 561 is moved in the first direction. In other embodiments, however, all of the liquid contained within the fourth pneumatic chamber 534 can be transferred to the third hydraulic chamber 562.

Figure 5C:
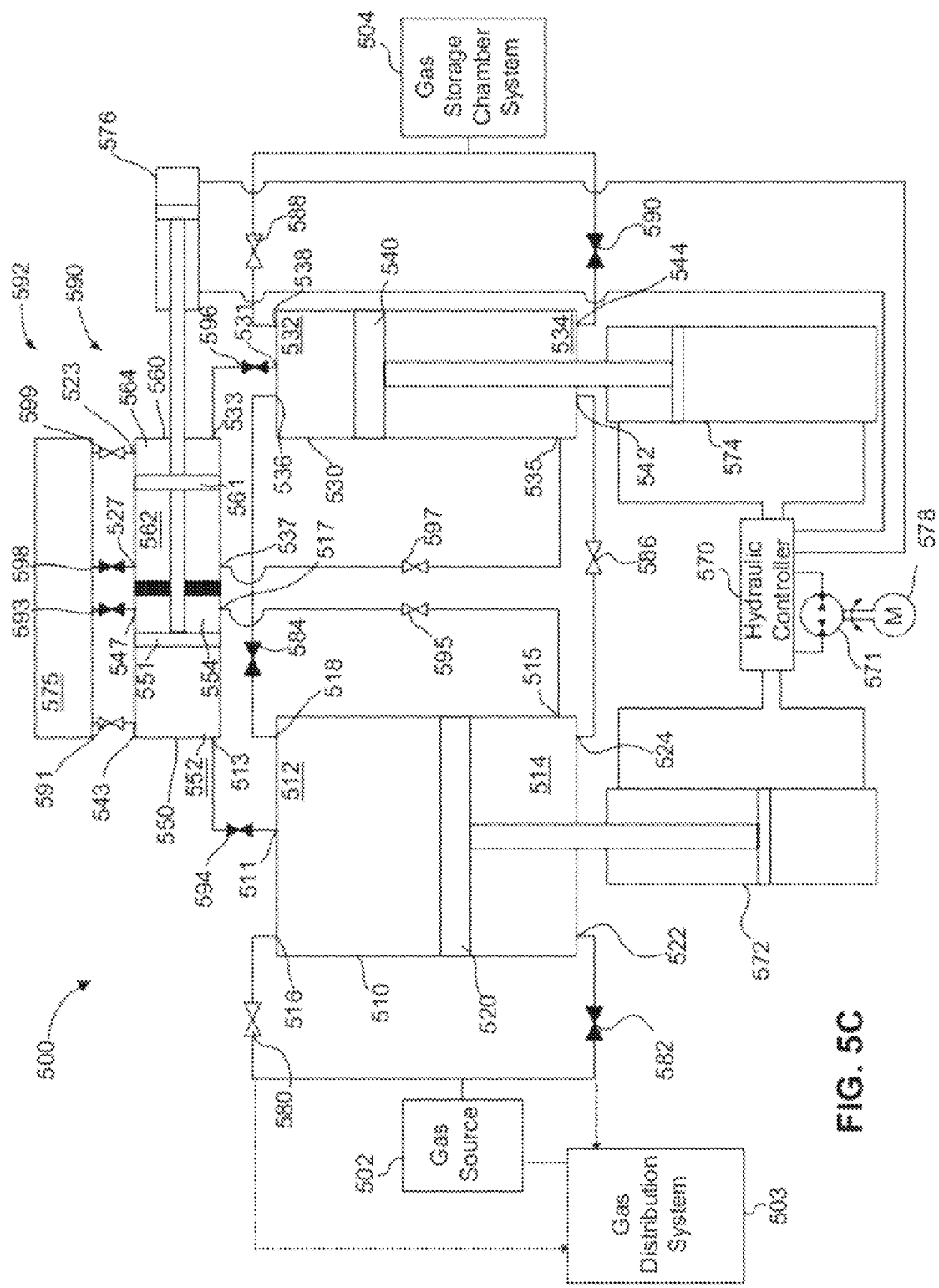

As shown in FIG. 5C, the valves 580, 586, 588, 591, 595, 597, 599 remain open as the pneumatic pistons 520, 540 and the hydraulic pistons 551, 561 continue moving in their respective directions. The first working pneumatic piston 520 is shown in FIG. 5C in a third position (i.e., a second intermediate position), closer to the opposing end of the first pneumatic cylinder 510 than it previously was in the second position (i.e., the first intermediate position). Gas and/or fluid continues to flow into and/or out of the first pneumatic cylinder in the same manner described above with respect to FIG. 5B. The second working pneumatic piston 540 is also shown in FIG. 5C in a third position (i.e., a second intermediate position), closer to the opposing end of the second pneumatic cylinder 530 than it previously was in the second position (i.e., the first intermediate position). Gas and/or fluid also continues to flow into and/or out of the second pneumatic cylinder 530 in the same manner described above with respect to FIG. 5B.

Furthermore, the first and second working hydraulic pistons 551, 561 are shown in FIG. 5C in a third position (i.e., a second intermediate position), closer to the opposing end of the first and second hydraulic cylinders 550, 560, respectively, than they previously were in the second position (i.e., the first intermediate position). The first and second working hydraulic pistons 551, 561 continue to be moved in the first direction by the third hydraulic actuator 576. In some embodiments, the amount of force that the third hydraulic actuator 576 exerts on the first and second working hydraulic pistons 551, 561 to move the first and second working hydraulic pistons 551, 561 is minimal (or nominal). For example, in some embodiments, the third hydraulic actuator 576 only exerts a force sufficient to overcome hydraulic head and frictional losses from fluid flows in the piping. Similarly, valves 586, 595, 597 are all open so the pressures in hydraulic chambers 554 and 562 and pneumatic chambers 514 and 534 are all equal (ignoring head pressure and frictional losses). Thus, with respect to the lock pump 590, the pressure in the second hydraulic chamber 554 is greater than the pressure in the first hydraulic chamber 552 and trying to force the first working hydraulic piston 551 to the left, and the pressure in the third hydraulic chamber 562 is greater than the pressure in the fourth hydraulic chamber 564 and trying to force the second working hydraulic piston 561 to the right. Therefore, the lock pump 590 is balanced and the third hydraulic actuator 576 can be sized such that it only needs to overcome the frictional losses and/or hydraulic head in order to move the volumes of liquid around.

In some embodiments, the fluid pressure within one or more of the hydraulic chambers 552, 554, 562, 564 is sufficient to move the first and second hydraulic pistons 551, 561 in the first direction in lieu of or in conjunction with the third hydraulic actuator 576. More specifically, the fluid pressure that is produced when liquid is introduced into one or more of the chambers 552, 554, 562, 564 can exert a hydraulic force on the first and/or second hydraulic pistons 551, 561 sufficient to move the hydraulic pistons 551, 561. For example, as shown in FIGS. 5B and 5C, the valve 591 between the first hydraulic chamber 552 and the liquid storage structure 575, and the valve 599 between the fourth hydraulic chamber 564 and the liquid storage structure 575 are both in the open position. In an embodiment where the liquid storage structure 575 is a containment pond opened to the atmosphere, the pressure in the first and fourth hydraulic chambers 552, 564 will be equal (e.g., 1 bar).

Similarly, valves 586, 595, 597 are all open so the pressure in the second hydraulic chamber 554, the third hydraulic chamber 562, the second pneumatic chamber 514, and the fourth pneumatic chamber 534 are all substantially equal provided hydraulic head differentials and frictional pressure losses are minimal. Thus, as the pressure increases in the second and fourth pneumatic chambers 514, 534, the pressure increases in the second and third hydraulic chambers 554, 562. The increased pressure in the second hydraulic chamber 554 exerts a force on the first hydraulic working piston 551 in a fourth direction (opposite the first direction) and the increased pressure in the third hydraulic chamber 562 exerts a substantially equal and opposite force on the second hydraulic working piston 561 in the first direction. In some embodiments, this fluid pressure is the primary force acting on the first and second working hydraulic pistons 551, 561 to move the hydraulic pistons 551, 561 and the hydraulic force exerted by the third hydraulic actuator 576 can be a secondary force. In this matter, the lock pump 590 can be considered to be balanced during operation of the liquid management system 592 and the actuator 576 can be sized such that it only needs to overcome any hydraulic head and/or frictional losses in the system in order to move volumes of liquid between the liquid storage structure 575 and the compression/expander device 500. In some embodiments, the hydraulic force exerted by the third hydraulic actuator 576 can be a primary force and the hydraulic fluid pressure exerted by the liquid returning from the compressor/expander device 500 is the secondary force acting on the first and second working hydraulic pistons 551, 561.

Figure 5D:
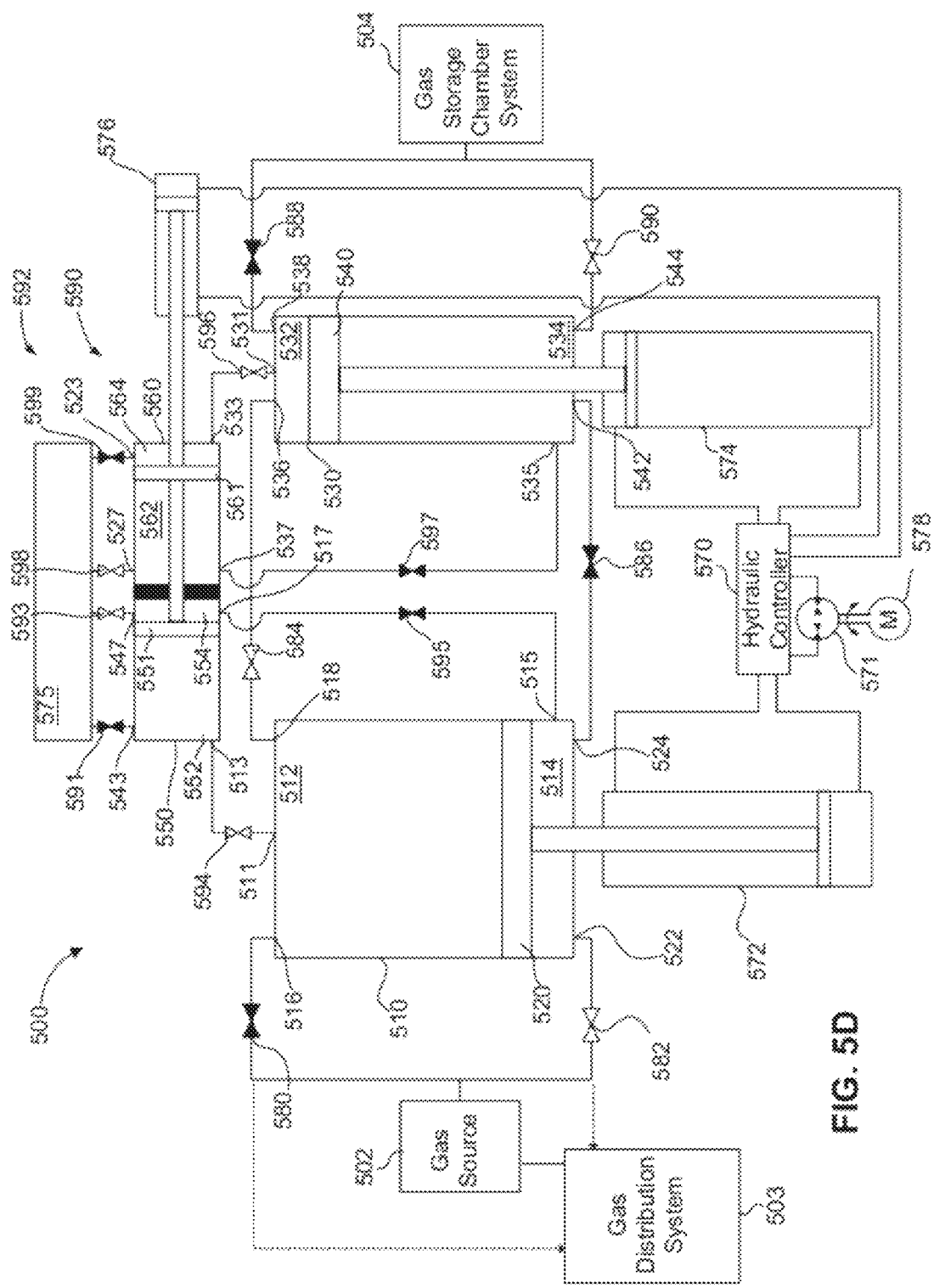

Referring now to FIG. 5D, the previously-opened valves 580, 586, 588, 591, 595, 597, 599 are closed and valves 582, 584, 590, 593, 594, 596, 598 are opened. The first working hydraulic piston 551 has completed its first stroke and is in its fourth position, at or proximate to the opposing end of the first hydraulic cylinder 550. As such, the first working hydraulic piston 551 is in position to begin its second stroke, in which the first working hydraulic piston 551 is moved the distance from its fourth position to its first position. In some embodiments, when the first working hydraulic piston 551 is in its fourth position, the first working hydraulic piston 551 is disposed within the first hydraulic cylinder 550 such that the volume of the second hydraulic chamber 554 is at or near zero. In other embodiments, the second hydraulic chamber 554 is configured to have a different minimum volume.

The second working hydraulic piston 561 has also completed its first stroke and is in its fourth position, at or proximate to the opposing end of the second hydraulic cylinder 560. As such, the second working hydraulic piston 561 is in position to begin its second stroke, in which the second working hydraulic piston 561 is moved the distance from its fourth position to its first position. Here, the first and second working hydraulic pistons 551, 561 move the same distance to complete a stroke. In some embodiments, when the second working hydraulic piston 561 is in its fourth position, the second working hydraulic piston 561 is disposed within the second hydraulic cylinder 560 such that the volume of the fourth hydraulic chamber 564 is at or near zero. In other embodiments, the fourth hydraulic chamber 564 is configured to have a different minimum volume.

In FIG. 5D, the first working pneumatic piston 520 has completed its first stroke and is in its fourth position, at or proximate to the opposing end of the first pneumatic cylinder 510. As such, the first working pneumatic piston 520 is in position to begin its second stroke, in which the first working pneumatic piston 520 is moved the distance from its fourth position to its first position. In some embodiments, when the first working pneumatic piston 520 is in its fourth position, the first working pneumatic piston 520 is disposed within the first pneumatic cylinder 510 such that the volume of the second pneumatic chamber 514 is at or near zero. In other embodiments, the second pneumatic chamber 514 is configured to have a different minimum volume.

The second working pneumatic piston 540 has completed its first stroke and is in its fourth position, at or proximate to the opposing end of the second pneumatic cylinder 530. As such, the second working pneumatic piston 540 is in position to begin its second stroke, in which the second working pneumatic piston 540 is moved the distance from its fourth position to its first position. In some embodiments, when the second working pneumatic piston 540 is in its fourth position, the second working pneumatic piston 540 is disposed within the second pneumatic cylinder 530 such that the volume of the third pneumatic chamber 532 is at or near zero. In other embodiments, the third pneumatic chamber 532 is configured to have a different minimum volume.

Figure 5E:
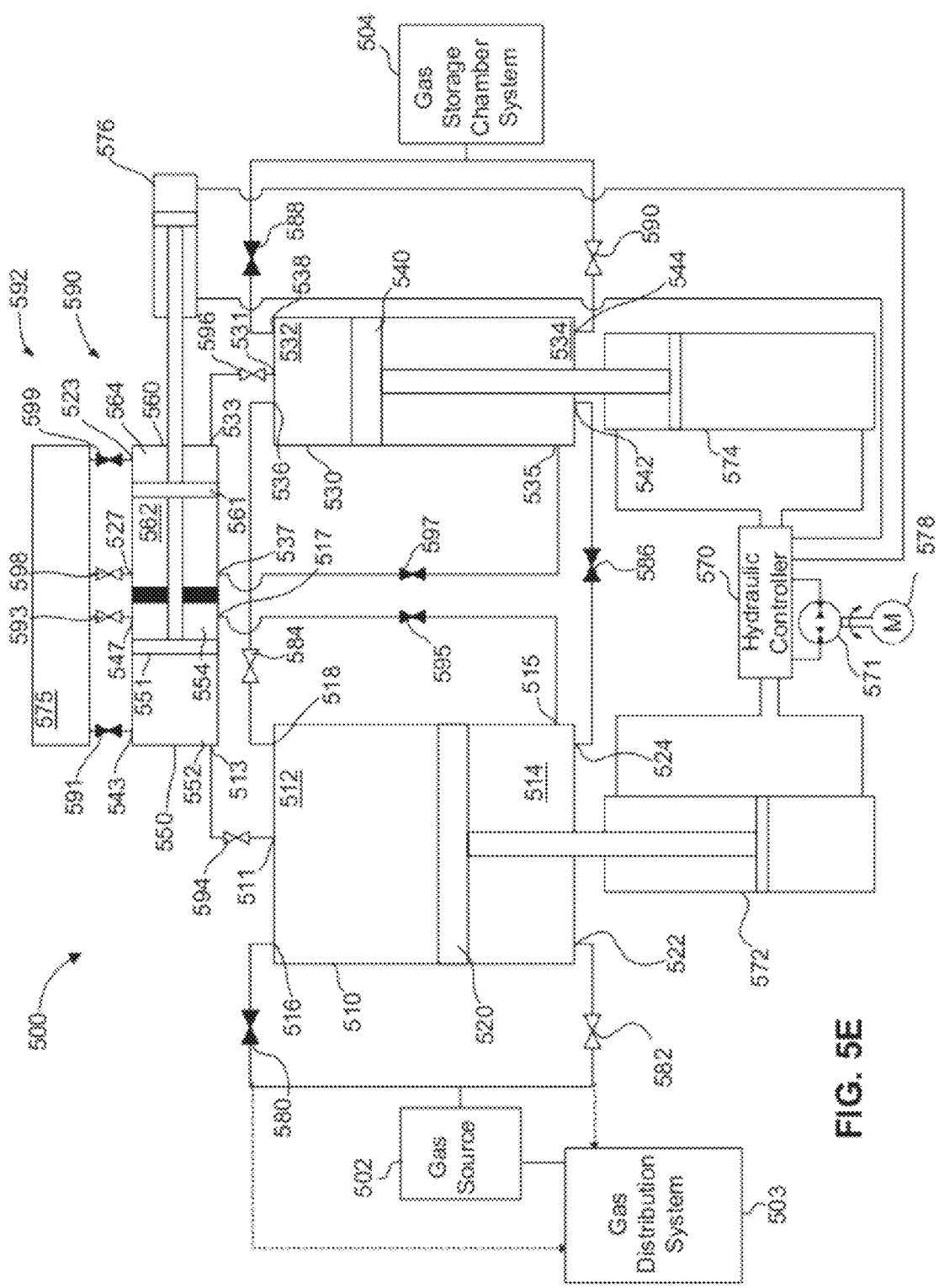

As shown in FIG. 5E, the valves 582, 584, 590, 593, 594, 596, 598 remain open. At valve 593, the liquid storage structure 575 is fluidically coupled to the second hydraulic chamber 554 such that a fifth volume of liquid can flow from the liquid storage structure 575 into the second hydraulic chamber 554 via the first fluid port 547. The first working hydraulic piston 551 is moved by the third hydraulic actuator 576 in a fourth direction, opposite the first direction, towards the opposing end of the first hydraulic cylinder 550, thereby increasing the volume of the second hydraulic chamber 554 and reducing the volume of the first hydraulic chamber 552.

As shown in FIG. 5E, the first working hydraulic piston 551 is in the third position between its fourth position and its first position during its second stroke. While moving in the fourth direction from its fourth position back to its third position, the first working hydraulic piston 551 operates to draw a fifth volume of liquid from the liquid storage structure 575 into the second hydraulic chamber 554, and discharge the first volume of liquid from the first hydraulic chamber 552 into the first pneumatic chamber 512 of the first pneumatic cylinder 510. In other words, movement of the first working hydraulic piston 551 in the fourth direction pulls liquid from the liquid storage structure 575 into the second hydraulic chamber 554, and pushes (or forces) liquid out of the first hydraulic chamber 552 and into the first pneumatic chamber 512.

At valve 582, the gas source 502 is fluidically coupled to the second pneumatic chamber 514 such that gas is permitted to flow from the gas source 502 into the second pneumatic chamber via its first fluid port 522. The first working pneumatic piston 520 is moved by the first hydraulic actuator 572 in the third direction, thereby increasing the volume of the second pneumatic chamber 514 and reducing the volume of the first pneumatic chamber 512. The first working pneumatic piston 520 is shown in its third position during its second stroke. While moving in the third direction, the first working pneumatic piston 520 operates to compress the third mass of gas contained in the first pneumatic chamber 512, thereby discharging the third mass of gas from the first pneumatic chamber 512 and into the third pneumatic chamber 532 at a sixth pressure higher than the third pressure. The valve 584 between the first pneumatic chamber 512 and the third pneumatic chamber 532 can be open while the first hydraulic actuator 572 moves the first working pneumatic piston 520 in the third direction and while the second hydraulic actuator 574 moves the second working pneumatic piston 540 in the second direction. In this manner, the total volume of the first pneumatic chamber 512 and the third pneumatic chamber 532 is reduced due, in part, to the difference in size between the first pneumatic cylinder 510 and the second cylinder 530.

Compression of the third mass of gas produces heat energy and, as a result, the temperature of the third mass of gas rises unless that heat energy is removed from the gas during the compression process. In some embodiments, the first volume of liquid is introduced into the first pneumatic chamber 512 as the third mass of gas is being compressed. The temperature of the liquid is relatively cooler than the temperature of the gas and, upon contact with the third mass of gas, cools or lowers the temperature of the gas. Said another way, heat energy produced by the third mass of gas is transferred directly to the first volume of liquid when the liquid contacts the gas. At least a portion of the warmed liquid is then allowed to flow from the first pneumatic chamber 512 to the third pneumatic chamber 532 along with the third mass of gas. In some embodiments, the heat energy is transferred to an intermediate structure disposed in the first pneumatic chamber 512. The intermediate structure can be, for example, a heat transfer element as described in the Ingersoll II application, incorporated by reference above. In such embodiments, the heat energy is further transferred from the intermediate structure to the liquid. In some embodiments, the heat from the warmed liquid is transferred to a second liquid (not shown; e.g., via a heat exchange system) different than the warmed liquid such that the heat is stored in the second liquid for use during a subsequent expansion cycle. In this manner, the first volume of liquid is returned to a lower temperature and can be reused in the system 500 to absorb heat during a compression cycle.

The second working pneumatic piston 540 is moved by the second hydraulic actuator 574 in the second direction, thereby increasing the volume of the third pneumatic chamber 532 and reducing the volume of the fourth pneumatic chamber 534. Movement of the second working pneumatic piston 540 in the second direction can occur substantially simultaneously with movement of the first working pneumatic piston 520 in the third direction. In FIG. 5E, the second working pneumatic piston 540 is shown in its third position during its second stroke. While moving in the second direction, the second working pneumatic piston 540 operates to compress the first mass of gas contained in the fourth pneumatic chamber 534, thereby discharging the first mass of gas from the fourth pneumatic chamber 534 to the storage system 504 a seventh pressure higher than the fourth pressure.

As discussed above, compression of the first mass of gas results in heat energy being produced. The valve 590 between the fourth pneumatic chamber 534 and the storage system 504 is opened when the second working pneumatic piston 540 is moving in the second direction to allow the first mass of gas to be discharged from the fourth pneumatic chamber 534 to the storage system 504 as it is being compressed. In some embodiments, the fourth pneumatic chamber 534 contains liquid that can absorb the heat energy produced by the first mass of gas during compression so that the first mass of gas is cooled before being discharged from the fourth pneumatic chamber 534 to the storage system 504.

As shown in FIG. 5E, the second working hydraulic piston 561 is in the third position during its second stroke. As discussed above, the second working hydraulic piston 561 moves with the first working hydraulic piston 551. Here, the second working hydraulic piston 561 moves in the fourth direction with the first working hydraulic piston 551. While moving in the fourth direction from its fourth position to its third position, the second working hydraulic piston 561 operates to draw a sixth volume of liquid (e.g., including at least a portion of the first volume of liquid) from the third pneumatic chamber 532 into the fourth hydraulic chamber 564, and discharge the third volume of liquid (e.g., including at least a portion of the second volume of liquid) from the third hydraulic chamber 562 into the liquid storage structure 575. In other words, movement of the second working hydraulic piston 561 in the fourth direction pulls liquid from the third pneumatic chamber 532 into the fourth hydraulic chamber 564, and pushes (or forces) liquid out of the third hydraulic chamber 562 and into the liquid storage structure 575. In some embodiments, at least a portion of the first volume of liquid can remain within the third pneumatic chamber 532 after the second working hydraulic piston 561 has completed its second stroke in the fourth direction. In this manner, the remaining portion of the first volume of liquid can be used to cool gas that enters the third pneumatic chamber 532 during the next compression cycle. In other embodiments, the first volume of liquid is removed from the third pneumatic chamber 532 completely, and transferred to the fourth hydraulic chamber 564. In such embodiments, the first volume of liquid can be substantially equal to the sixth volume of liquid.

In some embodiments, the third pneumatic chamber 532 can retain heat energy produced by another previously compressed mass of gas in addition to the heat energy produced by the third mass of gas. The first volume of liquid can be configured to absorb the heat energy produced by compression of a previous mass of gas and the heat energy produced by compression of the third mass of gas before any portion of the first volume of liquid is discharged from the third pneumatic chamber 532. As will be discussed in more detail below, in some embodiments, this warmed liquid can be re-used during the expansion cycle to warm gas as it expands.

Figure 5F:
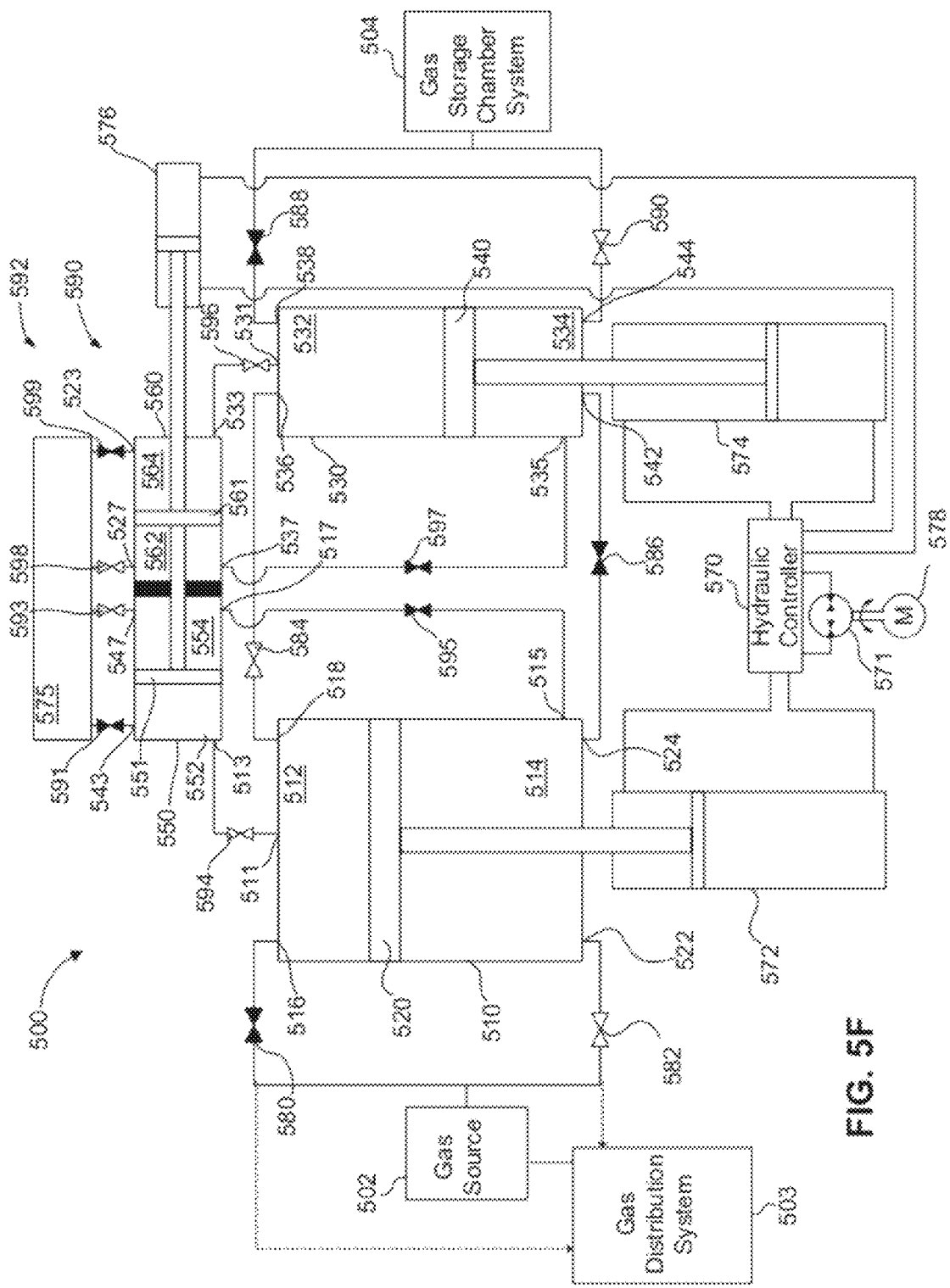

As shown in FIG. 5F, the valves 582, 584, 590, 593, 594, 596, 598 remain open as the pneumatic pistons 520, 540 and the hydraulic pistons 551, 561 continue moving in their respective directions. The first working pneumatic piston 520 is shown in FIG. 5F in its second position during its second stroke. Fluids continues to flow into and/or out of the first pneumatic cylinder 510 in the same manner described above with respect to FIG. 5E. The second working pneumatic piston 540 is also shown in FIG. 5F in its second position during its second stroke. Fluids also continues to flow into and/or out of the second pneumatic cylinder 530 in the same manner described above with respect to FIG. 5E.

Furthermore, the first and second working hydraulic pistons 551, 561 are shown in FIG. 5F in their second position during their second stroke. The first and second working hydraulic pistons 551, 561 continue to be moved in the second direction by the third hydraulic actuator 576. As discussed above, in some embodiments, the amount of force that the third hydraulic actuator 576 exerts on the first and second working hydraulic pistons 551, 561 to move the first and second working hydraulic pistons 551, 561 is minimal (or nominal). The force exerted by the third hydraulic actuator 576 can be sufficient to overcome hydraulic head and/or frictional losses, as previously discussed.

Figure 5G:
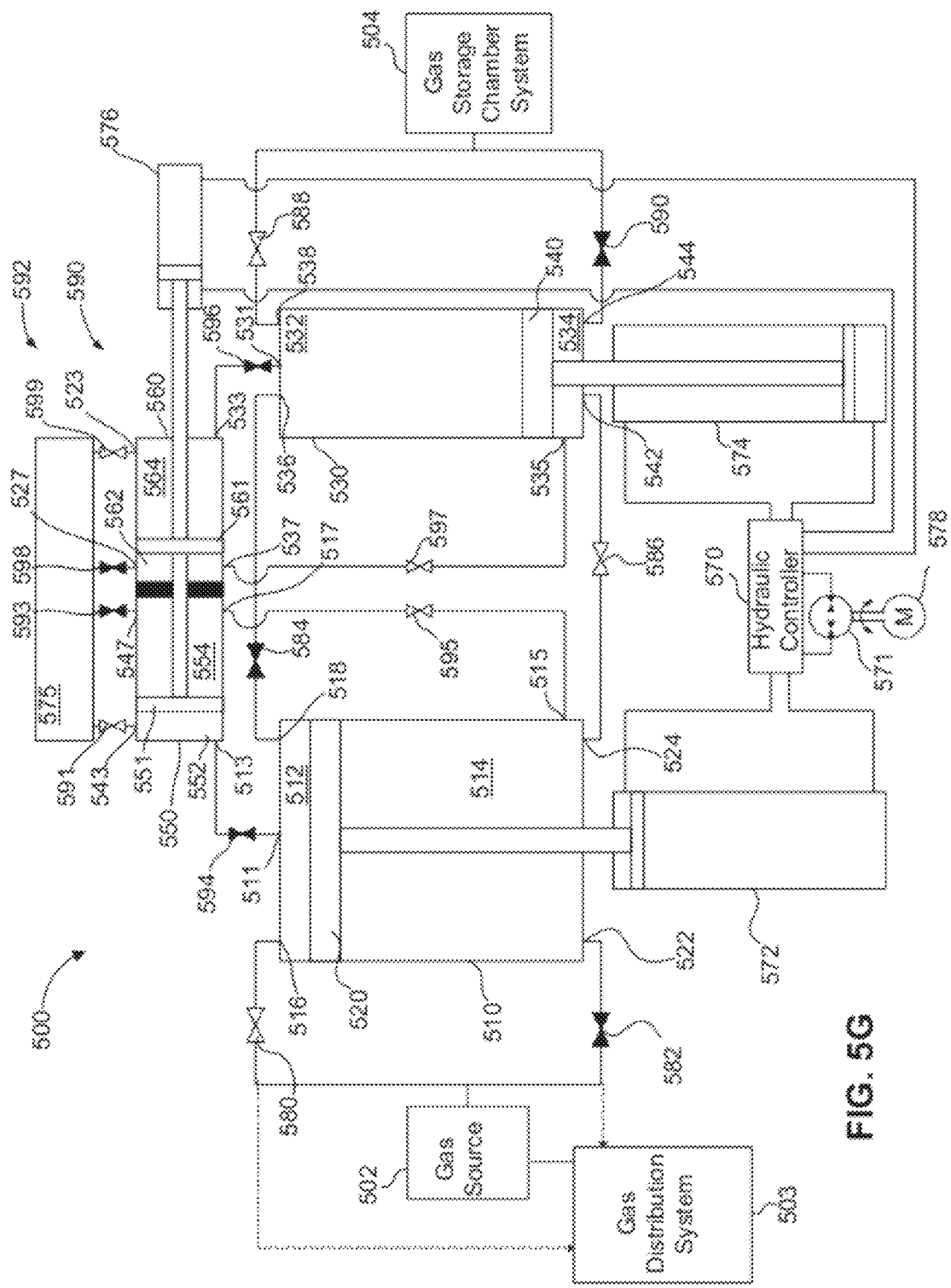

Referring to FIG. 5G, the valves 582, 584, 590, 593, 594, 596, 598, which were previously open, are now closed and the valves 580, 586, 588, 591, 595, 597, 599 are reopened. More particularly, the valve 582 is closed to stop the flow of gas from the gas source 502 to the third pneumatic chamber 514. The third mass of gas has been discharged from the first pneumatic chamber 512 to the third pneumatic chamber 532 at the sixth pressure higher than the second pressure, and is contained in the third pneumatic chamber 532. The valve 584 between the first pneumatic chamber 512 and the third pneumatic chamber 532 is closed to prevent the third mass of gas from flowing back into the first pneumatic chamber 512 from the third pneumatic chamber 532. The first mass of gas has been discharged from the fourth pneumatic chamber 534 to the compressed gas storage chamber system 504 at the seventh pressure higher than the fourth pressure. The valve 590 between the fourth pneumatic chamber 534 and the compressed gas storage chamber system 504 is closed to prevent the first mass of gas from flowing back into the fourth pneumatic chamber 534 from the storage chamber 504. Valves 580, 586, 588, 591, 595, 597, 599 are opened to permit the compression cycle to be continued or repeated.

As noted above, when a mass of gas is transferred into a pneumatic chamber (e.g., first, second, third, or fourth pneumatic chambers 512, 514, 532, 534, respectively), the valve (e.g., valve 580, 582, 584, 586, respectively) associated with the inlet port (e.g., port 516, 522, 536, 542, respectively) is closed to prevent backwards flow of the gas during compression. Additionally, the valve (e.g., valve 584, 586, 588, 590, respectively) associated with the outlet port (e.g., port 518, 524, 538, 545, respectively) of the respective pneumatic chamber is opened to permit the gas to be transferred to the next downstream chamber as the gas is being compressed.

As shown in FIG. 5G, the pneumatic pistons 520, 540 and the hydraulic pistons 551, 561 have completed their second stroke and each piston 520, 540, 551, 561 is now back in their first position (see, for example, FIG. 5A). In some embodiments, the pistons 520, 540, 551, 561 move concurrently with each other and can have the same stroke time. In other words, in some embodiments, the pistons 520, 540, 551, 561 can begin and/or end their respective strokes at the same time. In some embodiments, the pistons 520, 540, 551, 561 can have the same stroke time (e.g., three (3) seconds per stroke) but one or more of the pistons 520, 540, 551, 561 start their stroke at different times. In other embodiments, the timing of one or more of the pistons 520, 540, 551, 561 can vary. For example, in some embodiments, the first working pneumatic piston 520 can have a stroke time (i.e., the time it takes for piston 520 to move from its first position to its fourth position) of approximately five (5) seconds, the second working pneumatic piston 540 can have a stroke time of approximately four (4) seconds, and the first and second working hydraulic pistons 551, 561 can have a stroke time of approximately three (3) seconds. Stroke times can vary, for example, based on the size and/or operation of the cylinders and/or pistons.

Figure 6A:
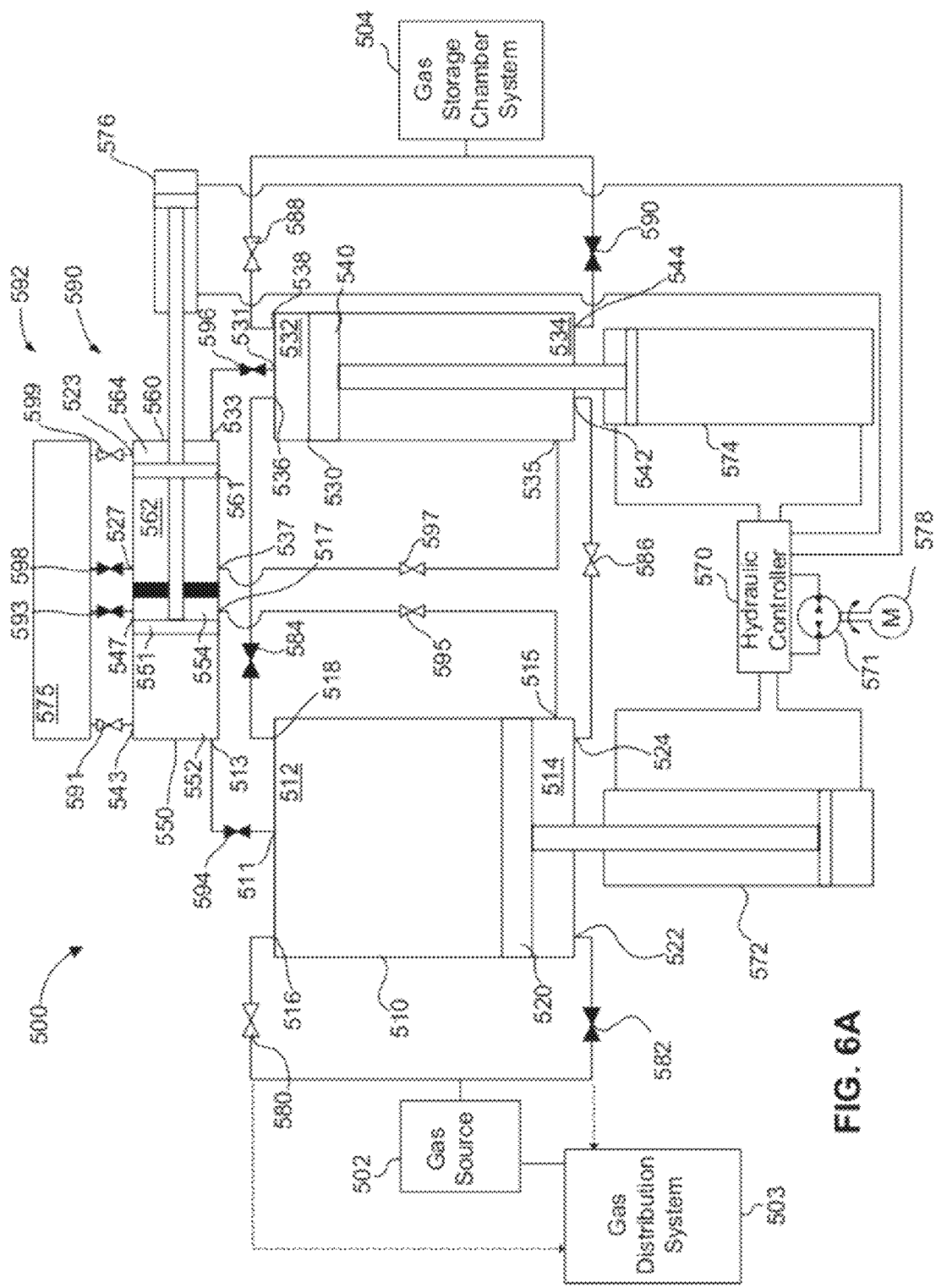
FIGS. 6A-6G are schematic illustrations of the compressed gas-based energy storage and recovery system of FIGS. 5A-5G shown in a first, second, third, fourth, fifth, sixth and seventh configuration, respectively, illustrating an expansion cycle according to an embodiment.

Referring to FIGS. 6A-6G, the compression/expansion device 500 is illustrated in first, second, third, fourth, fifth, sixth and seventh configurations, respectively, of an expansion mode or cycle. As shown in FIG. 6A, in the first configuration of the expansion mode, the valves 580, 586, 588, 591, 595, 597, 599 are opened. The first and second working hydraulic pistons 551, 561 are in their fourth position within their respective hydraulic cylinders 550, 560 such that the volume of the first hydraulic chamber 552 is greater than the volume of the second hydraulic chamber 562, and the third hydraulic chamber 562 is greater than the volume of the fourth hydraulic chamber 564. The valve 599 between the fourth hydraulic chamber 564 and the liquid storage structure 575 is opened. In this manner, the fourth hydraulic chamber 564 is fluidically coupled to the liquid storage structure 575 such that a first volume of fluid can flow from the liquid storage structure 575 to the fourth hydraulic chamber 564 via the first fluid port 523. The valve 591 between the first hydraulic chamber 553 and the liquid storage structure 575 is also opened, and the first hydraulic chamber 553 is fluidically coupled the liquid storage structure 575 such that fluid from the first hydraulic chamber 553 can flow from the first hydraulic chamber 553 to the liquid storage structure 575. The valve 597 between the third hydraulic chamber 562 and the fourth pneumatic chamber 534 is opened such that the third hydraulic chamber 562 is fluidically coupled to the fourth pneumatic chamber 534, and a second volume of liquid can flow from the third hydraulic chamber 562 to the fourth pneumatic chamber 534.

The second working pneumatic piston 540 is in its fourth position within the second pneumatic cylinder 530 such that the volume of the third pneumatic chamber 532 is less than the volume of the fourth pneumatic chamber 534. The valve 588 between the compressed gas storage chamber system 504 and the third pneumatic chamber 532 is opened. In this manner, the compressed gas storage chamber system 504 is fluidically coupled to the third pneumatic chamber 532 such that a first mass of compressed gas at a first pressure can flow from the compressed gas storage chamber system 504 into the third pneumatic chamber 532 via the third fluid port 538. In some embodiments, a second mass of compressed gas at a second pressure is contained in the fourth pneumatic chamber 534. The valve 586 between the fourth pneumatic chamber 534 and the second pneumatic chamber 514 is opened. In this manner, the fourth pneumatic chamber 534 is fluidically coupled to the second pneumatic chamber 512 such that the second mass of compressed gas and/or the second volume of liquid can flow from the fourth pneumatic chamber (via its first fluid port 542) to the second pneumatic chamber (via its second fluid port 524) at the second pressure.

The first working pneumatic piston 520 is in its fourth position within the first pneumatic cylinder 510 such that the volume of the first pneumatic chamber 512 is greater than the volume of the second pneumatic chamber 514. The valve 595 between the second pneumatic chamber 514 and the second hydraulic chamber 554 is opened. In this manner, the second pneumatic chamber 514 is fluidically coupled to the second hydraulic chamber 554 such that a third volume of fluid (e.g., including the second volume of liquid or at least a portion thereof) can flow from the second pneumatic chamber 514 to the second hydraulic chamber 554.

A third mass of compressed gas at a third pressure can be contained in the first pneumatic chamber 512. The valve 580 between the first pneumatic chamber 512 and the gas source 502 is opened, and thus the first pneumatic chamber 512 is fluidically coupled to the gas source 502 such that the third mass of compressed gas can flow from the first pneumatic chamber 512 via the first fluid port 516 to the gas source 502 at the third pressure. As discussed above, the gas source 502 can optionally be coupled to a gas distribution system 503, such as a natural gas pipeline system. The gas distribution system 503 can be configured to transfer the expanded gas from the system 500 to at least one of an end user, an intermediary, or another storage location. In some embodiments, each of the first pneumatic chamber 512 and the second pneumatic chamber 514 can optionally be fluidically coupled to the gas distribution system 503 (as shown in dashed lines in FIGS. 6A-6G). In this manner, the expanded gas can be delivered directly from the first pneumatic cylinder 510 to the gas distribution system 503. One or more additional valves (not shown) can be included to selectively prevent or permit the flow of gas between the gas source 502 and the gas distribution system 503 and/or between the first and second pneumatic chambers 512, 514 and the gas distribution system 503.

Figure 6B:
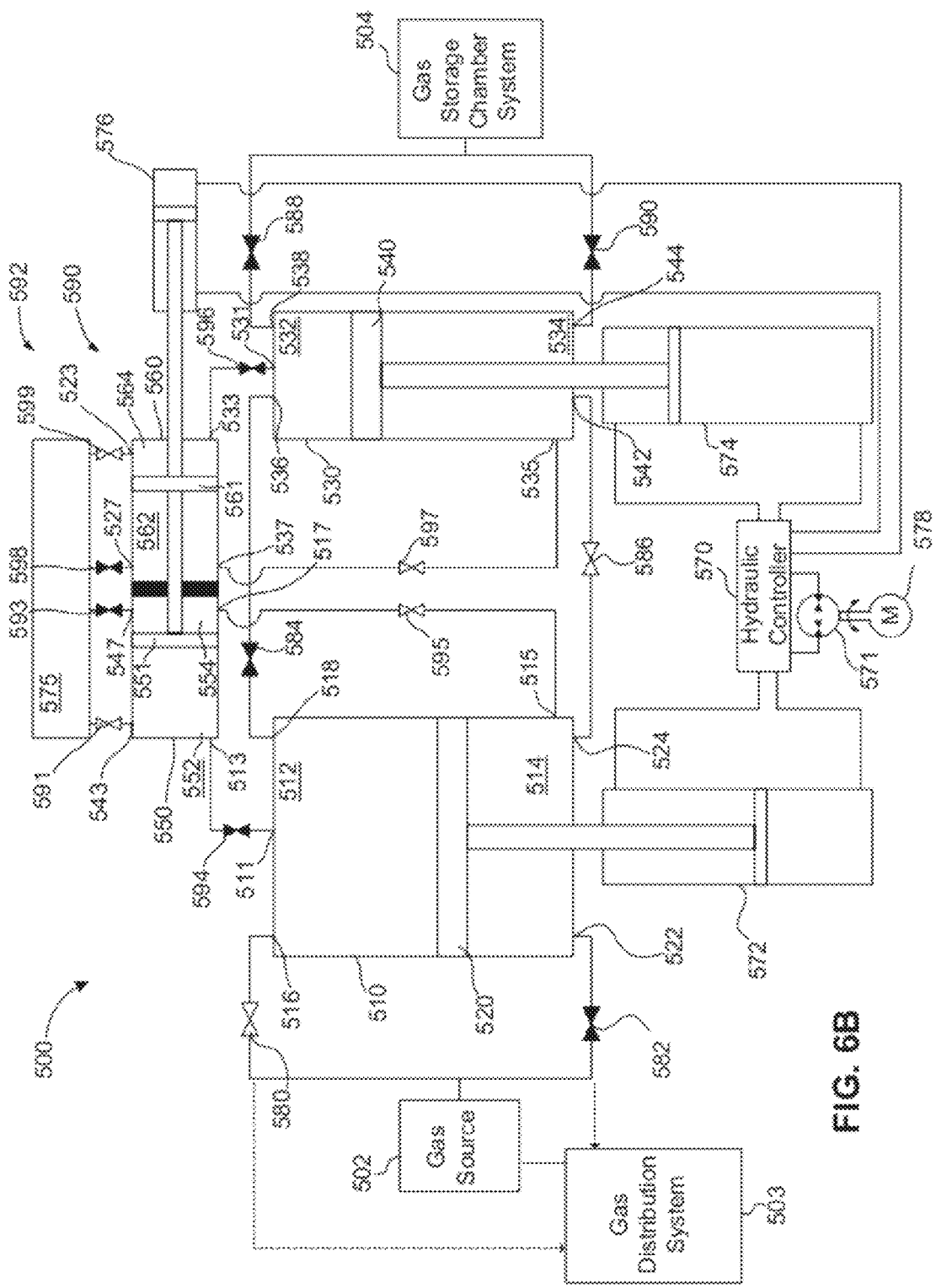

Referring now to FIG. 6B, the second working hydraulic piston 561 is in its third position. The valves 599 and 597 remain open so that the third and fourth hydraulic chambers 562, 564 are fluidically coupled to the fourth pneumatic chamber 534 and the liquid storage structure 575, respectively. The second working hydraulic piston 561 is moved by the third hydraulic actuator 576 in the fourth direction to its second position (see, e.g., FIG. 6C), and to its first position (see, e.g., FIG. 6D), thus completing a first stroke in the expansion mode. Movement of the second working hydraulic piston 561 in the fourth direction causes the first volume of liquid to be drawn into the fourth hydraulic chamber 564, and the second volume of liquid to be discharged from the third hydraulic chamber 562 into the fourth pneumatic chamber 534. In some embodiments, the liquid flowing into and out of the third and fourth hydraulic chambers 562, 564 is relatively warmer than the fluid flowing into and out of the first and second hydraulic chambers 552, 554. The warmed liquid can be, for example, the liquid warmed during the compression mode and stored (or harvested) in the liquid storage structure 575. In some embodiments, the liquid can be warmed by transferring heat from the second liquid (e.g., water, which may be separately stored within the liquid storage structure 575 or in a separate storage structure, such as a pond) to the liquid to be warmed (e.g., glycol), such as via a heat exchange system. By reintroducing this warmed liquid into the device 500, the system is, in essence, recycling the energy it previously produced during the compression. In this manner, it may not be necessary for the system to exert more energy during the expansion mode to warm the gas as it expands. For example, in some embodiments, no external heating devices or mechanisms (e.g., burning fuels) are needed to heat the gas—the system can use the previously-produced heat that was absorbed by the liquid. In other embodiments, however, at least a portion of the warmed liquid is liquid injected back into the system after being warmed by an external heating device(s) or mechanism(s).

In some embodiments, the liquid flowing between the hydraulic chambers 552, 554, 562, 564 and the pneumatic chambers 512, 514, 534, 532, respectively, is configured to facilitate dehydration of the gas, such as while the gas is being expanded in the respective pneumatic chambers, as described in more detail herein. For example, the liquid can include a liquid desiccant dehydrator (e.g., glycol) configured to absorb water or water vapor from the gas. In operation, the liquid interacts with the compressed gas within the respective pneumatic chamber 512, 514, 532, 534. In this manner, the liquid can actively withdraw water or water vapor from the compressed gas (e.g., as the compressed gas is being expanded within the respective pneumatic chamber), at least until the liquid reaches a saturation threshold (at which point the liquid is effectively saturated with water or water vapor and becomes unable to absorb a further amount of water or water vapor from the gas without first having at least a portion of the water or water vapor removed from the liquid) or until the liquid is removed from the pneumatic chamber with the gas. In embodiments in which the storage system 504 includes a liquid compensated storage cavern, the compressed gas stored therein may absorb moisture from the compensating liquid (e.g., water or brine). As such, the liquid management system 592 will likely be used during the expansion cycle, either instead of or in addition to the compression cycle, to facilitate dehydration of the gas.

As shown in FIG. 6B, when the first mass of compressed gas is introduced into the third pneumatic chamber 532, the first mass of compressed gas is permitted to expand within the third pneumatic chamber 532. The valve 588 between the compressed gas storage chamber system 504 and the third pneumatic chamber 532, which was previously open in FIG. 6A, is closed in the second configuration shown in FIG. 6B to prevent an additional amount of compressed gas from flowing into the third pneumatic chamber 532 and to prevent flow of the first mass of compressed gas back into the compressed gas storage chamber system 504. The expanding first mass of compressed gas exerts a force on the second working pneumatic piston 540 sufficient to move the second working piston in the second direction to its third position (shown here in FIG. 6B), to its second position (see, e.g., FIG. 6C), and to its first position (see, e.g., FIG. 6D), thus completing a first stroke in the expansion mode. After being permitted to expand in the third pneumatic chamber 532, the first mass of compressed gas has a fourth pressure lower than the first pressure. Movement of the second working pneumatic piston 540 in the second direction causes the second hydraulic actuator 574 to displace the first volume of hydraulic fluid.

Movement of the second working pneumatic piston 540 in the second direction also helps transfer the second mass of compressed gas at the second pressure from the fourth pneumatic chamber 534 to the second pneumatic chamber 514. In some embodiments, however, before the second mass of compressed gas is transferred, the second volume of liquid is introduced into the fourth pneumatic chamber 534 to warm up the second mass of compressed gas and/or to remove water from the second mass of compressed gas. In general, as gas expands and its pressure decreases, the temperature of the gas decreases. This can lower the gas's ability to produce energy (i.e., to move the piston 540 to generate electricity). Energy production can be increased, however, by warming the gas prior to or during its expansion. Thus, the second volume of liquid is introduced into the fourth pneumatic chamber 534 to warm the second mass of compressed gas, which was expanded once in the fourth pneumatic chamber 534 and will be expanded again in the second pneumatic chamber 514, to increase the energy production of the gas. As previously discussed, in some embodiments, the second volume of liquid was previously warmed during the compression process and stored within the liquid storage structure 575, and is now being re-introduced into the device 500. In some embodiments, the second volume of liquid is configured to dehydrate water from the second mass of compressed gas. For example, the second volume of liquid can include a liquid desiccant dehydrator, such as glycol or a glycol solution, as previously discussed. In this manner, when the second volume of liquid interacts with the second mass of compressed gas within the fourth pneumatic chamber 534, the second volume of liquid can absorb water or water vapor from the second mass of compressed gas, at least until the second volume of liquid reaches the saturation threshold or the second volume of liquid is withdrawn from the device 500 (e.g., from the fourth pneumatic chamber 534, or a different pneumatic chamber, containing the second mass of gas).

The second volume of liquid can be transferred from the fourth pneumatic chamber 534 to the second pneumatic chamber 514 along with the second mass of compressed gas. The second mass of compressed gas is allowed to expand further within the second pneumatic chamber. In some embodiments, the second volume of liquid continues to release heat in the second pneumatic chamber 514 to warm the second mass of compressed gas as it continues to expand in the second pneumatic chamber 514. In some embodiments, the second volume of liquid continues to dehydrate the second mass of compressed gas in the second pneumatic chamber 514. The second volume of liquid can be configured to dehydrate the second mass of compressed gas such that the second mass of compressed gas contains the equivalent of no more than about 4 to 7 pounds of water vapor per MMSCF of natural gas. The expanding second mass of compressed gas exerts a force on the first working pneumatic piston 520 to move the first working piston in the third direction from its third position (shown here in FIG. 6B), to its second position (see, e.g., FIG. 5C) and to its first position (see, e.g., FIG. 5D), thus completing a first stroke in the expansion mode. After being permitted to expand in the second pneumatic chamber 514, the second mass of compressed gas has a fifth pressure lower than the second pressure.

Movement of the first working pneumatic piston 520 in the third direction causes the first hydraulic actuator 572 to displace a second volume of hydraulic fluid. Movement of the first working pneumatic piston 520 in the third direction also reduces the volume of the first pneumatic chamber 512 and helps to transfer the third mass of compressed gas at the third pressure from the first pneumatic chamber 612 to the gas source 502 (and, or alternatively, to the gas distribution system 503, as described above). In some embodiments, the third pressure is substantially equal to a pressure within the gas distribution system 503 (e.g., a pressure of natural gas within a pipeline). In other embodiments, the third pressure is substantially equal to the atmospheric pressure outside the gas source 502 (e.g., 1 bar).

As shown in FIG. 6B, the first working hydraulic piston 551 is in its third position. The valves 591 and 595 remain open so that the first and second hydraulic chambers 552, 554 are fluidically coupled to the liquid storage structure 575 and the second pneumatic chamber 524, respectively. The first working hydraulic piston 551 is moved with the second working hydraulic piston 561 in the fourth direction from its third position to its second position (see, e.g., FIG. 6C), and to its first position (see, e.g., FIG. 6D), thus completing a first stroke in the expansion mode. Movement of the first working hydraulic piston 551 in the fourth direction causes a third volume of liquid (e.g., including at least a portion of the second volume of liquid) to be drawn into the second hydraulic chamber 554 from the second pneumatic chamber 514, and a fourth volume of liquid to be discharged from the first hydraulic chamber 562 into the liquid storage structure 575. In some embodiments, the fourth volume of liquid is processed to remove water or water vapor from the liquid, such as before the fourth volume of liquid enters the liquid storage structure 575 from the first hydraulic chamber 562. For example, the liquid management system 592 can include a water removal system (not shown; e.g., a boiler) fluidically disposed between the first hydraulic chamber 562 and the liquid storage structure 575 that is configured to remove the water or water vapor from the fourth volume of liquid. In this manner, when the fourth volume of liquid is transferred into the liquid storage structure 575, the fourth volume of liquid is ready to be reused as a liquid desiccant dehydrator for a subsequent mass of compressed gas. The third volume of liquid can be configured to dehydrate gas in the second pneumatic chamber 514, in a similar manner as described with respect to the second volume of liquid.

By the time the third volume of liquid exits the device 500 and is received in the second hydraulic chamber 554, it is cooler than the second volume of liquid when it entered the device 500. In some embodiments, the liquid storage structure 575 is configured to store the warm liquid dispensed to the second hydraulic cylinder 560 and the cool liquid received from the first hydraulic cylinder 550 without one liquid substantially affecting the temperature of the other liquid. For example, in some embodiments, the liquid storage structure 575 can be divided into two portions that are fluidically and/or thermally isolated from one another. One portion of the structure 575 can hold the cooler liquid and the other portion can hold the warmer liquid. In other embodiments, the liquid storage structure 575 can include a first tank that contains the cooler liquid and a second, separate, tank that contains the warmer liquid.

In some embodiments, the force of the third volume of liquid entering the second hydraulic chamber 554 is sufficient to move the first and second working hydraulic pistons 551, 561 in the fourth direction. As discussed above, in such embodiments, the third hydraulic actuator 576 only exerts a force on the hydraulic pistons 551, 561 sufficient to overcome the hydraulic head and/or frictional losses in order to move the hydraulic pistons 551, 561 in the fourth direction. In some embodiments, as discussed above, the fluid pressure produced by the third volume of liquid entering the second hydraulic chamber 554 is the primary force acting on the hydraulic pistons 551, 561, and the hydraulic force exerted by the third hydraulic actuator 576 can be a secondary force. In other embodiments, as discussed above, the hydraulic force exerted by the third hydraulic actuator 576 is the primary force and the fluid pressure exerted by the liquid entering the second hydraulic chamber 554 is the secondary force acting on the first and second working hydraulic pistons 551, 561.

Figure 6C:
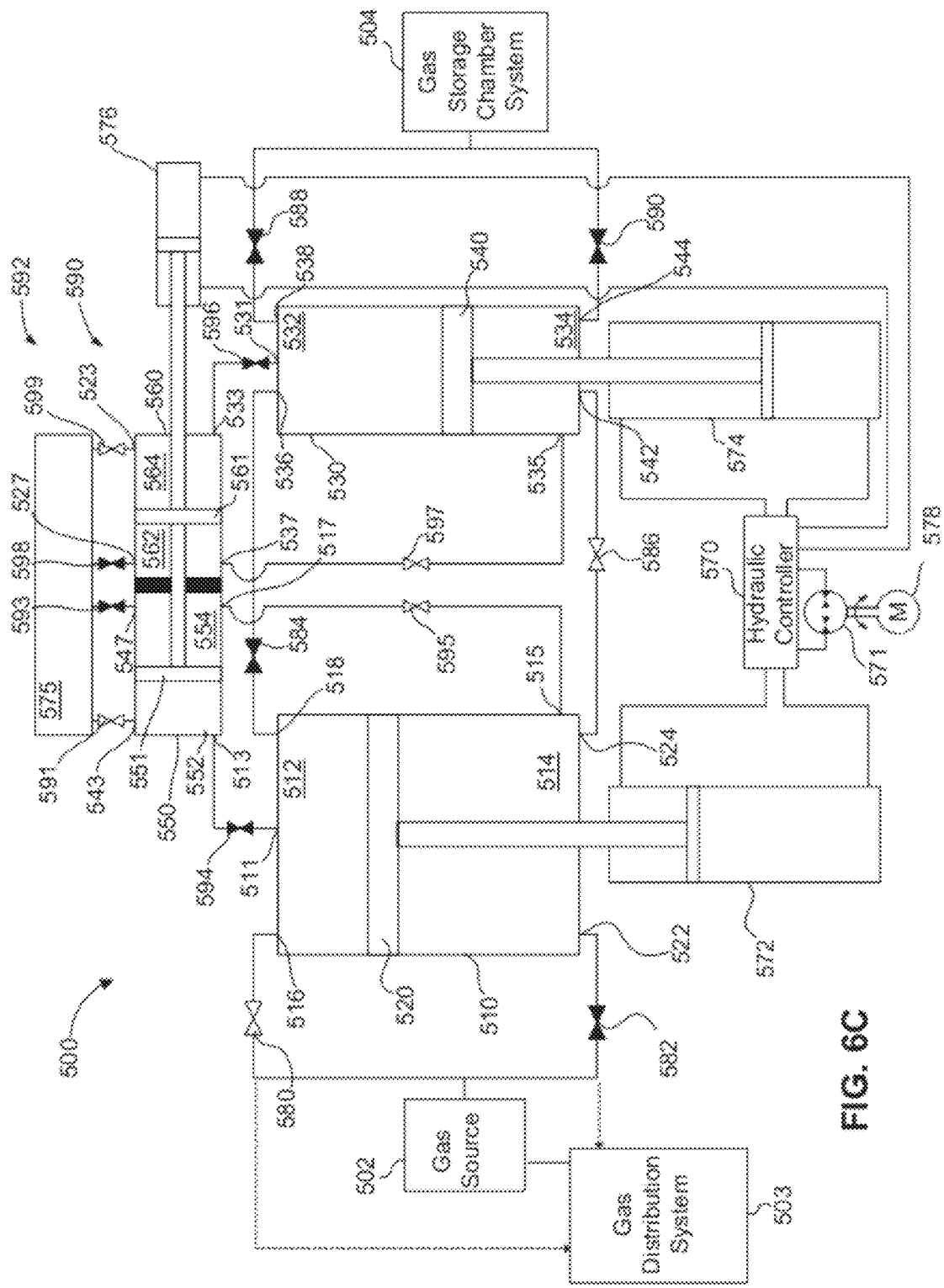

Referring now to FIG. 6C, the valves 580, 586, 591, 595, 597 and 599 remain open while valve 588 remains closed to prevent any gas in the third pneumatic chamber 632 from flowing back into the gas storage chamber system 504. The first mass of compressed gas continues to expand in the third pneumatic chamber 632 and move the second working pneumatic piston 540 in the second direction. Likewise, the second mass of compressed gas continues to flow from the fourth pneumatic chamber 634 to the second pneumatic chamber 614 where it continues to expand and move the first working pneumatic piston 520 in the third direction. The first and second working pneumatic pistons 520, 540 are shown in their respective second positions. The first and second hydraulic pistons 551, 561 are also shown in their second positions. The first and second hydraulic pistons 551, 561 continue to move in the fourth direction and operate in the same manner described above with respect to FIG. 6B.

Figure 6D:
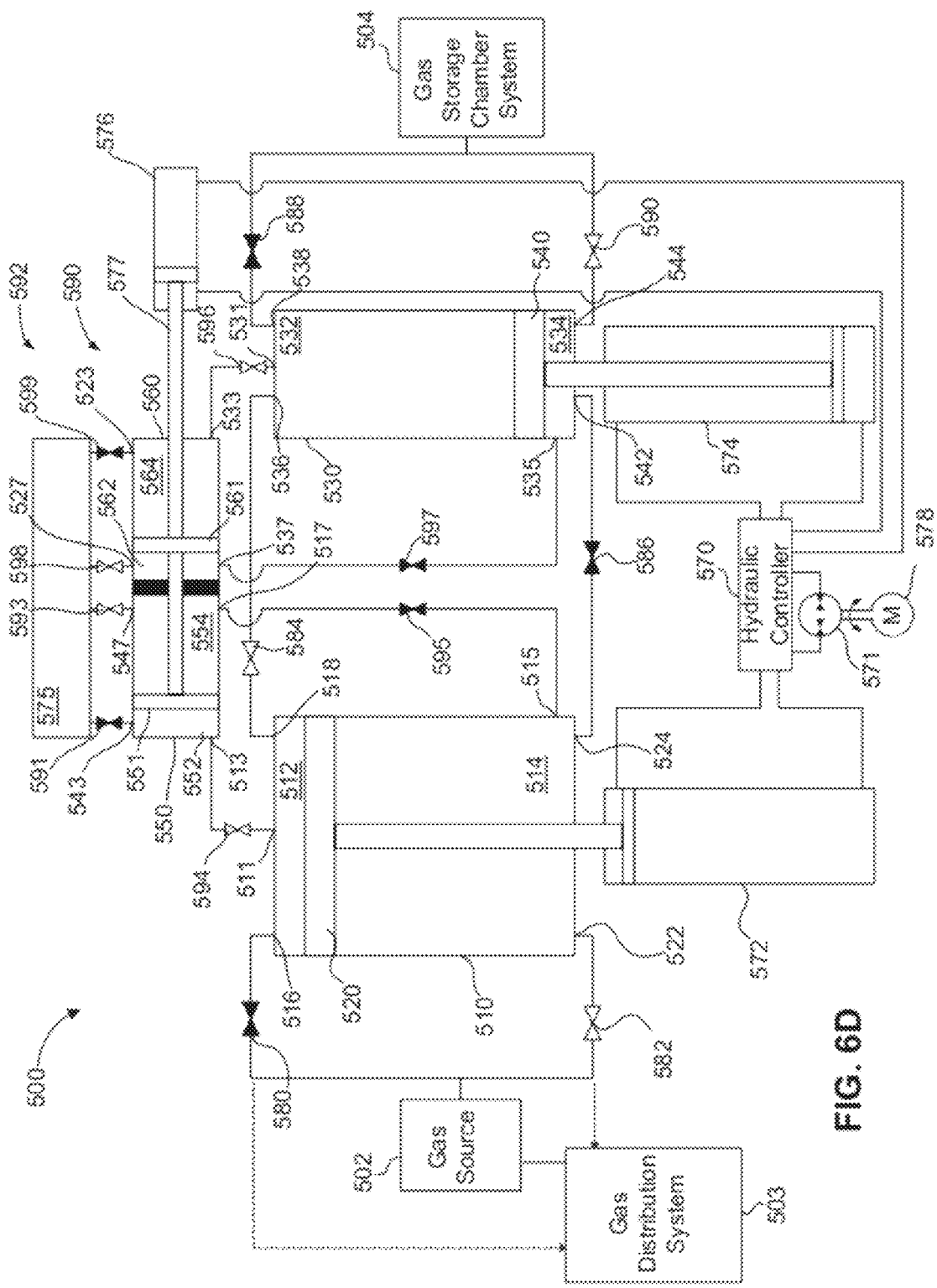

Turning now to FIG. 6D, the previously-opened valves 580, 586, 591, 595, 597, 599 are closed and valves 582, 584, 590, 593, 594, 596, 598 are opened. The first and second working hydraulic pistons 551, 561 have completed their first stroke of the expansion mode and are in their first position. As such, the first and second working hydraulic pistons 551, 561 are in position to begin their second stroke of the expansion mode. At this point during the cycle, the fourth volume of fluid has been at least partially or fully discharged from the first hydraulic chamber 552. At valve 596, the fourth hydraulic chamber 562 is fluidically coupled to the third pneumatic chamber 532 such that the warmed first volume of liquid (or at least a portion thereof) can flow from the fourth hydraulic chamber 562 to the third pneumatic chamber 532. At valve 599, the third hydraulic chamber 564 is fluidically coupled to the liquid storage structure 575 such that a fifth volume of liquid, which is warm, can flow from the liquid storage structure 575 to the third hydraulic chamber 564. At valve 593, the second hydraulic chamber 554 is coupled to the liquid storage structure 575 such that the third volume of liquid (or at least a portion thereof), which is relatively cooler than the warm first volume of liquid, can flow from the second hydraulic chamber 554 to the liquid storage structure 575. In some embodiments, the third volume of liquid is processed to remove water or water vapor from the liquid, such as before the third volume of liquid enters the liquid storage structure 575 from the second hydraulic chamber 554, as described above with respect to the fourth volume of liquid. In this manner, when the third volume of liquid is transferred into the liquid storage structure 575, the third volume of liquid is ready to be reused as a liquid desiccant dehydrator for a subsequent mass of compressed gas. At valve 594, the first hydraulic chamber 552 is fluidically coupled to the first pneumatic chamber 512 such that liquid, which is also relatively cooler than the warm first volume of liquid, can flow from the first pneumatic chamber 512 to the first hydraulic chamber 552.

The second working pneumatic piston 540, having completed its first stroke, is in its first position. At this point in the cycle, the second mass of compressed gas has been at least partially or fully discharged from the fourth pneumatic chamber 534 into the second pneumatic chamber 514. As shown in FIG. 6D, the third pneumatic chamber 532 is fluidically coupled to the first pneumatic chamber 512 such that the first mass of compressed gas can be discharged from the third pneumatic chamber 532 to the first pneumatic chamber 512 at the fourth pressure. The first working pneumatic piston 520, having also completed its first stroke, is in its first position. The valve 580 between the first pneumatic chamber 512 and the gas source 502 is closed to fluidically isolate the first pneumatic chamber from the gas source 502. The valve 582 between the second pneumatic chamber 514 and the gas source 502 is opened, and thus the second pneumatic chamber 514 is fluidically coupled to the gas source 502 (and, or alternatively, to the gas distribution system 503, as described above) such that the second mass of gas can be discharged from the second pneumatic chamber 514 to the gas source (and/or the gas distribution system 503) at the fifth pressure.

Because valve 590 is opened, the compressed gas storage chamber system 504 is fluidically coupled to the fourth pneumatic chamber 534 such that a fourth mass of compressed gas can flow from the storage chamber 504 to the fourth pneumatic chamber 534. The fourth mass of compressed gas is discharged from the compressed gas storage chamber system 504 to the fourth pneumatic chamber 534 at a sixth pressure. As the fourth mass of gas enters and expands in the fourth pneumatic chamber 534, it exerts a force on the second working pneumatic piston 540 thereby moving the second working piston 540 in the third direction from its first position (shown here in FIG. 6D) to its second, third and fourth positions, respectively.

As the second working piston 540 is moved in its third direction, the first mass of compressed gas is discharged from the third pneumatic chamber 532 to the first pneumatic chamber 512 at the fourth pressure. In some embodiments, however, before being discharged to the first pneumatic chamber 512, a first volume of liquid (which, for example, was previously warmed during the compression process) is introduced into the third pneumatic chamber 532 to warm the first mass of compressed gas. The first volume of liquid can also be introduced into the third pneumatic chamber 532 to dehydrate the first mass of compressed gas. For example, the first volume of liquid can include a liquid desiccant dehydrator, such as glycol or a glycol solution, as previously discussed. In this manner, when the first volume of liquid interacts with the first mass of compressed gas within the third pneumatic chamber 532, the first volume of liquid can absorb water or water vapor from the first mass of compressed gas, e.g., at least until the first volume of liquid reaches the saturation threshold or the first volume of liquid is withdrawn from the device 500 (e.g., from the third pneumatic chamber 532, or a different pneumatic chamber, containing the first mass of gas). The first volume of liquid can be transferred into the first pneumatic chamber 512 along with the first mass of compressed gas. In some embodiments, the first volume of liquid continues to dehydrate the first mass of compressed gas in the first pneumatic chamber 512. The first volume of liquid can be configured to dehydrate the first mass of compressed gas such that the first mass of compressed gas contains the equivalent of no more than about 4 to 7 pounds of water vapor per MMSCF of natural gas.

In the first pneumatic chamber 512, the first mass of compressed gas is allowed to expand and thereby exert a force on the first working pneumatic piston 520 to move the first working piston 520 in the second direction to its first position (shown here in FIG. 6D). As the first working pneumatic piston 520 is moved in the second direction, the second mass of gas is discharged from the second pneumatic chamber 514 to the gas source 502 (and, or alternatively, to the gas distribution system 503, as described above) at the fifth pressure. In some embodiments, the fifth pressure is substantially equal to a pressure within the gas distribution system 503. In other embodiments, the fifth pressure is substantially equal to the atmospheric pressure outside the gas source 502. A sixth volume of liquid (e.g., including at least a portion of the first volume of liquid) can also be discharged from the first pneumatic chamber 512 to the first hydraulic chamber 552 as the first working pneumatic piston 520 moves in the second direction.

The first hydraulic piston 551, which is shown in its first position, is moved in the first direction with the second hydraulic piston 561. As the first working hydraulic piston 551 moves in the first direction, the sixth volume of liquid is drawn into the first hydraulic chamber 552 from the first pneumatic chamber 512, and the third volume of fluid (or at least a portion thereof) is discharged from the second hydraulic chamber 554 into the liquid storage structure 575. As discussed above, the force of the sixth volume of liquid entering the first hydraulic chamber 552 can be sufficient to move the first hydraulic piston 551 in the first direction with limited assistance from the third hydraulic actuator 576. In some embodiments, the fluid force produced by the sixth volume of liquid entering the first hydraulic chamber 552 is the primary force acting on the first hydraulic piston 551, and the and hydraulic force exerted by the third hydraulic actuator 576 is the secondary force. In other embodiments, the hydraulic force is the primary force and the fluid force is the secondary force.

Figure 6E:
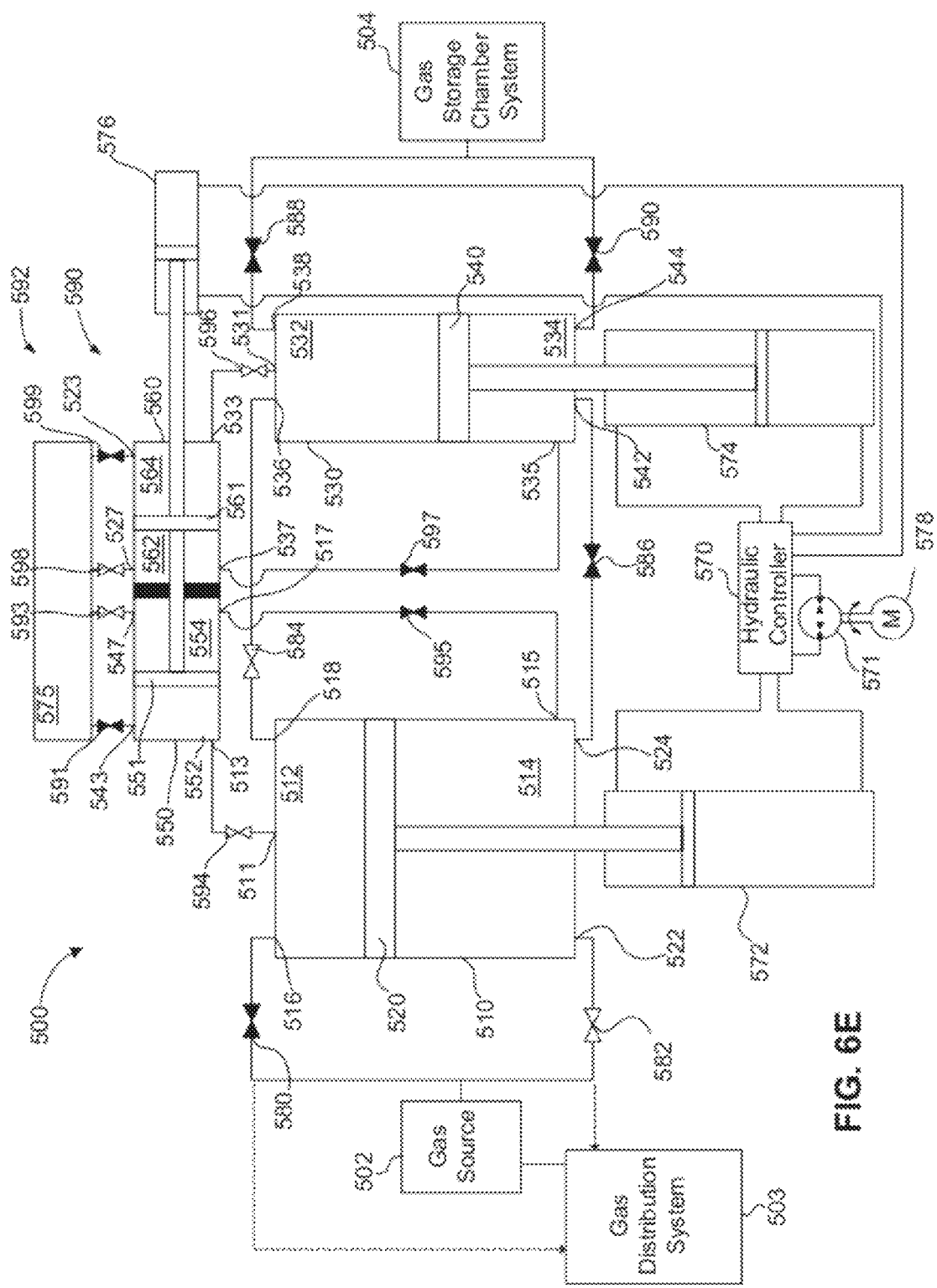

Referring now to FIG. 6E, the second working hydraulic piston 561 is in its second position. The valves 598 and 596 remain open so that the third and fourth hydraulic chambers 562, 564 continue to be fluidically coupled to the liquid storage structure 575 and the third pneumatic chamber 532, respectively. The second working hydraulic piston 561 continues to move in the first direction with the first working hydraulic piston 551, and each hydraulic piston 551, 561 operates in the same manner discussed above.

The valve 588 between the compressed gas storage chamber system 504 and the third pneumatic chamber 532, which was previously open in FIG. 6D, is closed to prevent an additional amount of compressed gas from flowing into the chamber 504 and to prevent flow of the fourth mass of compressed gas back into the compressed gas storage chamber system 504. The fourth mass of compressed gas continues to expand within the fourth pneumatic chamber 534 in the manner described above.

As previously discussed, the expanding fourth mass of compressed gas exerts a force on the second working pneumatic piston 540 sufficient to move the second working piston in the third direction to its third and fourth positions, thus completing a second stroke in the expansion mode. After being permitted to expand in the fourth pneumatic chamber 534, the fourth mass of compressed gas has a seventh pressure lower than the sixth pressure. Movement of the second working pneumatic piston 540 in the third direction causes the second hydraulic actuator 574 to displace a third volume of hydraulic fluid.

Movement of the second working pneumatic piston 540 in the third direction also helps transfer the first mass of compressed gas at the fourth pressure from the third pneumatic chamber 532 to the first pneumatic chamber 514. Before the first mass of compressed gas is transferred, however, the first volume of liquid is introduced into the third pneumatic chamber 532 from the fourth hydraulic chamber 564 to warm and/or dehydrate the first mass of compressed gas. The first volume of liquid can be transferred from the third pneumatic chamber 532 to the first pneumatic chamber 512 with the first mass of compressed gas. The first mass of compressed gas is permitted to expand further within the first pneumatic chamber 512 and, in some embodiments, the first volume of liquid can continue to release and transfer heat to the gas and/or continue to dehydrate the gas during this time. The expanding first mass of gas exerts a force on the first working pneumatic piston 520 to move the first working piston in the second direction to its third and fourth positions, thus completing a second stroke in the expansion mode. After being permitted to expand in the first pneumatic chamber 512, the first mass of compressed gas has an eighth pressure lower than the fourth pressure. Movement of the first working pneumatic piston 520 in the second direction causes the first hydraulic actuator 572 to displace a fourth volume of hydraulic fluid. Movement of the first working pneumatic piston 520 in the second direction also reduces the volume of the second pneumatic chamber 514 and helps to transfer the second mass of compressed gas at the fifth pressure from the second pneumatic chamber 514 to the gas source 502 (and/or to the gas distribution system 503, as described above).

As shown in FIG. 6E, the first working hydraulic piston 551 is in its second position. The valves 593 and 594 remain open so that the first and second hydraulic chambers 552, 554 are fluidically coupled to the first pneumatic chamber 512 and the liquid storage structure 575, respectively. Movement of the first working hydraulic piston 551 in the first direction causes the sixth volume of liquid (e.g., including at least a portion of the first volume of liquid) to be drawn into the first hydraulic chamber 552 from the first pneumatic chamber 512, and the third volume of liquid (or at least a portion thereof) to be discharged from the second hydraulic chamber 554 into the liquid storage structure 575. The first working hydraulic piston 551 is moved with the second working hydraulic piston 561 in the first direction to its third and fourth positions, thus completing a second stroke in the expansion mode.

Figure 6F:
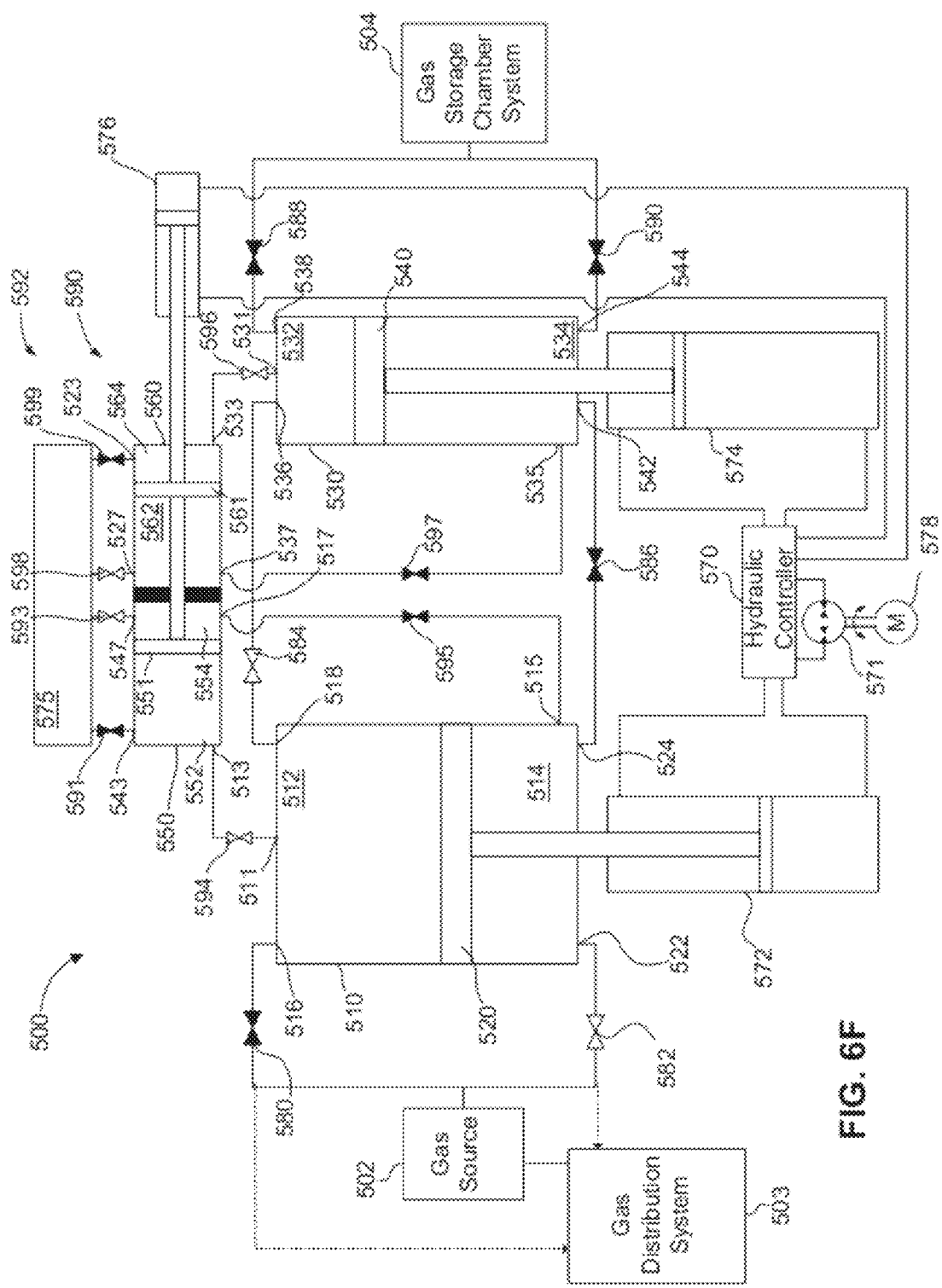

Referring now to FIG. 6F, the valves 582, 584, 593, 594, 596 and 598 continue remain open while valve 590 remains closed to prevent any gas in the fourth pneumatic chamber 634 from flowing back into the gas storage chamber system 504. The fourth mass of compressed gas continues to expand in the fourth pneumatic chamber 634 and move the second working pneumatic piston 540 in the third direction to its third position, shown here. Likewise, the first mass of compressed gas continues to flow from the third pneumatic chamber 532 to the first pneumatic chamber 512 where it is further permitted to expand. This expansion forces the first pneumatic piston 520 to move in the second direction to its third position, shown here. The first and second hydraulic pistons 551, 561 are also in their third positions. Movement of the first and second hydraulic pistons 551, 561 in the first direction continues to displace liquid in the manner discussed above.

Figure 6G:
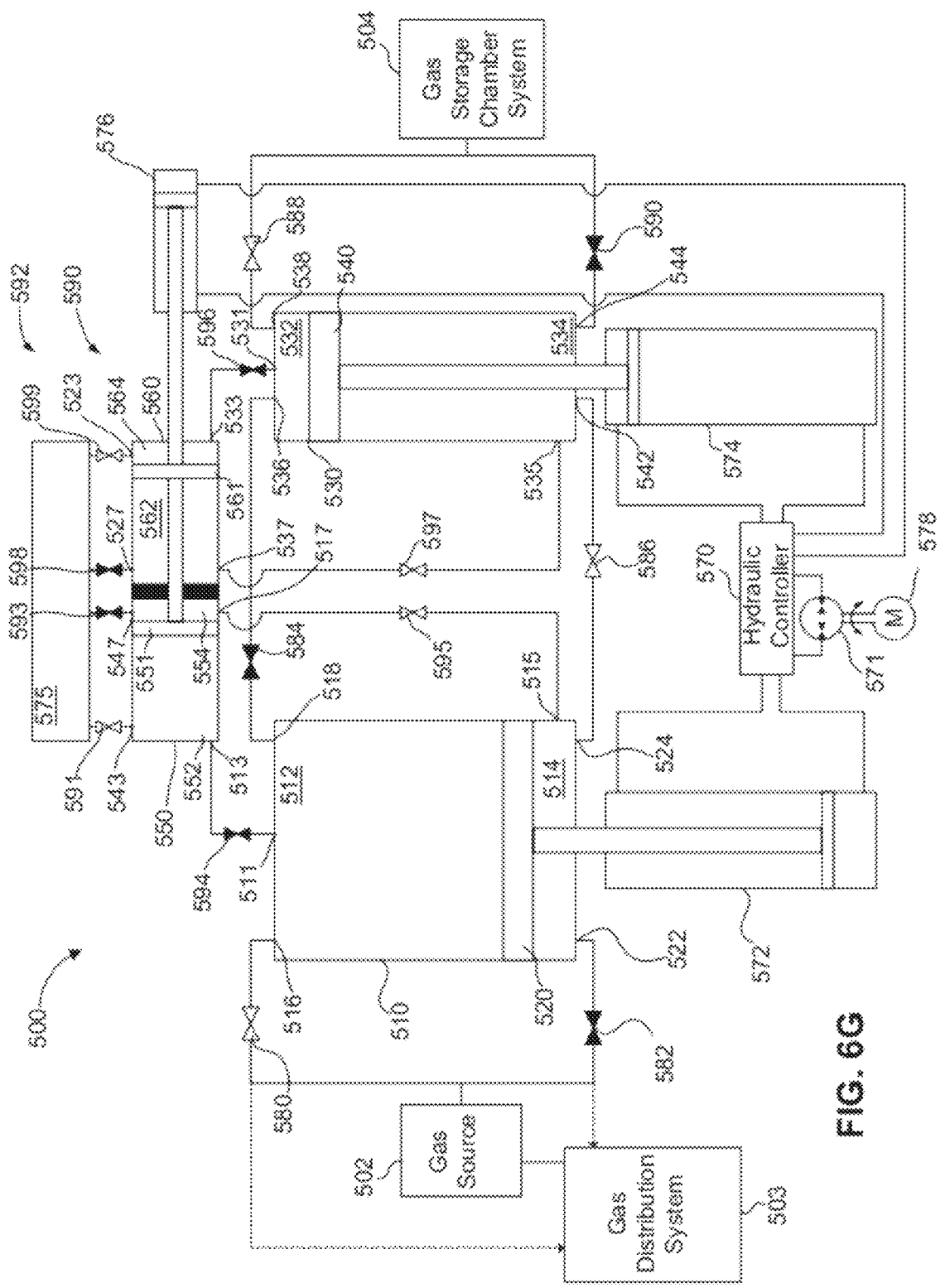

Referring now to FIG. 6G, the hydraulic pistons 551, 561 and the pneumatic pistons 520, 540 are each in their respective fourth positions, having completed a second stroke in the expansion mode. In this position, the first volume of liquid has been at least partially or fully discharged from the fourth hydraulic chamber 564 and into the device 500, and the third volume of liquid has been at least partially or fully discharged from the second hydraulic chamber 552 and into the liquid storage structure 575.

The fourth mass of gas has expanded within the fourth pneumatic chamber 534, thereby moving the second working pneumatic piston 540 in the third direction to its fourth position. In completing its second stroke, the second working pneumatic piston 540 moved in the third direction to increase the volume of the fourth pneumatic chamber 534 and decrease the volume of the third pneumatic chamber 532. Additionally, the second working pneumatic piston 540, having moved in the third direction from its first position to its fourth position (i.e., its second stroke in the expansion mode), caused the second hydraulic actuator 574 to displace a third volume of hydraulic fluid.

The first mass of compressed gas and the first volume of fluid have been discharged to the first pneumatic chamber 512 from the third pneumatic chamber 532 and the valve 584 therebetween is closed. The first mass of compressed gas has expanded within the first pneumatic chamber 512, and now has an eighth pressure lower than the fourth pressure. The expanding first mass of gas moved the first working pneumatic piston 520 in the second direction to its fourth position. In completing its second stroke, the first working pneumatic piston 520 moved in the second direction to increase the volume of the first pneumatic chamber 512 and decrease the volume of the second pneumatic chamber 514. Additionally, the first working pneumatic piston 520, having moved in the second direction from its fourth position to its first position (i.e., its second stroke), caused the first hydraulic actuator 572 to displace a fourth volume of hydraulic fluid. The second stroke of the first working pneumatic piston 520 can be concurrent with, or substantially simultaneous with, the second stroke of the second working pneumatic piston 540. As shown in FIG. 6G, the second mass of compressed gas has been discharged from the second pneumatic chamber 514 to the gas source 502 (and/or to the gas distribution system 503, as described above) at the fifth pressure.

The displacement of each volume of fluid (e.g., the first, second, third, or fourth volumes of fluid) by the first and second hydraulic actuators 572, 574 generates hydraulic power. In embodiments where the first and second hydraulic pistons 551, 561 are moved using hydraulic force (as described above), the third hydraulic actuator 576 can also displace a volume of fluid to generate hydraulic power. The hydraulic controller 570 controls distribution of the hydraulic power using, for example, software programmed to control a system of valves (not shown) within the hydraulic controller. The hydraulic controller 570 can control distribution of the hydraulic power to a pump/motor 571, which is configured to convert the hydraulic power into mechanical power. The pump/motor 571 is configured to transmit the mechanical power to a motor/generator 578. The motor/generator 578 is configured to convert the mechanical power to electrical power, which can then be transmitted to a power grid (and/or used to power a portion of the system 500). The expansion mode, or cycle, can be continued or repeated as desired to expand stored gas for distribution and/or consumption, or to convert energy stored in the form of compressed gas into electrical energy.

Generally, as discussed above with respect to the third and fourth volumes of liquid, each volume of liquid can undergo a water removal (e.g., boiling) process to remove absorbed water or water vapor from the volume of liquid such that the liquid can be reused as a liquid desiccant dehydrator during the expansion (and/or compression) process. Although such water removal process has been described as occurring before the volume of liquid enters the liquid storage structure 575, in other embodiments, such a water removal process can occur at a different point in the system. For example, in some embodiments, such a water removal process can occur after a volume of liquid has been transferred to the liquid storage structure 575 and before the volume of liquid is reused as a liquid desiccant dehydrator. In some embodiments, for example, the liquid storage structure 575 can include the water removal system, including any necessary conduits for taking away the removed water.

Although the compression/expansion devices (e.g., devices 100, 301, 500) have been illustrated and described herein as including two pneumatic cylinders (e.g., cylinders 110 and 130, 310 and 330, 510 and 530, respectively), in some embodiments, a compression/expansion device includes more than two pneumatic cylinders. Similarly, although the lock pumps (e.g., lock pump 590) have been illustrated and described herein as including two hydraulic cylinders (e.g., cylinders 550 and 560, respectively), in some embodiments, a lock pump includes more than two hydraulic cylinders.

Although the lock pumps (e.g., lock pump 590) have been illustrated and described as including a first hydraulic cylinder (e.g., first hydraulic cylinder 550) and a second hydraulic cylinder (e.g., second hydraulic cylinder 560), in some embodiments, a lock pump includes hydraulic chambers differently configured. For example, in some embodiments a lock pump can include a single vessel divided into a first hydraulic portion and a second hydraulic portion, with the first and second hydraulic portions each being divided by working pistons into two hydraulic chambers. Operation of such a system can be similar in many respects to operation of lock pump 590.

A system for compression and/or expansion of gas can include any suitable combination of systems (e.g., system 100, 300, 500), or portions thereof, described herein. For example, in some embodiments, such a system can include any combination of system 300 (described with reference to FIG. 3), and system 500 (described with reference to FIGS. 5A-5G and 6A-6G). A system can include two or more pneumatic cylinders in an in-line configuration and two or more pneumatic cylinders in a stacked configuration. Additionally, a system can include one, two, three, four, or more cylinders per stage of compression/expansion. A liquid management system can include any suitable combination of systems (192, 392, 592), or portions thereof (e.g., lock pump 590), described herein. In some embodiments, a liquid management system can include two or more hydraulic cylinders in an in-line configuration and two or more hydraulic cylinders in a stacked configuration. Additionally, a liquid management system can include one, two, three, four, or more hydraulic cylinders per stage of compression/expansion. The number of hydraulic cylinders can correspond, for example, to the number of pneumatic cylinders in the compression and/or expansion system. The liquid management system can operate with any compression and/or expansion system (e.g., system 100, 300, 500) described herein.

Although the liquid management system 592 is illustrated and described herein as including the hydraulic actuator 576, in other embodiments, the liquid management system 592 does not include this actuator. Rather, the fluid pressure discussed above is the only force acting on the pistons 551, 561 to move the pistons 551, 561. As such, the timing and movement of the pistons 551, 561 will be dependent, in part, on the pneumatic pistons 520, 540. In some such embodiments, it is not necessary that the first and second hydraulic pistons 551, 561 be coupled together, for example, via a piston rod or other like connecting rod. Rather, the hydraulic pistons 551, 561 can move in their respective cylinders 550, 560 independently of each other. The hydraulic pistons 551, 561 in this embodiment can, for example, function as dividers (or other moveable barrier/separator) within their respective cylinders 550, 560 as opposed to pistons.

The devices and systems described herein can be implemented in a wide range of sizes and operating configurations. Said another way, the physics and fluid mechanics of the system do not depend on a particular system size. For example, systems in the power range of 2 to 8 MW are technically and economically achievable. This estimated power range results from a system design constrained to use current commercially available components, manufacturing processes, and transportation processes. Larger and/or smaller system power may be preferred if the design uses a greater fraction of custom, purpose-designed components. Moreover, system power also depends on the end-use of the system. Said another way, the size of the system may be affected by whether the system is implemented as a compressor, expander, or both, as may be the case in a CAES-type application, in a natural gas distribution system component, or in a carbon dioxide sequestration application.

As noted above, devices and systems for the compression/expansion of gas, according to embodiments, are configured for grid scale energy storage. As such, a pneumatic cylinder (or pneumatic portion of a vessel) can be any suitable size for achieving gas compression for grid scale energy storage and/or gas expansion for grid scale energy usage. For example, in some embodiments, a pneumatic cylinder for the first stage of compression (and/or a second or later stage of expansion) can be about 10.3 meters in height and about 3.5 meters in diameter. In another example, a pneumatic cylinder for the second stage of compression (and/or a first or non-late stage of expansion) can be about 10 meters in height and about 1.6 meters in diameter. In some embodiments, a system includes a cylinder (or vessel) up to about 1.6 meters, which is within current technology capabilities for precision machining (e.g., honing and chroming) an inner surface of the cylinder to produce a good seal between a working piston and the inner surface of the cylinder. In some embodiments, a system includes a cylinder (or vessel) larger than about 1.6 meters, which exceeds current technology capabilities for precision machining. Accordingly, such a larger cylinder can include a rolling piston seal, such as that described in U.S. patent application Ser. No. 13/312,467, to Ingersoll et al., filed Dec. 6, 2011, entitled "Compressor and/or Expander Device with Rolling Piston Seal," the disclosure of which is incorporated herein by reference in its entirety.

Additionally, a compression/expansion device according to an embodiment can be configured to compress a volume of gas from a first pressure to a second higher pressure which will occupy a lower volume. For example, in some embodiments, a compression/expansion device can be configured to receive about 15,000 liters to about 20,000 liters of gas at a first pressure (i.e., the inhale volume of the first-stage cylinder at standard atmospheric pressure) at the first stage of compression. For example, the compression/expansion device can be configured to compress about 16,000 liters of gas at the first stage of compression. In some embodiments, the compressor/expander device can be configured to compress the inhale volume of the first-stage cylinder to a pressure about 6 to 10 times its original pressure, thus reducing the volume occupied by that mass of gas to about 2,000-2,500 liters (i.e., the inhale volume of the second-stage cylinder). In some embodiments, the compressor/expander device can be configured to receive about 2,350 liters of gas at a second pressure, higher than the first pressure, at the second stage of compression. In other words, a first pneumatic cylinder of the compression/expansion device can be configured to receive an inhale volume of about 16,000 liters of gas at a first pressure for the first stage of compression and compress the gas during the first stage to about 2,350 liters of gas at a second pressure. A second pneumatic cylinder of the compression/expansion device can be configured to receive an inhale volume of the 2,350 liters of gas at the second pressure from the first pneumatic cylinder and compress the gas to a third pressure, higher than the second pressure. As such, in this example, the first stage of the compressor/expander device can be characterized as being configured to achieve about a 1:6.8 compression ratio.

The compression ratio of the second stage of the compressor/expander device can be characterized as the volume available to contain a mass of gas when the piston is at bottom dead center and the volume available to contain the mass of gas when the piston is at top dead center. In the example described above where the second pneumatic cylinder is configured to receive an inhale volume of the 2,350 liters of gas at the second pressure, the volume available to contain a mass of gas when the piston is at bottom dead center is 2,350. In some embodiments the volume available to contain the mass of gas when the piston is at top dead center is about 178 liters. As such, in this example, the second stage of the compressor/expander device can be characterized as being configured to achieve about a 6.8:90 compression ratio. The second stage of the compressor/expander device can be configured to operate at different pressure ratios to discharge compressed gas to a third stage and/or a compressed gas storage structure by changing the stroke of the piston (i.e., changing the volumetric ratio between bottom dead center and top dead center to define the pressure ratio in the second stage).

Devices and systems used to compress and/or expand a gas can be configured to operate in a compression mode to compress a gas in excess of 700 bar. In some embodiments, a compression/expansion device is configured to compress a gas through two or three stages of compression. For example, the device can be configured to achieve a gas pressure ratio of 1:10 at a first stage of compression, and 10:250 at a second stage of compression. In another example, the device can be configured to achieve a gas pressure ratio of 1:6 at the first stage of compression, 6:90 at the second stage of compression, and, optionally, 90:250 at a third stage of compression. In yet another example, the device can be configured to compress the gas such that the pressure of the gas following the second stage of compression is 15 times greater than the pressure of the gas following the first stage of compress, thus achieving a pressure ratio of 1:15.

Devices and systems used to compress and/or expand a gas can be configured to operate in an expansion mode to expand a gas such that the compressed gas from the compressed gas storage chamber has a pressure ratio to the expanded gas of 250:1. In some embodiments, a compression/expansion device is configured to expand a gas through two or three stages of expansion. For example, the device can be configured to achieve a gas expansion ratio of 250:10 at a first stage of expansion, and 10:1 at a second stage of expansion. In another example, the device can be configured to achieve a gas pressure ratio of 90:9 at the first stage of expansion, and 9:1 at the second stage of compression. In yet another example, the device can be configured to achieve a gas pressure ratio of 250:90 at a first stage of compression, 90:6 or 90:9 at the second stage of compression, and, optionally 6:1 or 9:1 at the third stage of compression.

Devices and systems used to compress and/or expand a gas, such as natural gas, and/or to pressurize and/or pump a liquid, such as water or glycol, can release and/or absorb heat during, for example, a compression or expansion cycle. In some embodiments, one or more pneumatic cylinders can include a heat capacitor for transferring heat to and/or from the gas as it is being compressed/expanded, for example as described in the Ingersoll II application, incorporated by reference above. For example, a heat transfer element can be positioned within the interior of a pneumatic cylinder of a compressor/expander device to increase the amount of surface area within the pneumatic cylinder that is in direct or indirect contact with gas, which can improve heat transfer. In some embodiments, the heat transfer element can be a thermal capacitor that absorbs and holds heat released from a gas that is being compressed, and then releases the heat to a gas or a liquid at a later time. In some embodiments, the heat transfer element can be a heat transferring device that absorbs heat from a gas that is being compressed, and then facilitates the transfer of the heat outside of the pneumatic cylinder.

In another example, heat can be transferred from and/or to gas that is compressed and/or expanded by liquid (e.g., water or glycol) within a pneumatic cylinder. A gas/liquid or gas/heat element interface may move and/or change shape during a compression and/or expansion process in a pneumatic cylinder. This movement and/or shape change may provide a compressor/expander device with a heat transfer surface that can accommodate the changing shape of the internal areas of a pneumatic cylinder in which compression and/or expansion occurs. In some embodiments, the liquid may allow the volume of gas remaining in a pneumatic cylinder after compression to be nearly eliminated or completely eliminated (i.e., zero clearance volume).

A liquid (such as water or glycol) can have a relatively high thermal capacity as compared to a gas (such as natural gas) such that a transfer of an amount of heat energy from the gas to the liquid avoids a significant increase in the temperature of the gas, but only incurs a modest increase in the temperature of the liquid. This allows buffering of the system from substantial temperature changes. Said another way, this relationship creates a system that is resistant to substantial temperature changes. Heat that is transferred between the gas and liquid, or components of the vessel itself, may be moved from or to the pneumatic cylinder through one or more processes. In some embodiments, heat can be moved in or out of the pneumatic cylinder using mass transfer of the compression liquid itself. In other embodiments, heat can be moved in or out of the pneumatic cylinder using heat exchange methods that transfer heat in or out of the compression liquid without removing the compression liquid from the pneumatic cylinder. Such heat exchangers can be in thermal contact with the compression liquid, components of the pneumatic cylinder, a heat transfer element, or any combination thereof. Furthermore, heat exchangers may also use mass transfer to move heat in or out of the pneumatic cylinder. One type of heat exchanger that can be used to accomplish this heat transfer is a heat pipe as described in the Compressor and/or Expander Device applications and the '107 application, incorporated by reference above. Thus, the liquid within a pneumatic cylinder can be used to transfer heat from gas that is compressed (or to gas that is expanded) and can also act in combination with a heat exchanger to transfer heat to an external environment (or from an external environment). Any suitable mechanism for transferring heat out of the device during compression and/or into the device during expansion may be incorporated into the system.

In some embodiments, one or more hydraulic actuators of a compression/expansion device may incorporate "gear change" or "gear shift" features within a single stage of compression or expansion, or during a cycle or stroke of the actuator, to optimize the energy efficiency of the hydraulic actuation, as described in more detail below with reference to FIGS. 14A-14D and 15A-15C, as well as in the Ingersoll I application, the '675 application, and the '862 application, each incorporated by reference above.

Referring to FIGS. 14A-14D and 15A-15C, embodiments of a hydraulic drive system or actuator that can be used to selectively adjust the ratio of hydraulic fluid pressure to the pressure of fluid on a working piston that bounds a working chamber are illustrated. For example, an actuator can be used to actuate a working piston within a compression and/or expansion device to compress or expand a gas (e.g., air or natural gas). The compression and/or expansion device can include a reservoir or housing that can contain a gas, a liquid, and/or both a gas and a liquid. An actuator can include one or more states or gears, as described herein, to control the movement of the working piston and to maintain a desired relationship between the pressure of fluid in the working chamber and the pressure of the hydraulic fluid in the actuator.

Figure 14A:
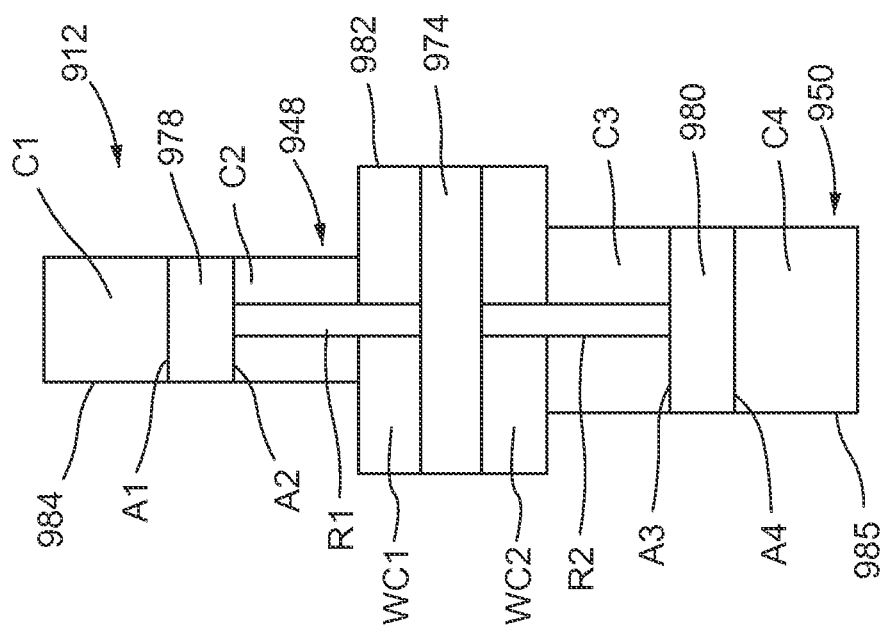
FIG. 14A is a schematic illustration of an actuator according to an embodiment.

In the embodiment shown in FIG. 14A, the hydraulic actuator arrangement includes two hydraulic cylinders, each having a different diameter and a different size (e.g., diameter) hydraulic piston that can actuate (or be actuated by) a working piston (or other driven member) at different hydraulic pressures. Because of the different sized hydraulic pistons, the number of gears and gear shifts can be increased (as compared to an actuator including two hydraulic pistons having the same diameter) due to the various combinations of operating surface areas available to pressurize the hydraulic pistons on either side of the working piston. By having more gears and gear shifts, the hydraulic actuator can operate with a higher degree of pressure selectivity, and thereby possibly operate a pump/motor in a more efficient range of hydraulic pressure for a given range of fluid pressure in the working chamber, or can operate in the same range of hydraulic pressure with a wider range of working chamber pressure, and/or to more closely control the desired output (or input) pressure, flow rate and/or direction of force desired at different stages of operation of a water pump and/or a compression and/or expansion device or system.

FIG. 14A schematically illustrates the various components of a portion of an actuator 912 of, or operably coupled to, the hydraulic actuator arrangement. As shown in FIG. 14A, the actuator 912 includes a hydraulic cylinder 948 and a hydraulic cylinder 950. The hydraulic cylinder 948 includes a housing 984 and a hydraulic piston 978 (also referred to herein as "first hydraulic piston") movably disposed within an interior region defined by the housing 984. The hydraulic cylinder 950 includes a housing 985 and a hydraulic piston 980 (also referred to herein as "second hydraulic piston") movably disposed within an interior region of the housing 985. Each hydraulic piston 978, 980 has a first side and a second side.

The hydraulic actuator arrangement is operatively coupled to a hydraulic pump, which is operable to deliver hydraulic fluid over at least a hydraulic pressure range that includes a predetermined lower pressure and a predetermined upper pressure, greater than the lower pressure, to enable selective delivery of pressurized hydraulic fluid from the hydraulic pump to one or both of the first side and the second side of each of the hydraulic pistons 978, 980 to yield an output force in a first force range corresponding to a first combination, and to yield an output force in a second force range, greater than the first force range, corresponding to a second combination. The hydraulic actuator arrangement is operable with the hydraulic pump to sequentially yield the first force range on the working piston 974 to compress a first mass of gas to a first pressure range, which can be a pressure range at which the gas is discharged from a working chamber (e.g., WC1 or WC2) to a first storage chamber (not shown in FIG. 14A) of a storage system (not shown in FIG. 14A; e.g., storage system 304) to displace liquid from the first storage chamber to a second storage chamber, and a second force range on the working piston to compress a second mass of gas to a second pressure range.

The hydraulic piston 978 divides the interior region of housing 984 of the hydraulic cylinder 948 into two portions:

a hydraulic fluid chamber C1 above the hydraulic piston 978 and a hydraulic fluid chamber C2 below the hydraulic piston 978. Similarly, the hydraulic piston 990 divides the interior region of housing 985 of the hydraulic cylinder 950 into two portions: a hydraulic fluid chamber C3 above the hydraulic piston 980 and a hydraulic fluid chamber C4 below the hydraulic piston 980. The hydraulic fluid chambers C1 and C2 can be referred to as the blind side and the rod side, respectively, of the hydraulic cylinder 948, and the fluid chambers C3 and C4 can be referred to as the rod side and the blind side, respectively, of the hydraulic cylinder 950.

The hydraulic piston 978 has an operating surface area A1 on the side of the hydraulic piston 978 associated with fluid chamber C1 (the blind side) and an operating surface area A2 on the side associated with the fluid chamber C2 (the rod side). The hydraulic piston 980 has an operating surface area A3 on the side of the hydraulic piston 980 associated with the fluid chamber C3 (the rod side) and an operating surface area A4 on the side associated with fluid chamber C4 (the blind side).

Thus, because of the different sized hydraulic pistons and/or the different sized drive rods R1 and R2, the operating surface areas A1 and A2 of the hydraulic piston 978 are different than the operating surface areas A3 and A4 of the hydraulic piston 980. For example, the rod side operating surface area A2 of hydraulic piston 978 can be smaller than the rod side operating surface area A3 of hydraulic piston 980. It is appreciated that R2 can be made bigger than R1 to a degree that can make A2 equal to A3, or A2 greater than A3. In an example in which hydraulic piston 978 has a smaller diameter than hydraulic piston 980, the blind side operating surface area A1 of hydraulic piston 978 is smaller than the blind side operating surface area A4 of hydraulic piston 980.

The hydraulic piston 978 is coupled to a driven member (in this embodiment a working piston) 974 via a drive rod R1 and the hydraulic piston 980 is coupled to the working piston 974 via a drive rod R2. The working piston 974 is movably disposed within a housing 982 having an interior region that is divided by the working piston 974 into two working chambers, WC1 and WC2, each configured to contain a fluid (e.g., water and/or air). The drive rods R1 and R2 slidably extend though respective openings in the housing 982, each of which can include a seal such that the drive rods R1 and R2 can move within the openings to actuate the working piston 974, but fluid cannot pass between the working chambers WC1, WC2 and the hydraulic fluid chambers C2 and C3, respectively. In this embodiment, a diameter of the drive rod R1 is less than a diameter of the drive rod R2 and a diameter of the hydraulic piston 978 is smaller than a diameter of the hydraulic piston 980.

The actuator 912 can be operated in one of multiple different gears or states at any given time period during a cycle of the actuator 912 by varying the effective piston ratio (e.g., the net operating surface area of the hydraulic pistons to the surface area of the driven member, e.g. working piston) during a cycle or stroke of the actuator 912. For a given hydraulic fluid pressure, the pressure of a working fluid within the housing 982 can be varied by varying the net operating hydraulically pressurized area of the hydraulic pistons, for convenience the possible area variations can be referred to as "gears". When the system makes a change in the ratio of the pressure of the hydraulic fluid in the hydraulic actuator to the pressure of the liquid in the working chamber actuated by the hydraulic actuator (i.e., the ratio of the pressurized surface area of the working piston to the net operating pressurized surface area(s) of the hydraulic piston(s) actuating the working piston) this is referred to as a "gear shift" or "gear change"

A variety of different combinations or sequences of gear changes (changes in piston area ratios) that can be incorporated into a particular operating sequence of the system.

Conversely, for a given working fluid pressure, the hydraulic fluid pressure can be varied, e.g. in an expansion cycle. The quantity and sequence of gears can be varied as desired to achieve a desired relationship between the pressure of the working fluid within the reservoir (which is essentially the same as the pressure of the fluid in the working chamber) and the hydraulic fluid pressure supplied from (or supplied to) the hydraulic pump/motor. Thus, the actuation of the working piston (whether driving gas compression or being driven by gas expansion) can be fine tuned by configuring an optimal gear sequence for a given stroke of the hydraulic actuator 912. As previously described, the number of possible gears for a given actuator can be based on the number of hydraulic cylinders, the size of the pistons, the size of the drive rods and the size of the working piston. In this embodiment, because the pistons 978 and 980 have different diameters and the drive rods R1 and R2 have different diameters, the 16 possible states of the actuator (each of the four chambers can be pressurized or not pressurized) can define 15 possible gears for which the actuator 912 (since the state in which no chambers are pressurized does not produce any net hydraulic piston area). In other embodiments, the drive rods R1 and R2 have the same diameter, and thus the number of possible gears is 14, because when all of the chambers are pressurized, the resulting net operating surface area will be equal to zero, as described in more detail below.

Figure 14B:
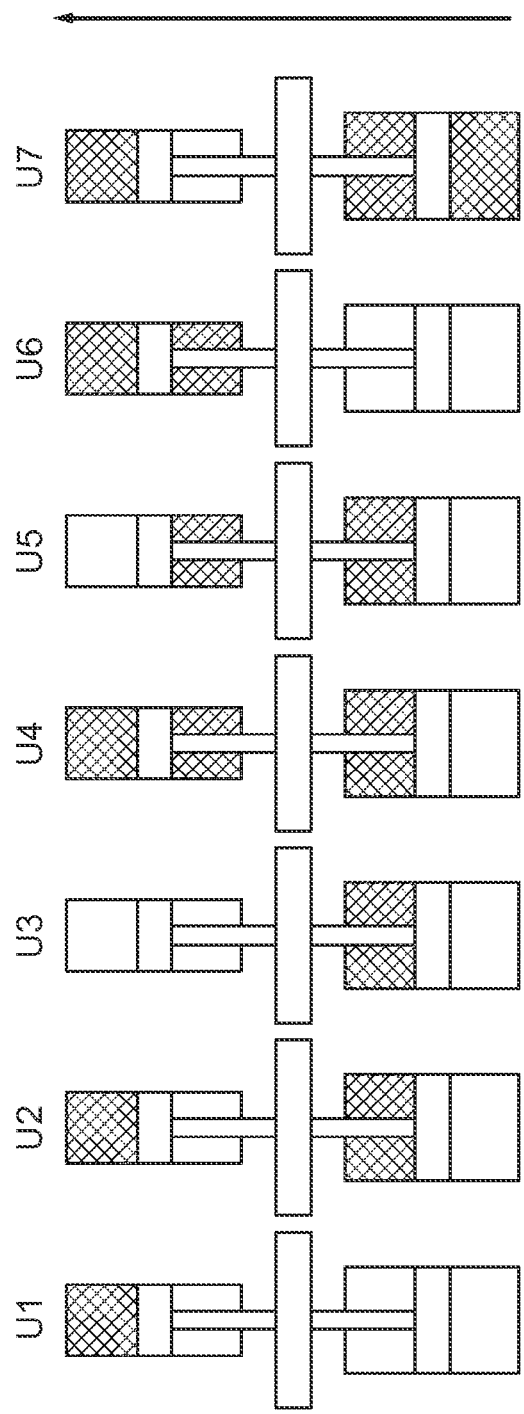
FIG. 14B-14C each include multiple schematic illustrations of the actuator of FIG. 14A showing different gears of the actuator.
Figure 14C:
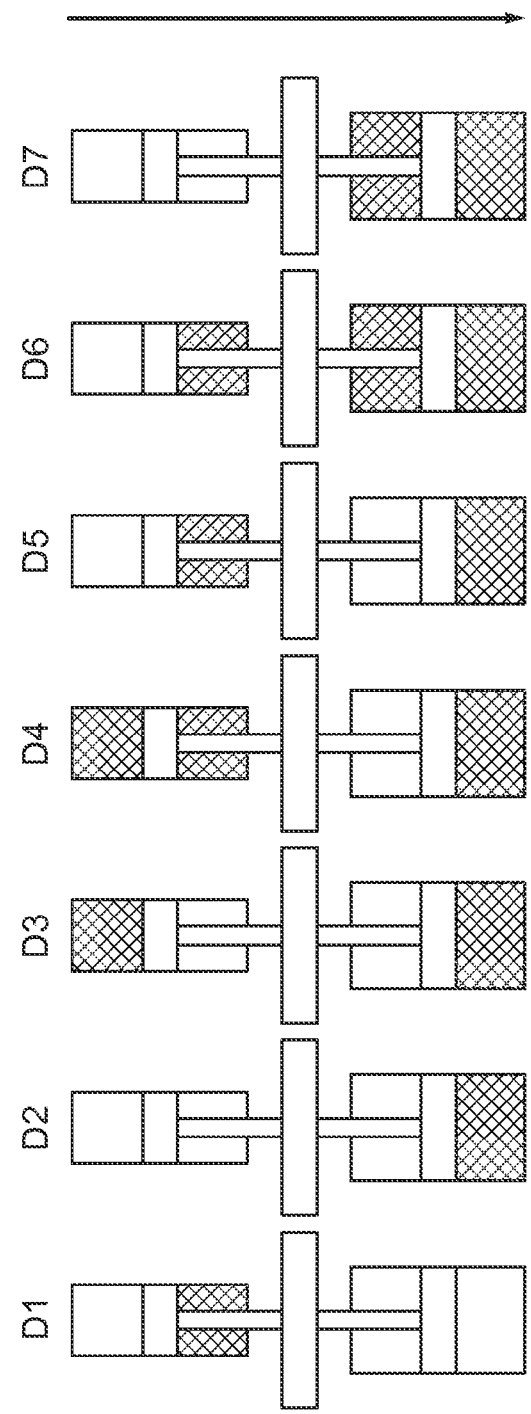

FIGS. 14B and 14C each illustrate different possible gears in which the actuator 912 can operate. These gears are identified for ease of reference as D1-D7 and U1-U7, but this numbering scheme does not necessarily indicate that the states are in order of net surface area. FIG. 14B illustrates gears of the actuator 912 in which the working piston 974 can be driven upward by the actuator 912 (or in which upward movement of the working piston can drive the actuator), and FIG. 14C illustrates gears of the actuator 912 in which the working piston 974 can be driven downward by the actuator 912 (or in which downward movement of the working piston can drive the actuator). As shown in FIGS. 14B and 14C, for a given gear (e.g., D1-D7, U1-U7) of the actuator 912, if a fluid chamber (e.g., C1, C2, C3, C4) is active, i.e. in fluidic communication with the high pressure side of the hydraulic pump/motor (either to receive, and be driven by, pressurized hydraulic fluid provided by the hydraulic pump/motor acting as a pump, or to provide pressurized hydraulic fluid to, and drive, the hydraulic pump/motor acting as a motor), it is shown un-shaded and if a fluid chamber is inactive, i.e. is fluidically isolated from the high pressure side of the hydraulic pump/motor, it is shown shaded (cross-hatched) for that particular gear.

FIG. 14D is a table that includes information that corresponds to the various gears (e.g., D1-D7 and U1-U7) of the actuator 912 in FIGS. 14B and 14C. The table also shows a gear U8 (not shown in FIGS. 14B and 14C) in which all of the chambers C1-C4 are pressurized (described in more detail below). The table of FIG. 14D also shows the associated chambers (C1-C4) of the actuator 912 that are active (in fluidic communication with the high pressure side of the hydraulic pump/motor) for each gear (D1-D7, U1-U8). Specifically, as shown in the table, for a particular gear, P indicates that a chamber (e.g., C1, C2, C3, C4) is pressurized (active), and N indicates that a chamber is not pressurized (inactive). The column labeled DIR indicates which direction a force will be exerted by an active hydraulic fluid chamber (e.g., C1-C4). For example, if only chamber C1 is active (in fluidic communication with the high pressure side of the hydraulic pump/motor), the resulting force on the driven member (e.g. working piston 947) will be in a down direction, and if only chamber C2 is active, the resulting force will be in an up direction. It is understood that "pressurized" means at a first pressure that is relatively high with respect to a second pressure referred to a "not pressurized."

The net operating surface area $A_{net}$ of the actuator 912 for a particular gear is equal to the total of the surface areas (e.g., A1, A2, A3, A4) associated with the chambers (C1-C4) that are active for that gear. For purposes of illustration, the sign convention used in this example refers to a force exerted on the surface areas A1 and A3 as being in a positive (+) direction, and a force exerted on the surface areas A2 and A4 as being in a negative (−) direction. Thus, in this example, considering the driven member to be working piston 974 operating in a compression mode, if the net operating surface area $A_{net}$ is negative, the actuator 912 will cause the working piston 974 to move in the up direction (e.g., gears U1-U8), and if the net operating surface area is positive, the actuator 912 will cause the working piston 974 to move in the down direction. Conversely, if the driven member is working piston 974 operating in an expansion mode, when expanding gas drives working piston 974 in the up direction, gears U1-U8 will be operative so that the active hydraulic chambers associated with those gears to pressurize hydraulic fluid in those chambers and supply that fluid to, and drive in a motor mode, the hydraulic pump/motor.

The different gears can be activated by placing selected hydraulic fluid chambers (e.g., C1, C2, C3, and/or C4) of the actuator 912 into fluidic communication with hydraulic fluid at a working hydraulic pressure (such as supplied by a hydraulic pump/motor operating as a pump, or supplied by the hydraulic fluid chambers to the hydraulic pump/motor operating as a motor), and fluidically isolating the other chambers from the working hydraulic pressure. For example, one or more valves can be coupled to each of the chambers C1-C4 that can be selectively opened (e.g. by a hydraulic controller, as described above and as described below with reference to actuator 1012 shown in FIG. 15A) to establish fluidic communication with the high pressure side of the hydraulic pump/motor and to allow hydraulic fluid to be pumped into the chamber. Conversely, the one or more valves can be controlled to isolate the chamber(s) from the high pressure side of the hydraulic pump/motor and to establish fluidic communication with a low pressure reservoir of hydraulic fluid, e.g. to allow hydraulic fluid to be expelled or drained from the chamber as the associated piston moves to reduce the volume of the chamber. One or more gears can be actuated during a single cycle or stroke of the actuator 912 to achieve the desired output pressure of a fluid within the housing 982. In addition, the order of the gears can be varied. Thus, although the gears are labeled D1-D7 and U1-U8 in the figures, the actuator 912 can cycle through one or more gears in a variety of different combinations and orders. For example, in one cycle, the actuator 912 can be configured to cycle through gears D7, D6, D2 and D5, to incrementally increase the pressure of the working fluid within the housing 982 during the cycle.

In one example, as shown in the table of FIG. 14D, and referring to FIG. 14C, to actuate the gear D7, hydraulic fluid at a working pressure is selectively communicated to the chamber C1 and the chamber C2 of the hydraulic cylinder 948 and will exert hydraulic pressure on surface areas A1 and A2 in a down and an up direction, respectively. Because the surface area A1 is greater than the surface area A2, the net operating surface area $A_{net}$ (A1−A2) will be positive, and the resulting hydraulic force will move the hydraulic piston 978 downward, which in turn will move the working piston 974 downward. In another example, to actuate the gear U2, hydraulic fluid at a working pressure is selectively communicated to the chamber C2 and C4, as shown in FIG. 14B, which will exert hydraulic pressure on surface areas A2 and A4 in an up direction, resulting in a net operating surface area $A_{net}$ that is negative ($A_{net}$=−A2+−A4). Thus, the hydraulic force will move the hydraulic piston 978 upward, which in turn will move the working piston 974 upward.

Referring to gear U8 in the table of FIG. 14D (but not shown in FIGS. 14B and 14C), if hydraulic fluid at a working pressure is selectively communicated to all the chambers (C1-C4), hydraulic pressure will be exerted on surface areas A1 and A3 in a down direction (i.e., positive), and surface areas A2 and A4 in an up direction (i.e., negative) and the resulting net operating surface area will be $A_{net}$=A1−A2+A3−A4. Because the diameter of drive rod R1 and the diameter of drive rod R2 are different in this example embodiment, the resulting net operating area $A_{net}$ will not be equal to zero; rather, there is a net operating surface area $A_{net}$, which is equal to the difference in the cross-sectional areas of the two rods. If the diameter of drive rod R1 and the diameter of drive rod R2 are equal, the resulting net operating surface area will be zero, and thus the force on the working piston will be zero.

The bottom row of the table of FIG. 14D illustrates the possible gears associated with the actuator 912 if the blind side and rod side surface areas of the hydraulic piston 978 are the same as the blind side and rod side surface areas of the hydraulic piston 980, respectively (i.e., diameter of piston 978=diameter of piston 980, A4=A1, A2=A3 and R1=R2). As shown in the table, and referring, for example, to gear D1 in FIG. 14C, in such an embodiment, if hydraulic fluid at a working pressure is selectively communicated to fluid chambers C1, C3 and C4, because the pistons 978 and 980 are equal in this example, the hydraulic pressure exerted on surface areas A1 and A4 will cancel each other out, and the resulting net operating surface area $A_{net}$ will be equal to surface area A3. This will cause the hydraulic piston 980 to move downward, which in turn will move the water piston 974 downward. In another example, if hydraulic fluid at a working pressure is selectively communicated to fluid chambers C2 and C3, as shown in gear D3 in FIG. 14C, because the surface area A1 equals the surface area A3, in this example, the resulting force on the water piston will be zero. As shown in the table, in this example (e.g., where piston 978=piston 980, and rod 2=rod 3), gear D6 is the same as gear D3, and gear D2 is the same as gear D5. Thus, the total number of different gears available for such an embodiment is equal to 8; 4 in an up direction and 4 in a down direction.

Figure 15A:
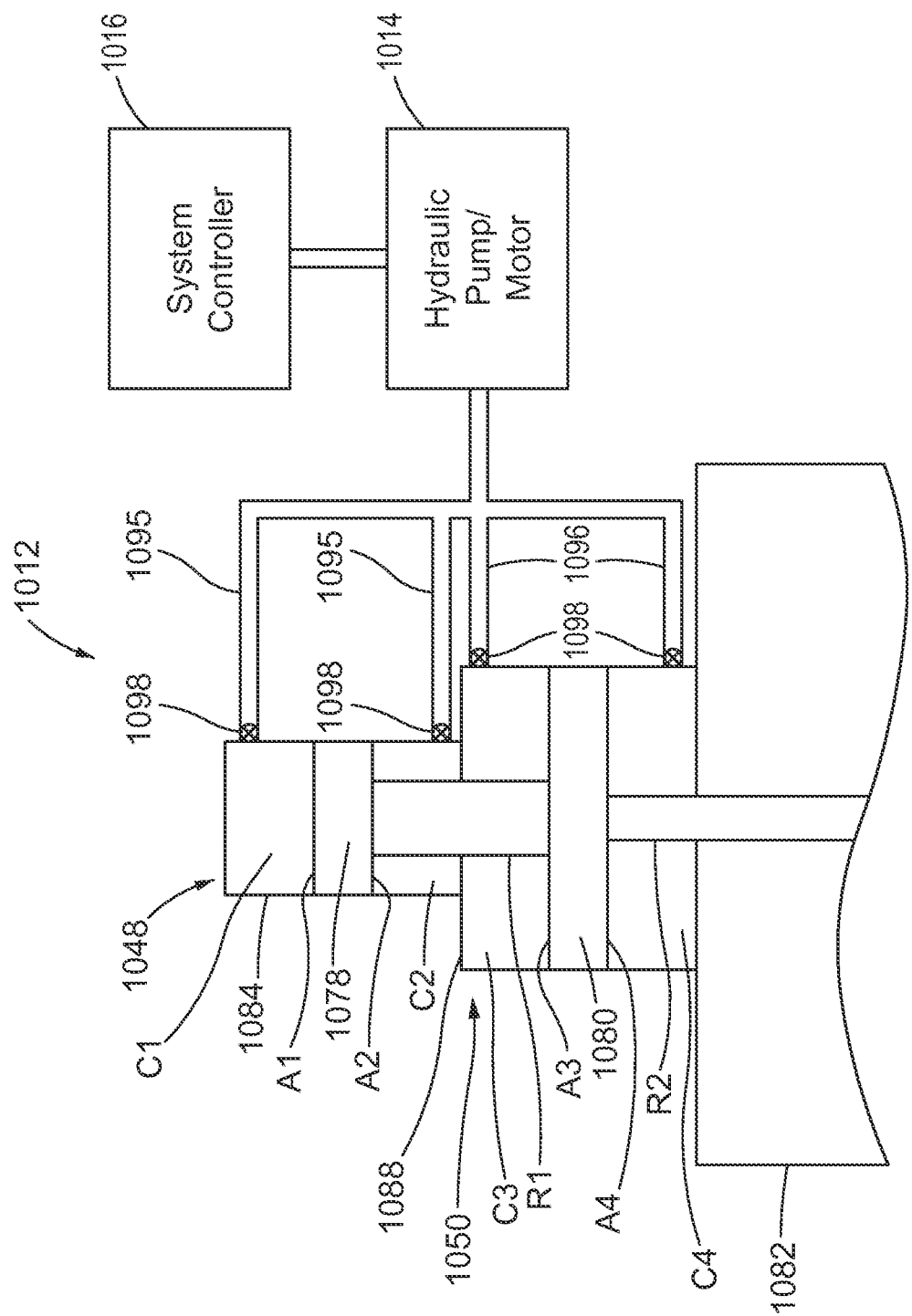
FIG. 15A is a schematic illustration of an actuator according to an embodiment.

FIG. 15A illustrates another embodiment of an actuator that can be used with the devices and systems described herein. This embodiment illustrates an actuator that can include multiple hydraulic cylinders operatively coupled on one end of a working piston and configured to actuate the working piston. FIG. 15A illustrates two different sized hydraulic cylinders, each having different diameter hydraulic pistons. It should be understood, however, that more than two hydraulic cylinders can be used and/or one or more hydraulic cylinders can also be operatively coupled to the opposite end of the working piston.

Specifically, FIG. 15A schematically illustrates the various components of a portion of an actuator 1012. As shown in FIG. 15A, the actuator 1012 includes a hydraulic cylinder 1048 including a housing 1084 that defines an interior region and a hydraulic piston 1078 movably disposed within the interior region of the housing 1084, and a hydraulic cylinder 1050 including a housing 1088 and a hydraulic piston 1080 movably disposed within the interior region of the housing 1088. A drive rod R1 is coupled to the hydraulic piston 1080 of the hydraulic cylinder 1050 and the hydraulic piston 1078 of the hydraulic cylinder 1048, and a drive rod R2 is coupled to the hydraulic piston 1080 of the hydraulic cylinder 1050 and can be coupled to a working piston (not shown) disposed within a housing 1082 configured to contain a volume of fluid, as described above for previous embodiments. In this example embodiment, the hydraulic piston 1078 has a smaller diameter than the hydraulic piston 1080 and a diameter of the hydraulic drive rod R1 is greater than a diameter of the hydraulic drive rod R2. It should be understood, however, that the hydraulic piston 1078 can alternatively be the same size as, or larger than, the hydraulic piston 1080. Similarly, the hydraulic drive rods R1 and R2 can alternatively be the same size, or the hydraulic drive rod R2 can be greater than the hydraulic drive rod R1.

The housing 1084 of the hydraulic cylinder 1048 defines within its interior region a fluid chamber C1 above the hydraulic piston 1078 and a fluid chamber C2 below the hydraulic piston 1078. Similarly, the housing 1088 of the hydraulic cylinder 1050 defines within its interior region a fluid chamber C3 above the hydraulic piston 1080 and a fluid chamber C4 below the hydraulic piston 1080. In this embodiment, the fluid chambers C1 and C2 can be referred to as a blind side and a rod side, respectively, of the hydraulic cylinder 1048, and the fluid chambers C3 and C4 can be referred to as a first rod side and a second rod side, respectively, of the hydraulic cylinder 1050.

The hydraulic cylinder 1048 is coupled to a hydraulic pump/motor 1014 (or other suitable source of pressurized hydraulic fluid) via conduits 1095, and the hydraulic cylinder 1050 is coupled to the hydraulic pump/motor 1014 via conduits 1096. The hydraulic pump/motor 1014 is coupled to a system controller 1016 that can be used to operate and control the hydraulic pump/motor 1014 as described for previous embodiments. A valve 1098 is coupled between each chamber of the hydraulic cylinders 1048 and 1050 and the hydraulic pump/motor 1014 that can be selectively opened and closed, e.g. under control of the system controller 1016, to fluidically couple or fluidically isolate, respectively, the high pressure side of the hydraulic pump/motor 1014 to each chamber so that the system or hydraulic controller 1016 can selectively actuate (supply pressurized hydraulic fluid to) one or both chambers of one or both of the hydraulic cylinders 1048 and 1050 in a similar manner as described above for previous embodiments.

The hydraulic piston 1078 has an operating surface area A1 on the side associated with fluid chamber C1 (e.g., the blind side) and an operating surface area A2 on the side associated with the fluid chamber C2 (e.g., the rod side). The hydraulic piston 1080 has an operating surface area A3 on the side of the hydraulic piston 1080 associated with the fluid chamber C3 (e.g., the first rod side) and an operating surface area A4 on the side associated with fluid chamber C4 (e.g., the second rod side).

In this example embodiment, and as shown in FIG. 15A, the operating surface areas A1 and A2 of the hydraulic piston 1078 are different than the operating surface areas A3 and A4 of the hydraulic piston 1080. For example, the operating surface area A2 of hydraulic piston 1078 is smaller than the operating surface areas A3 and A4 of hydraulic piston 1080. The operating surface area A4 of hydraulic piston 1080 is greater than the operating surface area A3 of hydraulic piston 1080, and both are larger than the operating surface areas A1 and A2 of hydraulic piston 1078.

Figure 15B:
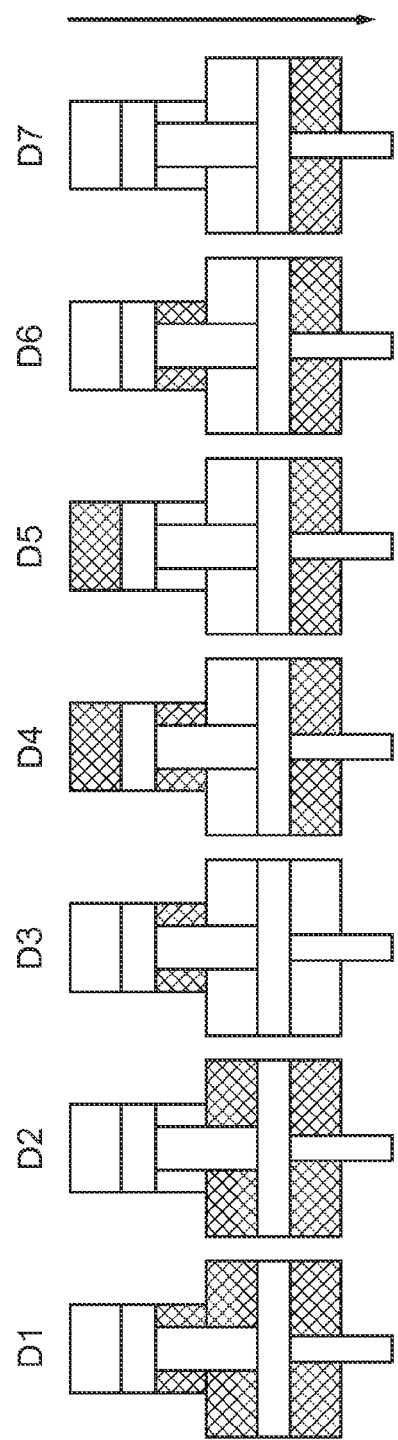
FIG. 15B-15C each include multiple schematic illustrations of the actuator of FIG. 15A showing different gears of the actuator.
Figure 15C:
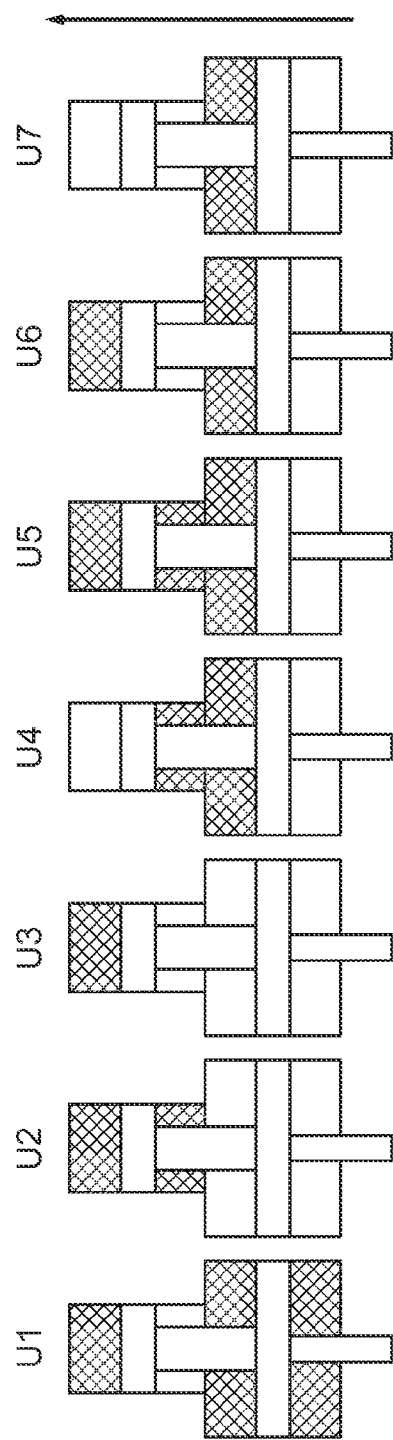

FIGS. 15B and 15C each illustrate different possible states or gears (identified as D1-D7, U1-U7) in which the actuator 1012 can operate. FIG. 15B illustrates gears of the actuator 1012 in which the actuator 1012 can move a working piston coupled to the drive rod R2 upward within the housing 1082, and FIG. 15C illustrates gears in which the actuator 1012 can move the working piston downward within the housing 1082. As with the previous embodiment, for a particular gear (e.g., D1-D7, U1-U7) shown in FIGS. 15B and 15C, if a fluid chamber (e.g., C1, C2, C3, C4) is pressurized with hydraulic fluid, it is shown unshaded, and if the fluid chamber is not pressurized with hydraulic fluid it is shown shaded.

The different gears can be activated by selectively fluidically coupling a source of hydraulic fluid at a working hydraulic pressure (e.g. via the hydraulic pump/motor 1014 described above) to one or more of the fluid chambers (e.g., C1, C2, C3, and/or C4) of the actuator 1012, as described for previous embodiments. For example, a selected one or more of the valves 1098 can be selectively opened to pump hydraulic fluid into one or more of the chambers and/or to drain hydraulic fluid out of one or more of the chambers (e.g., at the end of a stroke). One or more of the gears can be actuated during a given cycle of the actuator 1012 to achieve a desired output pressure of the fluid within the housing 1082. The order of the gears can also be varied. Thus, although the gears are labeled D1-D7 and U1-U7 in FIGS. 15B and 15C, the actuator 1012 can cycle through one or more gears in a variety of different combinations and orders as described above for previous embodiments.

A net operating surface area $A_{net}$ of a particular gear is equal to the total of the surface areas (e.g., A1, A2, A3, A4) associated with the chambers (e.g., C1-C4) that are pressurized for a given gear. As described above, in this example embodiment, one or more hydraulic cylinders can also optionally be coupled to an opposite end of the working piston. In such an embodiment, the net operating surface area $A_{net}$ of a particular gear will also include the surface areas associated with pressurized chambers of the hydraulic cylinder(s) operating on the opposite end of the working piston in a similar manner as described above for actuator 912.

In other embodiments, an actuator can be configured to have a different number of possible different gears and gear changes based on, for example, the number of hydraulic cylinders, the size (e.g., diameter) of the housing of a hydraulic cylinder in which a hydraulic piston is movably disposed, the size (e.g., diameter) of the hydraulic pistons disposed within the housing of the hydraulic cylinders, the number and size of drive rods coupled to the hydraulic pistons, and/or the size of the working piston to be actuated. Further examples of actuators are described in the Ingersoll I application incorporated by reference above.

Thus, the hydraulic pressure time profile can be varied as needed to achieve a particular output air pressure. The efficiency range of the hydraulic pump system can determine the number of gears and gear shifts that may be needed for a desired air pressure range (difference between input or start pressure and output or end pressure). For example, if the hydraulic pump's efficiency range is narrower, then more gears may be needed for a given air pressure range. The size and number of gears can also depend on the particular operating speed (e.g., RPM) of the system.

The compressor/expander system can be configured for use with any suitable compressed gas storage chamber, including, for example, an underground storage structure (e.g., a pressure compensated salt cavern, as described above). Examples of suitable storage structures are described in the '904 application, incorporated by reference above. The compressor/expander system can also be used with other types of storage, including, but not limited to, tanks, underwater storage vessels, pipelines (underground and/or above ground), another above ground storage vessel, and the like. In some embodiments, for example, the compressor/expander system can be used with a storage system similar in many respects to storage system 304 and an additional type of storage, such as one or more pipelines. The third type of storage (not shown) can include, for example, a third storage chamber fluidically coupleable to the first storage chamber (e.g., first storage chamber 416) and which is configured to contain a quantity of gas.

For example, although systems have been illustrated and described herein as including a compressor/expander device in use with a certain type of gas storage chamber system, in other embodiments, a system can include a differently configured gas storage system. The following discussion compares the operation of compressed gas storage/compressed gas energy storage systems that include a first storage chamber/second storage chamber structure with a liquid pressure compensation mechanism to systems that do not. First, an embodiment is described that uses a single storage cavern, with no liquid. Then two different embodiments of systems with liquid pressure compensated first storage chamber/second storage chamber structures are described. In each case, it is assumed that to maintain the integrity of the compressed gas storage structure (e.g. a salt cavern) and/or to meet regulatory requirements, gas and/or liquid having a minimum predetermined pressure must be maintained in the storage structure at all times. As will be apparent from the discussion below, the liquid pressure compensation technique allows for a smaller quantity of compressed gas to be used to maintain the requisite minimum pressure for a given storage cavern size. This allows more compressed gas energy to be stored in a given volume storage cavern, and/or a greater proportion of stored compressed gas (e.g. commodity gas such as natural gas) to be recovered from the storage cavern.

FIG. 7 illustrates a compressed gas storage/compressed gas energy storage system 600 that does not include a liquid pressure compensation technique or a low storage/high storage structure. The system 600 includes a motor and/or generator device 671 ("motor" 671), a compressor/expander device and/or expander device 601 ("compressor/expander device/expander device"), a storage chamber (also referred to herein as a storage cavern) 606 and a gas pathway 612. The system 600, or portions thereof, can be similar in many respects to systems and/or similar portions of systems described herein with respect to other embodiments. The system 600 can be used, for example to store energy in the form of a compressed gas (e.g. natural gas) in the storage cavern 606. The motor 671 can be operatively coupled to a power supply (not shown in FIG. 7) and when power generation exceeds demand and/or when a natural gas supply exceeds demand, power can be directed from the power supply to the motor 671 to operate the compressor/expander device 601 to store the excess power and/or the excess natural gas in the form of compressed gas. When demand exceeds power generation and/or the natural gas supply, the compressed gas can later be expanded through the compressor/expander device 601 to drive the motor 671, thereby returning natural gas to a pipeline system for distribution and generating power to supplement the power supply.

The compressor/expander device/expander device 601 is in fluid communication with a gas source (not shown in FIG. 7) such as, for example, a source of natural gas, and fluidly coupled via the gas pathway 612 to the storage cavern 606 to which gas can be transferred after being compressed. Valves can be used to open and close the fluid communication between the compressor/expander device 601 and the gas source and between the compressor/expander device 601 and the storage cavern 606. As the compressor/expander device 601 delivers compressed gas to the storage cavern 606, the pressure within the storage cavern 606 increases until the pressure reaches a predetermined level and/or substantially equals the pressure of the compressed gas being delivered from the compressor/expander device 601.

Figure 8C:
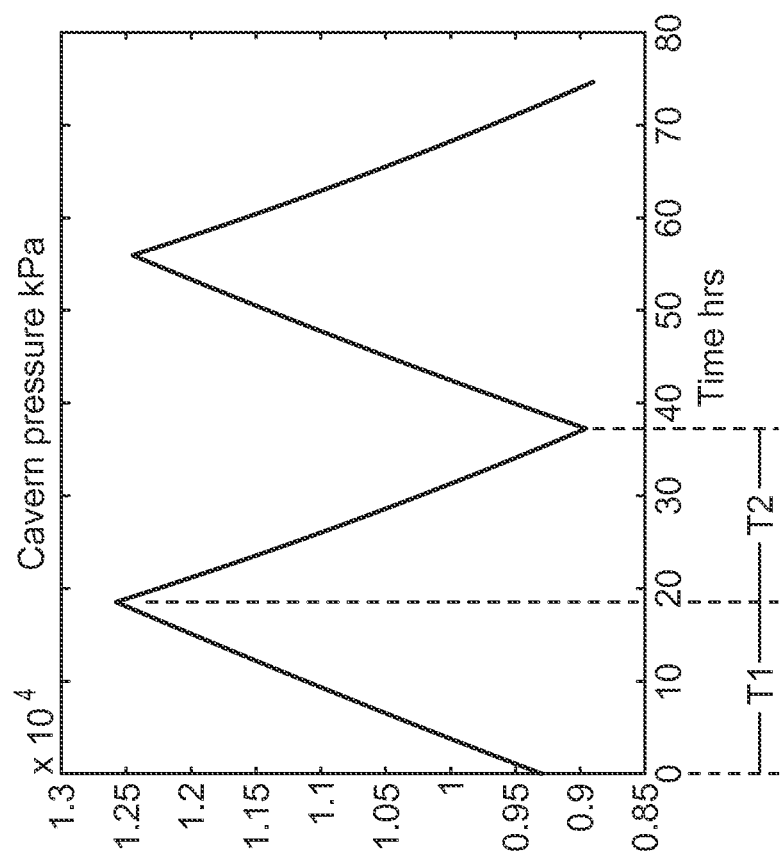

FIGS. 8A-8E are example graphs illustrating the fluid dynamics and energy storage capabilities of the system 600 shown in FIG. 7. The values shown in FIGS. 8A-8E are exemplary and for comparisons purposes only and the systems and methods described herein are not limited to the data disclosed in these figures. FIG. 8A illustrates the flow of compressed gas from the compressor/expander device 601 to the storage cavern 606 during time period T1 and the flow of compressed gas from the storage cavern 606 to the compressor/expander device 601 during time period T2. As shown in this example, the flow rate of gas to and from the storage cavern 606 remains relatively constant throughout T1 and T2. FIG. 8B illustrates the mass of gas within the storage cavern 606 as the compressed gas is transferred from the compressor/expander device 601 to the storage cavern 606 during time period T1 and the flow of compressed gas from the storage cavern 606 to the compressor/expander device 601 during time period T2.

As compressed gas is transferred from the compressor/expander device 601 to the storage cavern 606, the gas pressure within the storage cavern 606 increases as illustrated in FIG. 8C during time period T1 and decreases as compressed gas is being withdrawn from the storage cavern 606 during time period T2. The gas pressure in the storage cavern 606 increases until the pressure in the storage cavern 606 reaches a predetermined level (e.g., the maximum operating pressure of the cavern) and can decrease until the pressure in the storage cavern 606 reaches a predetermined level (e.g., the minimum operating pressure of the cavern).

In the illustrated example, the volume of the storage cavern 606 is 42,132 m$^3$, the top of the low storage cavern is 745 m below ground level, while the bottom of the cavern is 849.8 m below ground level.

As can be seen by comparing FIGS. 8B and 8C, the pressure of the gas in the storage cavern 606 is at a minimum at the start of a compression cycle and the end of an expansion cycle (e.g. at the start of T1 and the end of T2), and this corresponds to the minimum points for the mass of gas in the storage cavern 606. In this example, the low pressure of 9,300 corresponds to a mass of 4,400,000 kg of gas at a temperature of 311 K in a storage cavern 606 having a volume of 42,132 m$^3$.

Figure 8E:
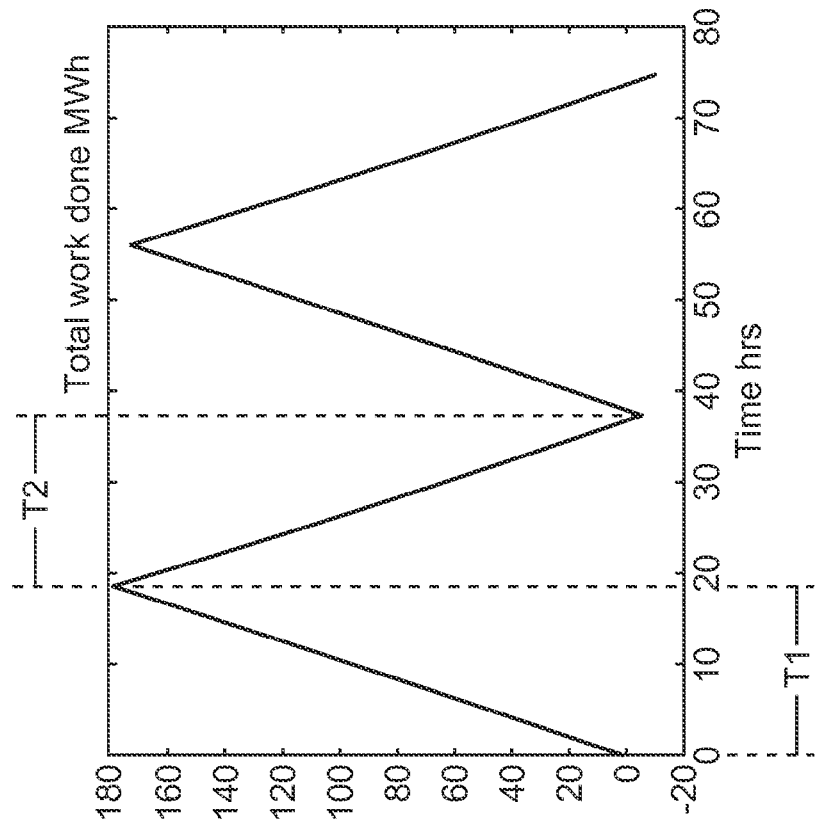
Figure 8D:
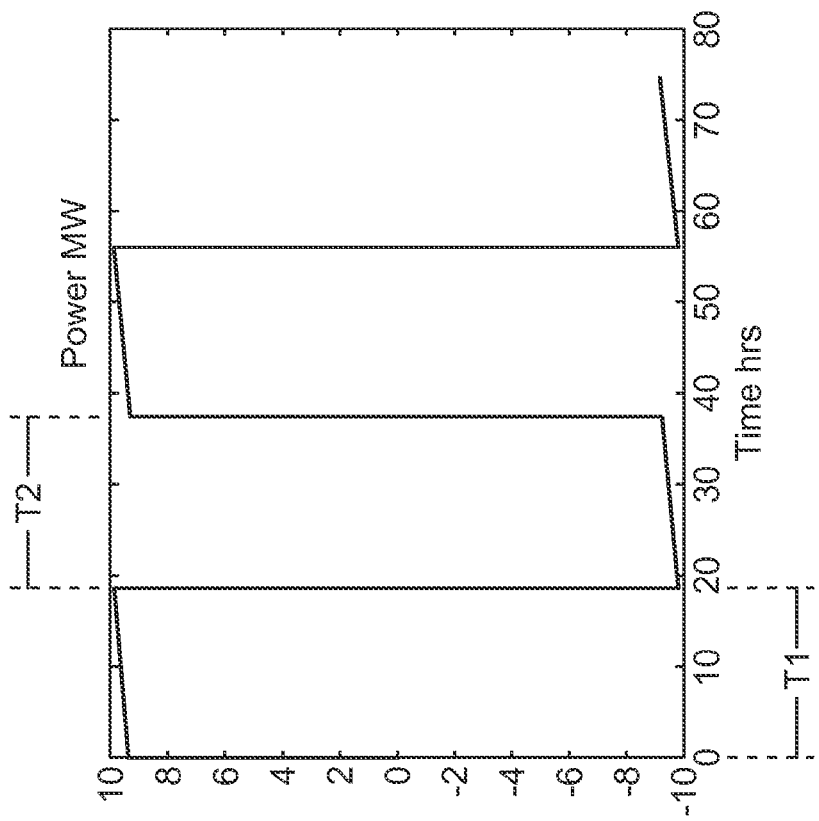

FIG. 8D illustrates the rate of power usage by the system 600 to compress gas and transfer the compressed gas to the storage cavern 606 during time period T1 and the rate of power produced by the system 600 by expanding the previously stored compressed gas during time period T2. Similarly, FIG. 8E illustrates the amount of energy stored by the system 600 during time period T1 and the amount of energy released from storage during time period T2.

FIG. 9 illustrates a compressed gas storage/compressed gas energy storage system 700 according to another embodiment, employing the liquid pressure compensation technique with a low storage/high storage structure. The system 700 includes a motor and/or generator device 771 ("motor" 771), a compressor/expander device and/or expander device 701 ("compressor/expander device" 701), a low storage 706, a high storage 708, a gas pathway 712, and a liquid pathway 714. The system 700 can be used, for example to store a commodity gas (e.g., natural gas), and/or to store energy in the form of a compressed gas (e.g. natural gas) and/or pumped liquid (e.g. water or brine) in one or both of the low storage 706 and high storage 708. In some embodiments, the system 700 can include a pump and/or generator (not shown in FIG. 9) disposed in the liquid pathway 714 between the low storage 706 and the high storage 708.

The motor 771 can be operatively coupled to a power supply (not shown in FIG. 9). In some embodiments, such as when natural gas supply and/or power generation exceeds demand, the power can be directed from the power supply to the motor 771 to operate the compressor/expander device 701 to store the excess gas and/or power in the form of compressed gas. When demand exceeds the natural gas supply and/or power generation, the compressed gas can later be expanded through the compressor/expander device 701 to drive the motor 771, thereby generating power to supplement the power supply and thereby returning the expanded gas to a gas source or other distribution system (e.g., a pipeline).

The compressor/expander device 701 can be in fluid communication with a gas source such as, for example, a source of natural gas (e.g., at a pipeline pressure, or pre-pressurized by another compression system), and can also be fluidly coupled via the gas pathway 712 to the low storage 706 to which gas can be transferred after being compressed. Valves can be used to open and close the fluid communication between the compressor/expander device 701 and the gas source and between the compressor/expander device 701 and the low storage 706. In some embodiments, the compressor/expander device 701 can also be configured to operate as an expansion device to generate electricity. For example, the compressed gas can be transferred from the low storage 706 to the compressor/expander device 701 and stepped down from a relatively high pressure to a relatively lower pressure. The energy released from this pressure drop can be used, for example, to generate electricity.

The low storage 706 can be configured to contain a compressed gas, such as, for example, compressed natural gas. The low storage 706 can be, for example, an underground salt cavern. As the compressor/expander device 701 delivers compressed gas to the low storage 706, the pressure within the low storage 706 increases until the pressure reaches a predetermined level and/or substantially equals the pressure of the compressed gas being delivered from the compressor/expander device 701.

In some embodiments, the low storage 706 can be configured to contain both the compressed gas and a liquid such as, for example, water or brine, at the first elevation. As the compressor/expander device 701 delivers compressed gas to the low storage 706, the pressure within the low storage 706 increases until the pressure reaches a predetermined level and/or substantially equals the pressure of the compressed gas being delivered from the compressor/expander device 701. After the pressure within the low storage 706 reaches the predetermined level and/or substantially equals the pressure of the compressed gas delivered from the compressor/expander device 701, the liquid can be moved (or "displaced" by the compressed gas) out of the low storage 706 to another fluid storage location such as, for example, the high storage 708 via the liquid pathway 714.

The high storage 708 can be in fluid communication with the low storage 706 via the liquid pathway 714 and configured to contain the liquid at a second elevation, higher than the first elevation. In some embodiments, the high storage 708 can be, for example, a brine pond opened directly to the atmosphere at or near ground level. The pressure head of the liquid stored in the high storage 708 produces a pressure on the gas (and liquid) contained in low storage 706.

FIGS. 10A-10C illustrate the operation of the compressed gas energy storage system 700 at different time periods and FIGS. 11A-11G are graphical representatives of the performance of the system 700 shown in FIGS. 10A-10C. The system 700 illustrated in FIGS. 10A-10C is structurally and functionally the same as, or similar to, the system 700 illustrated in FIG. 9, and therefore, is not described in detail with reference to this embodiment.

As described above, the system 700 can be operated with the low storage 706 in constant fluid communication with the high storage 708. In this manner, the gas pressure within the low storage 706 is substantially the same as the pressure head produced by the brine contained in the high storage 708. In this embodiment, when the volume of brine in the low storage 706 is less than a predetermined level and/or the volume of brine contained in the high storage 708 is greater than a predetermined level, compressed gas cannot be transferred to the low storage 706.

FIG. 10A illustrates the system 700 prior to a storage cycle and FIG. 10B illustrates the system 700 at the end of a storage cycle (or prior to an expansion cycle) after time period T1. As the compressor/expander device 701 delivers compressed gas to the low storage 706, a portion of the liquid contained in the low storage 706 is displaced from the low storage 706 to the high storage 708 moving the liquid level in the low storage 706 from a first level 716 (FIG. 10A) to a second level 718 (FIG. 10B). Similarly, the liquid displaced into the high storage raises the liquid level in the high storage 708 from a first level 722 (FIG. 10A) to a second level 724 (FIG. 10B). FIG. 10C illustrates the system 700 after the stored energy (i.e., compressed gas) from FIG. 10B has been released after time period T2. As compressed gas is delivered from the low storage 706 to the compressor/expander device 701, a portion of the liquid contained in the high storage 708 returns to the low storage 706 moving the liquid level in the low storage 706 from the second level 718 (FIG. 10B) back to the first level 716 (FIG. 10C). Similarly, the liquid transferred from the high storage 708 to the low storage 706 lowers the liquid level in the high storage 708 from the second level 724 (FIG. 10B) back to the first level 722 (FIG. 10C). As discussed above in connection with FIGS. 4A-4B, in some embodiments, the cross sectional area of the high storage 708 can be substantially greater than the cross sectional area of the low storage 706, so that the difference between the first liquid level 722 and second liquid level 724 is substantially less than the difference between the first liquid level 716 and second liquid level 718.

FIGS. 11A-11G are example graphs from a simulation of the operation of the system 700, illustrating the fluid dynamics and energy storage capabilities of the system. The values shown in FIGS. 11A-11G are exemplary and for comparisons purposes only and the systems and methods described herein are not limited to the data disclosed in these figures. Furthermore, while the graphical illustrations depict substantially two full cycles of operation, the systems and methods described herein are not limited to full cycles, e.g., the systems and methods described herein can operate over only a portion of a cycle and/or over more or fewer than two full cycles and/or portions thereof. In the illustrated example, the volume of the low storage (above the minimum level of the brine) is 42,132 m$^3$, the top of the low storage cavern is 745 m below ground level, while the bottom of the cavern (the minimum brine level) is 849.8 m below ground level. The liquid in the system is saturated brine, having a density, $\rho$, of 1,230 kg/m$^3$. The high storage is assumed to be a shallow (1 to 5 m)

and infinitely large brine pond, so that the level of the surface of the brine does not change as the brine is moved between the high store and low storage, but instead is fixed at ground level.

Figures 11A, 11B:
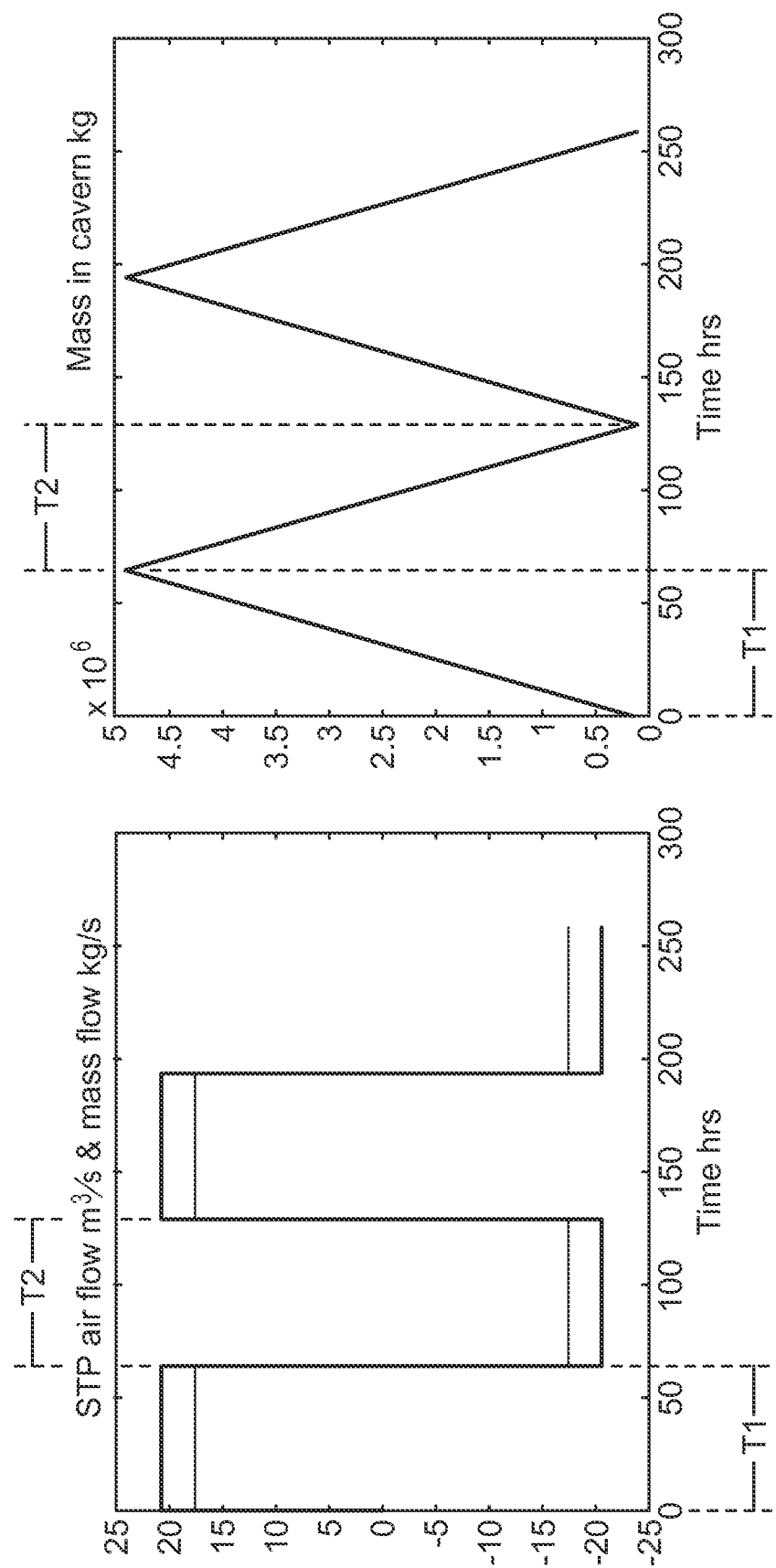
FIGS. 11A-11G are each an example graph illustrating the operation of the compressed gas energy storage system depicted in FIGS. 10A-10C.

FIG. 11A illustrates the flow of compressed gas from the compressor/expander device 701 to the low storage 706 during time period T1 and the flow of compressed gas from the low storage 706 to the compressor/expander device 701 during time period T2. As shown, the flow rate of gas to and from the low storage 706 remains relatively constant throughout T1 and T2. However, the flow rates can vary throughout the time periods depending on any number of parameters including, for example, excess gas available from a natural gas pipeline, excess power available from the power supply, natural gas demand, power demand from the electric grid, efficiency of the compressor/expander device 701, or efficiency the overall system 700. FIG. 11B illustrates the mass of gas within the low storage 706 as the compressed gas is transferred from the compressor/expander device 701 to the low storage 706 during time period T1 and the flow of compressed gas from the low storage 706 to the compressor/expander device 701 during time period T2. As shown, the mass of gas in the low storage 706 increases at a relatively linear rate during time period T1 due to the relatively constant flow rate of compressed gas transferred from the compressor/expander device 701. Likewise, the mass of gas in the low storage 706 decreases at a relatively linear rate during time period T2 due to the relatively constant flow rate of compressed gas transferred to the compressor/expander device 701 from the low storage 706.

Figures 11C, 11D:
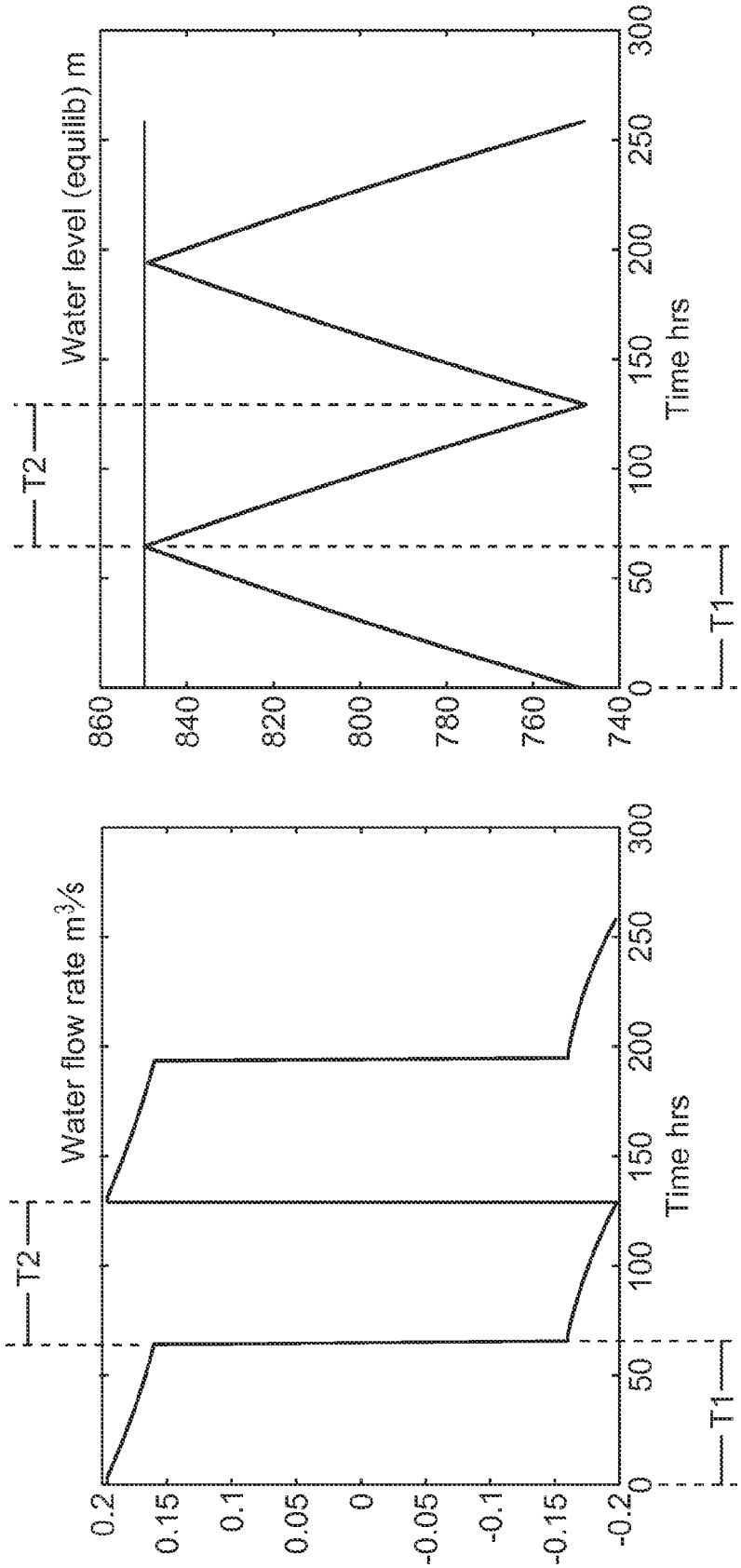

As the compressed gas is transferred from the compressor/expander device 701 to the low storage 706, the compressed gas can displace a portion of the liquid from the low storage 706 to the high storage 708 via the fluid pathway 714. FIG. 11C illustrates the liquid flow rate from the low storage 706 to the high storage 708 during time period T1 and the liquid flow rate from the high storage 708 to the low storage 706 as compressed gas is being withdrawn from the low storage 706 during time period T2. FIG. 11D illustrates the liquid level of the high storage 708 relative to the liquid level of the low storage 706 (the difference H shown in FIGS. 1B and 1C) as the liquid is being displaced from the low storage to the high storage by compressed gas being transferred to the low storage 706 from the compressor/expander device 701 during time period T1, and as liquid is replacing (i.e. moving from high storage 708 to low storage 706) the withdrawn compressed gas during time period T2. Thus, the portion of the volume of the low storage 706 available to contain compressed gas increases as the pressure increases (and the liquid is displaced from the low storage).

In some embodiments, when the volume of liquid in the low storage 706 is less than a predetermined level and/or the volume of liquid contained in the high storage 708 is greater than a predetermined level, no more compressed gas is transferred to the low storage 706. In other embodiments, the pressure head from the liquid can approach the maximum operating pressure of the compressor/expander device 701, thus preventing compressed gas from being transferred to the low storage 706.

Figure 11E:
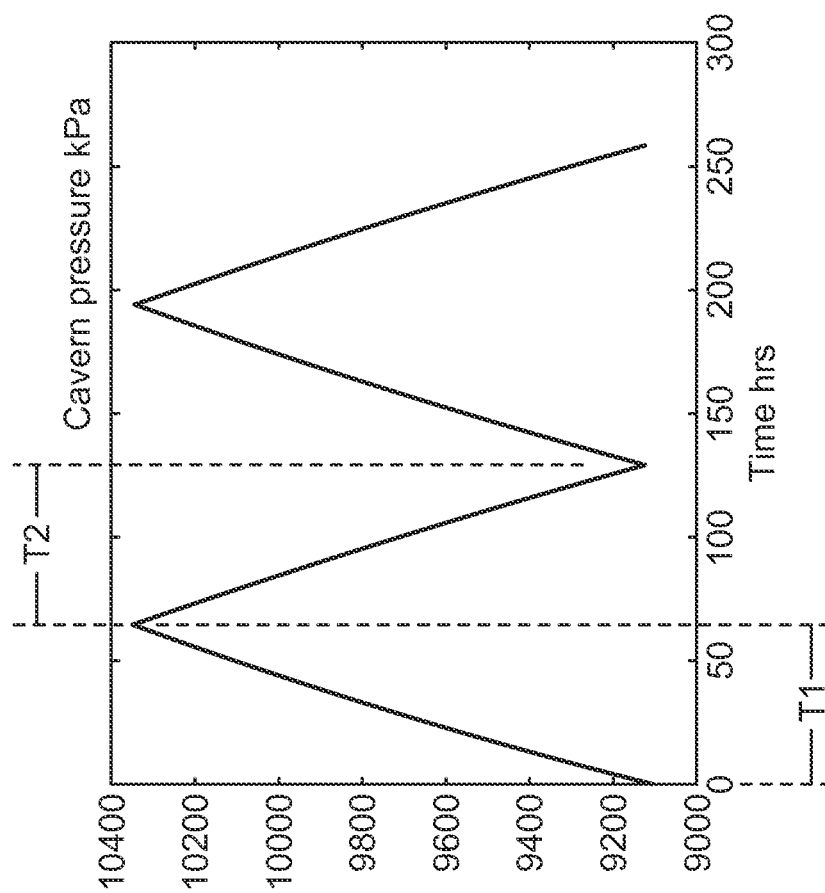

As compressed gas is transferred from the compressor/expander device 701 to the low storage 706, the gas pressure within the low storage 706 increases as illustrated in FIG. 11E during time period T1. When the pressure of the gas in the low storage 706 is greater than the pressure head from the liquid in the high storage 708, the compressed gas displaces a portion of the liquid from the low storage 706 to the high storage 708 via the liquid passageway 714. As the liquid is displaced from the low storage 706 to the high storage 708, the difference between the high storage liquid level and the low storage liquid level increases, thus increasing the pressure head (see, e.g., FIG. 11D). The gas pressure in the low storage 706 and the pressure head 708 due to the differential in liquid levels remains roughly in equilibrium as the low storage 706 is filled with compressed gas. The gas pressure in the low storage 706 increases until the pressure in the low storage 706 reaches a predetermined level and/or until the volume of brine within the low storage 706 reaches a certain predetermined level. In this manner, compressed gas is prevented from escaping the low storage 706 via the liquid pathway 714. FIG. 11E also illustrates the decreasing gas pressure in the low storage 706 as compressed gas is being withdrawn from the low storage 706 during time period T2.

Figure 11G:
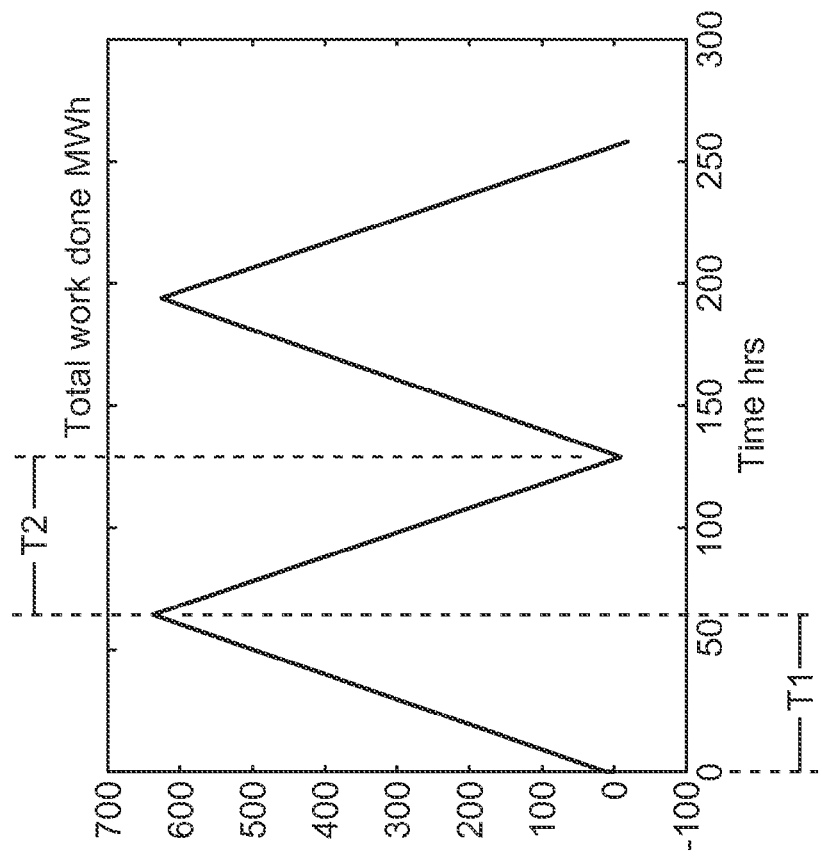
Figure 11F:
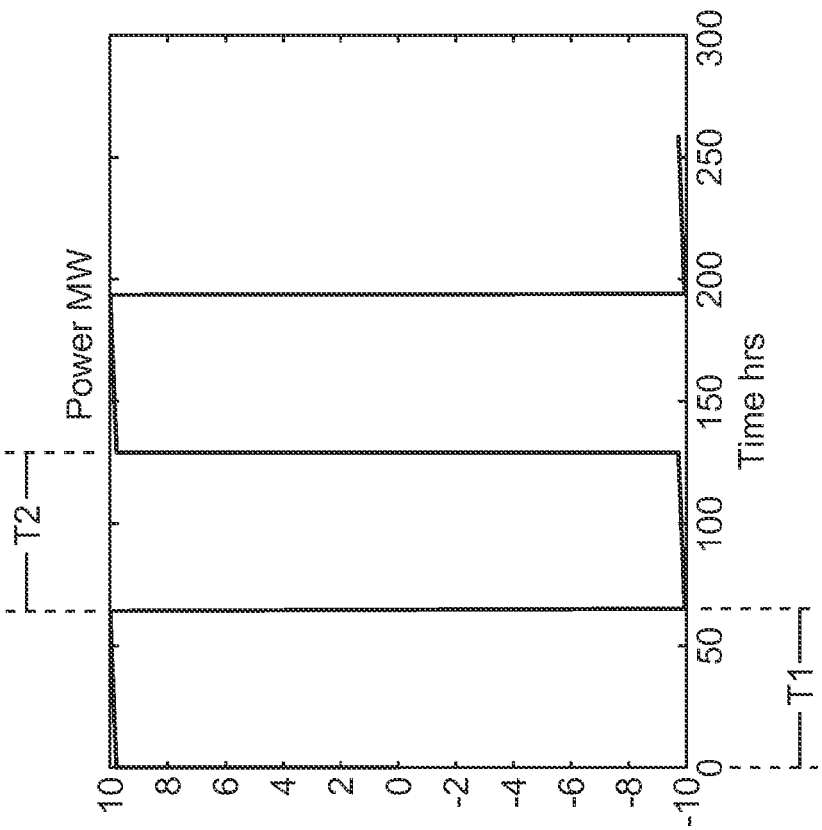

FIG. 11F illustrates the rate of power usage by the system 700 to compress gas and transfer the compressed gas to the lower storage 706 during time period T1 and the rate of power produced by the system 700 by expanding the previously stored compressed gas during time period T2. Similarly, FIG. 11G illustrates the amount of energy stored by the system 700 during time period T1 and the amount of energy released from storage during time period T2.

When compared to FIGS. 8A-8E, the flow rates of compressed gas into and out of the storage cavern 606 (FIG. 8A) and the low storage 706 (FIG. 11A) are substantially the same, however the time periods T1 and T2 for system 700 (FIGS. 11A and 11B) are longer due to the fact that the low storage 706 begins time period T1 with a much smaller mass of gas (approximately 600,000 kg), because it is almost completely filled with liquid. The total mass of gas stored in the low storage 706 (FIG. 11B) at the end of time period T1 is lower than the total mass of gas stored in the storage cavern 606 (FIG. 8B). This is because the low storage 706 is in constant fluid communication with the high storage 708 and cannot be pressurized above a predetermined pressure (determined by the pressure head exerted on the low storage by liquid in the high storage 708), whereas the storage cavern 606 is not so limited. (However, both storage cavern 606 and low storage 706 have a maximum operating pressure dictated by the structural limitations of the cavern, as discussed above). Said another way, the storage cavern 606 can be pressurized to higher pressure because it is a closed storage structure that may operate at a maximum pressure dictated by structural integrity guidelines based on its depth underground, and not dictated by the hydrostatic pressure developed by the height of the column of liquid between the low storage 706 and the high storage 708. Although the storage cavern 606 has a higher maximum operation pressure (FIG. 8C) than low storage 706 (FIG. 11C), the storage capacity (measured in total work done MWh) of system 700 (FIG. 11G) is much greater than the storage capacity of system 600 (FIG. 8E) for the same size storage cavern 606, 706—over 600 MWh for system 700 vs. 180 MWh for system 600, while each have the same gas storage volume. The storage capacity is greater both because system 700 utilizes the entire volume of the lower storage 706 to store compressed gas and can remove all of the stored compressed gas to generate power and because system 700 also elevates a volume of liquid from low storage 706 to high storage 708 for each volume of gas stored in low storage 706. Said another way, the system 700 both requires little or no minimum mass of gas to be maintained in the storage cavern because the pressure head of the liquid is being used to maintain pressure in the low storage and thus the structural integrity of the structure, and the system 700 augments storage of energy as compressed gas with storage of energy as potential energy. Thus, system 700 has both a higher effective working capacity than system 600, for the same physical capacity (volume), and incorporates an additional mode of energy storage.

Figure 12A:
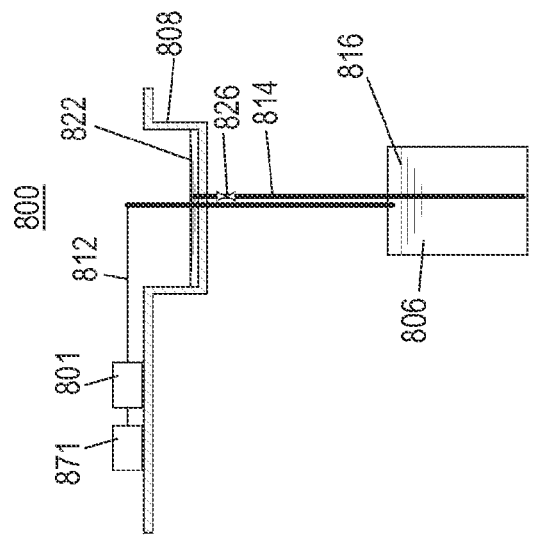
FIGS. 12A-12C are schematic illustrations of a compressed gas energy storage system according to an embodiment, showing a first time period, a second time period, and a third time period, respectively, of a storage cycle.
Figure 12B:
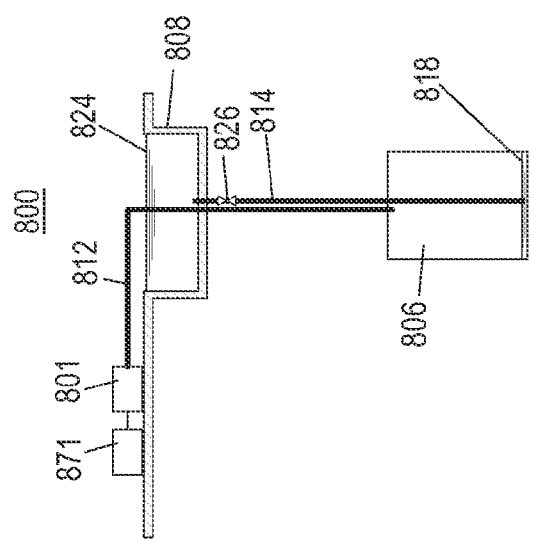
Figure 12C:
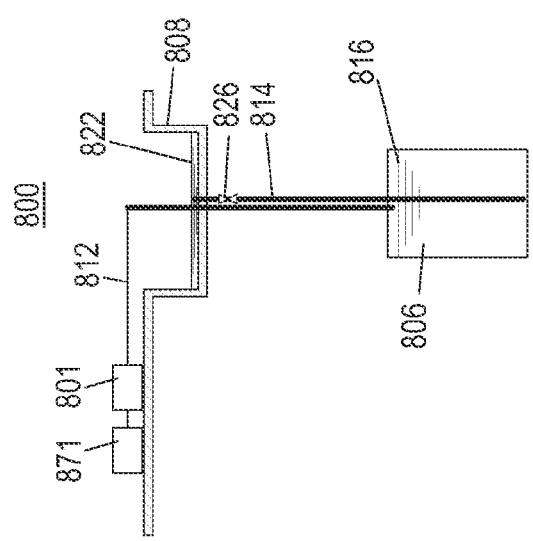

FIGS. 12A-12C illustrate the operation of a compressed gas energy storage system 800 according to another embodiment at different time periods and FIGS. 13A-13G are graphical representatives of the performance of the system 800 shown in FIGS. 12A-12C. Some features of the system 800 illustrated in FIGS. 12A-12C are structurally and functionally the same as, similar to, the system 700 illustrated in FIG. 9 and FIGS. 10A-10C and therefore, are not described in detail with reference to this embodiment.

The system 800 includes a motor and/or generator device 871 ("motor" 871), a compressor/expander device and/or expander device 801 ("compressor/expander device" 801), a low storage 806, a high storage 808, a gas pathway 812, and a liquid pathway 814. The system 800 also includes a valve 826 disposed in the liquid pathway 814 between the low storage 806 and the high storage 808 configured to selectively isolate the low storage 806 from the high storage 808. The valve 826 can be any valve, e.g., a ball valve, gate valve, globe valve, etc., and can be actuated by any method, e.g., locally, remotely, manually, automatically, pneumatically, hydraulically, etc. While the system 800 is depicted as having a single valve 826, in some embodiments, the system 800 can have more or fewer valves configured to isolate the low storage 806 from the high storage 808, and the valves can be any the same or any combination of the above mentioned valve configurations.

The system 800 can be operated in the same manner as described above with respect to the system 700, however, since the low storage 806 is in selective fluid communication with the high storage 808, the maximum operating pressure of the low storage 806 can be greater than the pressure head produced by the liquid from the high storage 808. In this embodiment, when the volume of liquid in the low storage 806 is equal to or less than a predetermined level and/or the volume of liquid in the high storage 808 is equal to or greater than a predetermined level, fluid communication between the low storage 806 and the high storage 808 can be reduced or stopped, e.g., by fully or partially closing the valve 826. Once the low storage 806 is isolated from the high storage 808, compressed gas can still be transferred to the low storage 806 and the gas pressure in the low storage 806 can continue to increase. Compressed gas can be transferred to the low storage 806 until the gas pressure in the low storage 806 reaches a predetermined level (e.g., the maximum operating pressure of the cavern) and/or until the gas pressure in the low storage 806 exceeds the maximum discharge pressure of the compressor/expander device 801.

FIG. 13A illustrates the flow of compressed gas from the compressor/expander device 801 to the low storage 806 during time period T1 and the flow of compressed gas from the low storage 806 to the compressor/expander device 801 during time period T2. As shown, the flow rate of gas to and from the low storage 806 remains relatively constant throughout T1 and T2. However, the flow rates can vary throughout the time periods depending on any number of parameters including, for example, excess power available from the power supply, power demand from the electric grid, efficiency of the compressor/expander device 801, or efficiency the overall system 800. FIG. 13B illustrates the mass of gas within the low storage 806 as the compressed gas is transferred from the compressor/expander device 801 to the low storage 806 during time period T1 and the flow of compressed gas from the low storage 806 to the compressor/expander device 801 during time period T2. As shown in this example, the mass of gas in the low storage 806 increases at a relatively linear rate during time period T1 due to the relatively constant flow rate of compressed gas transferred from the compressor/expander device 801. Likewise, the mass of gas in the low storage 806 decreases at a relatively linear rate during time period T2 due to the relatively constant flow rate of compressed gas transferred to the compressor/expander device 801 from the low storage 806.

Figure 13D:
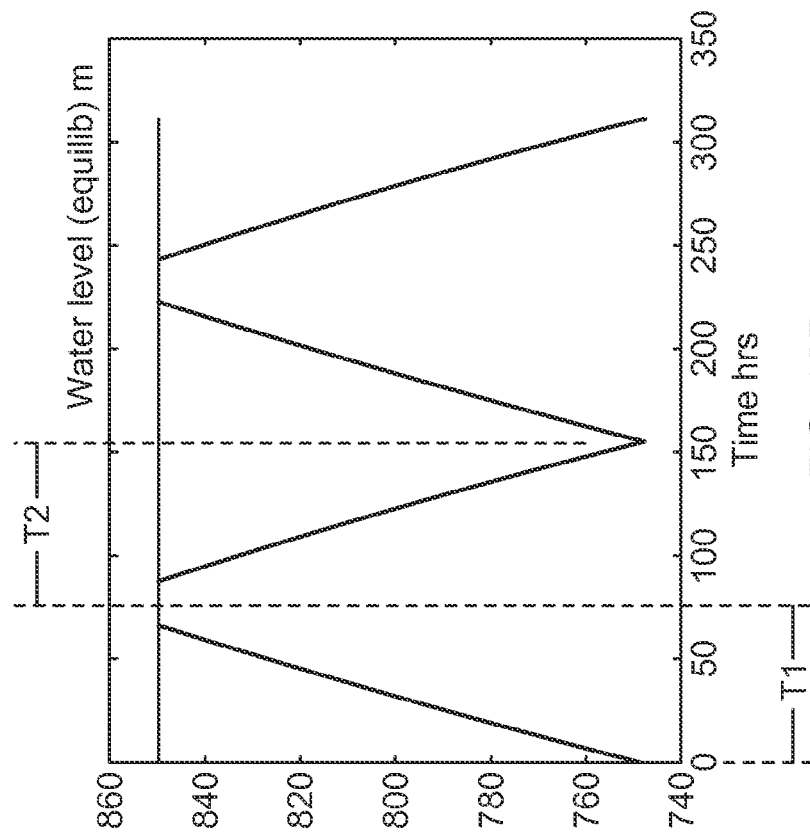
Figure 13C:
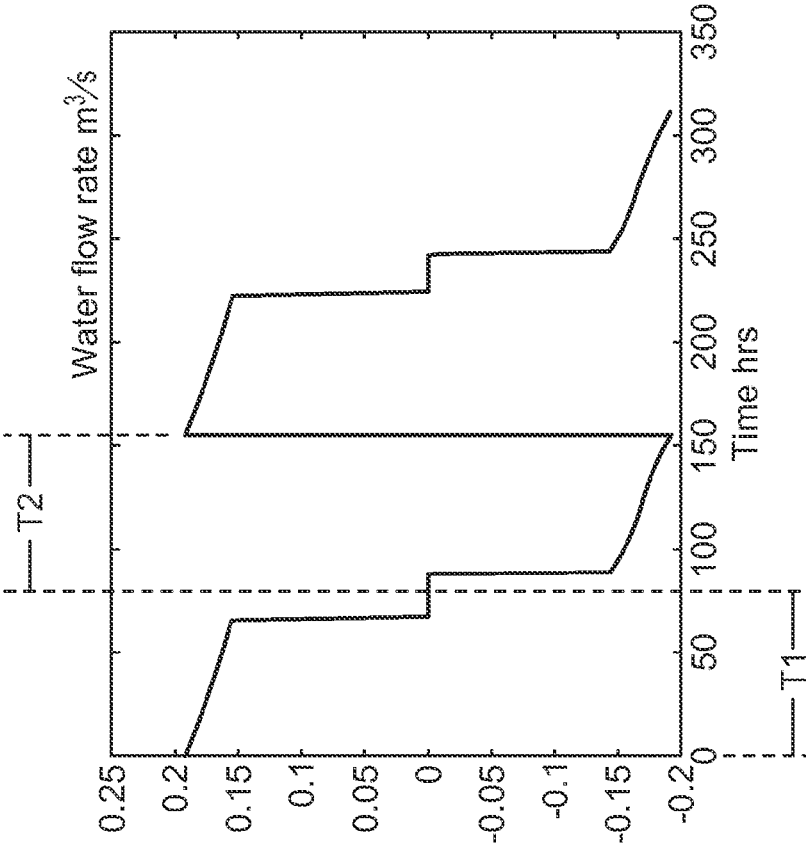

FIG. 13C illustrates the liquid flow rate from the low storage 806 to the high storage 808 during time period T1 and the liquid flow rate the high storage 808 to the low storage 806 as compressed gas is being withdrawn from the low storage 806 during time period T2. Prior to the end of time period T1, the liquid flow rate goes to 0 m$^3$/s, which corresponds to when the valve 826 is closed to isolate the high storage 808 from the low storage 806. Similarly, the flow rate of liquid from the high storage 808 to the low storage 806 is initially 0 m$^3$/s at the beginning of time period T2, which corresponds to the valve 826 being closed to isolate the high storage 808 from the low storage 806. FIG. 13D illustrates the liquid level of the high storage 808 relative to the liquid level of the low storage 806 as the liquid is being displaced from the low storage the high storage by compressed gas being transferred to the low storage 806 from the compressor/expander device 801 during time period T1, and as liquid is replacing (i.e. moving from high storage 808 to low storage 806) the withdrawn compressed gas during time period T2. As shown in this example, the liquid level differential remains constant near the end of time period T1 and the beginning of time period T2 when the valve 826 is closed.

As compressed gas is transferred from the compressor/expander device 801 to the low storage 806, the gas pressure within the low storage 806 increases as illustrated in FIG. 13E during time period T1. When the pressure of the gas in the low storage 806 is greater than the pressure head from the liquid in the high storage 808, the compressed gas displaces a portion of the liquid from the low storage 806 to the high storage 808 via the liquid passageway 814. As the liquid is displaced from the low storage 806 to the high storage 808, the difference between the high storage liquid level and the low storage liquid level increases, thus increasing the pressure head (see, e.g., FIG. 13D). The gas pressure in the low storage 806 and the pressure head due to the differential in liquid levels remains roughly in equilibrium as the low storage 806 is filled with compressed gas. The gas pressure in the low storage 806 increases until the pressure in the low storage 806 reaches a predetermined level and/or until the volume of liquid within the low storage 806 reaches a certain predetermined level at which time the valve 826 can be closed to prevent compressed gas from escaping the low storage 806 via the liquid pathway 814. FIG. 13E also illustrates the decreasing gas pressure in the low storage 806 as compressed gas is being withdrawn from the low storage 806 during time period T2.

After the valve 826 has been closed, compressed gas can still be transferred to the low storage 806 and the gas pressure in the low storage 806 will continue to increase. As shown FIG. 13E, time period T1 is divided into portions A and B with portion A being the portion of T1 when the valve 826 is open allowing fluid communication between low storage 806 and high storage 808, and portion B being portion of T1 when the valve 826 is closed isolating the low storage 806 from the high storage 808. The gas pressure in the lower storage 806 increases at a faster rate after the valve 826 is closed (time portion B) than when the valve is open (time portion A) even though the gas mass flow rate through gas pathway 812 is constant throughout time period T1 in this example. Compressed gas can be transferred to the low storage 806 until the gas pressure in the low storage 806 reaches a predetermined level (e.g., the maximum operating pressure of the cavern) and/or until the gas pressure in the low storage 806 exceeds the maximum discharge pressure of the compressor/expander device 801. Time period T2 is divided into portions C and D with portion C being the portion of T2 when the valve 826 is closed to isolate the low storage 806 from the high storage 808, and portion D being the portion of T2 when the valve 826 is open to allow fluid communication between low storage 806 and high storage 808. As with time period T1, the gas pressure in the lower storage 806 decreases at a faster rate when the valve 826 is closed (time portion C) than when the valve is open (time portion D).

FIG. 13F illustrates the amount of power used by the system 800 to compress gas and transfer the compressed gas to the lower storage 806 during time period T1 and the amount of power produced by the system 800 by expanding the previously stored compressed gas during time period T2. Similarly, FIG. 13G illustrates the amount of energy stored by the system 800 during time period T1 and the amount of energy released from storage during time period T2.

When compared to FIGS. 11A-11G, the flow rates of compressed gas into and out of the low storage 706 and 806 are substantially the same, however the time periods T1 and T2 for system 800 (FIGS. 13A and 13B) are longer due to the fact that compressed gas cannot be transferred to the low storage 706 after the gas pressure in the low storage 706 reaches the pressure head from the high storage 708 on the low storage 706. Said another way, the compressor/expander device 801 can continue to transfer compressed gas to the low storage 808 regardless of the pressure head from the high storage 808 because the low storage 806 can be fluidically isolated from the high storage 808 by closing the valve 826. Thus, the total mass of gas that can be stored in the low storage 806 (FIG. 13B) at the end of time period T1 is greater than the total mass of gas that can be stored in the lower storage 706 (FIG. 11B), because the low storage 706 cannot be pressurized above a predetermined pressure (function of the pressure head exerted on the low storage by the high storage 708). Said another way, the low storage 806 can be pressurized to higher pressure because it can be changed to a closed storage structure simply by closing the valve 826. Although the entire volume of both lower storages 706 and 806 can be utilized to store compressed gas, since low storage 806 has a higher maximum operation pressure (FIG. 13C) than low storage 706 (FIG. 11C), the storage capacity (measured in total work done MWh) of system 800 (FIG. 13G) is greater than the storage capacity of system 700 (FIG. 11G) for the same size low storage 706, 806.

While various embodiments of the invention have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially as described above. Additionally, certain steps may be partially completed before proceeding to subsequent steps. The embodiments have been particularly shown and described, but it will be understood that various changes in form and details may be made.

For example, although the liquid management systems (e.g., system 392) have been described as using a single heat transfer fluid to control the temperature and/or for dehydration of the gas, in some embodiments, a liquid management system can be configured to use more than one type of heat transfer fluid. For example, a liquid management system can be configured to use a first heat transfer fluid in the compression mode and a second heat transfer fluid in the expansion mode, the second heat transfer fluid being different than the first heat transfer fluid. In this manner, for example, the liquid management system 392 can be configured to use water as a heat transfer fluid in the compression mode and glycol as the heat transfer fluid in the expansion mode.

In another example, although various embodiments have been described as having particular features and/or combinations of components, other embodiments are possible having any combination or sub-combination of any features and/or components from any of the embodiments described herein. For example, although the device 301 is depicted as having a single pneumatic cylinder for the first stage of compression, in some embodiments, the device can include two, three, or more pneumatic cylinders configured to operate the first stage of compression. In another example, although the systems/devices 100, 300, 500 are depicted as being configured for fluid communication with a single compressed gas storage chamber, in some embodiments, the systems/devices 100, 300, 500 be configured to be fluidically coupleable to any number of compressed gas storage chambers. Similarly, although systems/devices 100, 300, 500 are depicted being fluidically coupleable to a single gas source, in some embodiments, systems/devices 100, 300, 500 can be fluidically coupleable to any number of gas sources. In another example, although the system 700 is depicted as not having a valve between the low storage and the high storage, in some embodiments, the system 700 can include any number of valves between the low storage and the high storage, and, in this manner, can operate in either the first or the second configuration. Similarly, although system 800 is depicted as including a valve between the low storage and the high storage, system 800 can be operated with or without the use of the valve(s), and, in this manner, can operate in either the first or the second configuration. The specific configurations of the various components can also be varied. For example, the size and specific shape of the various components can be different than the embodiments shown, while still providing the functions as described herein.

What is claimed is:

1. A compressed gas-based energy storage and recovery system, comprising:
 a pneumatic cylinder having a working piston disposed therein for reciprocating movement in the pneumatic cylinder, the working piston dividing the pneumatic cylinder into, and defining therewith, a first pneumatic chamber and a second pneumatic chamber,
 the first pneumatic chamber having a first fluid port and a second fluid port, the first fluid port fluidically coupleable to a gas source,
 the second pneumatic chamber having a first fluid port and a second fluid port, the first fluid port fluidically coupleable to the gas source;
 a hydraulic actuator coupled to the working piston;
 a hydraulic controller fluidically coupleable to the hydraulic actuator, the hydraulic controller operable in a compression mode in which the hydraulic actuator causes gas to be discharged from the pneumatic cylinder at a higher pressure than it enters the pneumatic cylinder from the gas source, and an expansion mode in which gas in the pneumatic cylinder does work on the hydraulic actuator and is discharged from the pneumatic cylinder to the gas source at a lower pressure than it enters the pneumatic cylinder; and a compressed gas storage chamber including a first storage chamber and a second storage chamber,
the first storage chamber fluidically coupleable to the second fluid port of the first pneumatic chamber and the second fluid port of the second pneumatic chamber, the first storage chamber comprising a subterranean storage chamber disposed at a first elevation and configured to contain a liquid and a gas in direct contact,
the second storage chamber fluidically coupleable to the first storage chamber, the second storage chamber disposed at a second elevation greater than the first elevation, and configured to contain a volume of liquid,
wherein operation of the hydraulic controller in the compression mode produces a first hydraulic actuator force on the working piston sufficient to move the working piston in a first direction such that a first mass of gas contained in the first pneumatic chamber is discharged from the first pneumatic chamber into the first storage chamber at a first pressure such that a first volume of liquid is displaced from the first storage chamber to the second storage chamber, and a second hydraulic actuator force on the working piston sufficient to move the working piston in a second direction, opposite the first direction, such that a second mass of gas contained in the second pneumatic chamber is discharged from the second pneumatic chamber into the first storage chamber at a second pressure greater than the first pressure such that a second volume of liquid is displaced from the first storage chamber to the second storage chamber, and
wherein, when receiving gas in the first or second pneumatic chamber from the first storage chamber, a flow of liquid from the second storage chamber to the first storage chamber maintains gas in the first storage chamber at a pressure that is at least one of relatively constant and within a predetermined range.

2. The system of claim 1, further comprising a valve configured to fluidically isolate the first storage chamber from the second storage chamber.

3. The system of claim 2, wherein the compressed gas storage chamber is operable in a first operating mode in which gas discharged from the pneumatic cylinder to the first storage chamber displaces liquid from the first storage chamber to the second storage chamber, and a second operating mode in which the first storage chamber is fluidically isolated from the second storage chamber.

4. The system of claim 3, wherein operation of the hydraulic controller in the compression mode produces a third hydraulic actuator force on the working piston sufficient to move the working piston in the first direction such that a third mass of gas is discharged from the pneumatic cylinder into the first storage chamber at a third pressure greater than the second pressure, in the second operating mode.

5. The system of claim 1, further comprising:
a liquid management system fluidically coupleable to the pneumatic cylinder, the liquid management system configured to transfer heat energy away from gas being compressed in the compression mode and to transfer heat energy to gas being expanded in the expansion mode.

6. The system of claim 1, wherein the compressed gas-based energy storage and recovery system is configured to store compressed natural gas, the system further comprising:
a liquid management system fluidically coupleable to the pneumatic cylinder, the liquid management system configured to remove water from natural gas being expanded in the expansion mode.

7. The system of claim 1, further comprising a third storage chamber fluidically coupleable to the first storage chamber, the third storage chamber configured to contain a quantity of gas.

8. The system of claim 7, wherein the third storage chamber is an above ground storage vessel.

9. The system of claim 7, wherein the third storage chamber is a pipeline.

10. A system, comprising:
a hydraulic pump operable to deliver hydraulic fluid over at least a hydraulic pressure range that includes a predetermined lower pressure and a predetermined upper pressure, greater than said lower pressure;
a hydraulic actuator arrangement including a first hydraulic piston and a second hydraulic piston, each of said hydraulic pistons having a first side and a second side;
a working actuator operably coupled to said hydraulic actuator arrangement, said working actuator having a working cylinder and a working piston disposed for reciprocating movement in the working cylinder, the working piston defining at least in part between a first side thereof and the working cylinder a working chamber configured to contain a quantity of gas,
said hydraulic actuator arrangement being operatively coupled to said hydraulic pump to enable selective delivery of pressurized hydraulic fluid from said hydraulic pump to one or both of said first side and said second side of each of said first and second hydraulic pistons to yield an output force in a first force range corresponding to a first combination, and to yield an output force in a second force range, greater than said first force range, corresponding to a second combination; and
a compressed gas storage chamber including a first storage chamber and a second storage chamber, the first storage chamber comprising a subterranean storage chamber disposed at a first elevation and configured to contain a liquid and a gas in direct contact, the second storage chamber fluidically coupleable to the first storage chamber, the second storage chamber disposed at a second elevation greater than the first elevation, and configured to contain a volume of liquid,
the compressed gas storage chamber operable in a first operating mode in which the working actuator causes gas to be discharged from the working chamber to the first storage chamber at a first pressure range to displace liquid from the first storage chamber to the second storage chamber, and a second operating mode in which the working actuator causes gas to be discharged from the working chamber to the first storage chamber at a second pressure range, the first storage chamber being fluidically isolated from the second storage chamber in the second operating mode, and third operating mode in which, when receiving gas in the working chamber from the first storage chamber, a flow of liquid from the second storage chamber to the first storage chamber maintains gas in the first storage chamber at a pressure that is at least one of relatively constant and within a predetermined range,
said hydraulic actuator arrangement being operable with said hydraulic pump to sequentially yield said first force range on said working piston to compress a first mass of gas to the first pressure range, and said second force range on said working piston to compress a second mass of gas to the second pressure range.

11. The system of claim 10, wherein first operating mode has a minimum operating pressure and a maximum operating pressure and the second operating mode has a minimum operating pressure and a maximum operating pressure, the maximum operating pressure of the first operation mode being substantially equal to the minimum operating pressure of the second operation mode.

12. The system of claim 11, wherein the difference between the maximum operating pressure and the minimum operating pressure in the first operating mode is less than the difference between the maximum operating pressure and the minimum operating pressure in the second operating mode.

13. The system of claim 10, further comprising a valve configured to fluidically isolate the first storage chamber from the second storage chamber in the second operating mode.

14. The system of claim 10, further comprising:
a liquid management system fluidically coupleable to the working chamber, the liquid management system configured to transfer heat energy away from gas being compressed in the working chamber.

15. A method of compressing gas in a compressed gas-based energy storage and recovery system, the compressed gas-based energy storage and recovery system including a gas compressor/expander device and a compressed gas storage chamber, the compressor/expander device including a pneumatic cylinder having a working piston disposed therein for reciprocating movement in the pneumatic cylinder, the working piston defining at least in part between a first side thereof and the pneumatic cylinder a working chamber configured to contain a quantity of gas, the compressed gas storage chamber including a first storage chamber and a second storage chamber, the first storage chamber comprising a subterranean storage chamber disposed at a first elevation and configured to contain a liquid and a gas in direct contact, the second storage chamber fluidically coupleable to the first storage chamber, the second storage chamber disposed at a second elevation greater than the first elevation and configured to contain a volume of liquid, the method comprising:
fluidically isolating the working chamber from the compressed gas storage chamber;
moving the working piston in a first direction to reduce the volume of the working chamber and compress the quantity of gas contained therein from a first pressure to a second pressure higher than the first pressure;
establishing fluid communication between the working chamber and the compressed gas storage chamber when the second pressure is substantially equal to an operating pressure of the first storage chamber; and
when receiving gas in the working chamber from the first storage chamber, transferring liquid from the second storage chamber to the first storage chamber to maintain gas in the first storage chamber at a pressure that is at least one of relatively constant and within a predetermined range.

16. The method of claim 15 further comprising:
establishing fluid communication between the first storage chamber and the second storage chamber;
receiving the quantity of gas in the first storage chamber from the working chamber; and
displacing a volume of liquid from the first storage chamber to the second storage chamber.

17. The method of claim 16, wherein the quantity of gas is a first quantity of gas, the method further comprising:
fluidically isolating the first storage chamber from the second storage chamber; and
receiving a second quantity of gas in the first storage chamber from the working chamber.

18. The method of claim 17, wherein the first quantity of gas is received from the working chamber at a first pressure range and the second quantity of gas is received from the working chamber at a second pressure range.

19. The method of claim 18, wherein the second pressure range includes gas pressures greater than gas pressures in the first pressure range.

20. The method of claim 15 further comprising:
fluidically isolating the first storage chamber from the second storage chamber; and
receiving the quantity of gas in the first storage chamber from the working chamber.

* * * * *